(12) United States Patent
Hirai

(10) Patent No.: US 7,162,514 B2
(45) Date of Patent: Jan. 9, 2007

(54) COMMUNICATION APPARATUS, COMMUNICATION METHOD, COMMUNICATION SYSTEM, PROGRAM, AND STORAGE MEDIUM

(75) Inventor: Yoshiyuki Hirai, Ibaraki (JP)

(73) Assignee: Canon Kabushiki Kaisha (JP)

( * ) Notice: Subject to any disclaimer, the term of this patent is extended or adjusted under 35 U.S.C. 154(b) by 783 days.

(21) Appl. No.: 10/262,593

(22) Filed: Sep. 30, 2002

(65) Prior Publication Data
US 2003/0091167 A1 May 15, 2003

(30) Foreign Application Priority Data
Oct. 2, 2001 (JP) .............................. 2001-306327
Oct. 2, 2001 (JP) .............................. 2001-306328

(51) Int. Cl.
*G06F 15/16* (2006.01)
(52) U.S. Cl. ....................................... 709/206; 709/217
(58) Field of Classification Search ........ 709/200–206, 709/217–227; 379/201.01
See application file for complete search history.

(56) References Cited

U.S. PATENT DOCUMENTS

| 5,765,170 | A | 6/1998 | Morikawa | 707/200 |
|---|---|---|---|---|
| 5,966,714 | A | 10/1999 | Huang et al. | 707/201 |
| 6,018,761 | A | 1/2000 | Uomini | 709/206 |
| 6,405,243 | B1 * | 6/2002 | Nielsen | 709/206 |
| 2001/0012351 | A1 * | 8/2001 | Shaffer et al. | 379/207.02 |
| 2002/0018547 | A1 * | 2/2002 | Takae et al. | 379/201.02 |
| 2002/0103932 | A1 * | 8/2002 | Bilbrey et al. | 709/245 |
| 2003/0018722 | A1 * | 1/2003 | Almeda et al. | 709/206 |

* cited by examiner

*Primary Examiner*—Moustafa M. Meky
(74) *Attorney, Agent, or Firm*—Rossi, Kimms & McDowell LLP

(57) ABSTRACT

There is provided a communication apparatus that can reduce the labor and time required to notify others of a change in a user's e-mail address and can lessen the burden on a recipient of e-mail of rewriting a telephone directory list. On a sender terminal side, only information on e-mail addresses is extracted from a telephone directory list and is copied to a temporary storage buffer. E-mail is automatically generated based on a format conforming to notification contents selected by the user and is transmitted to the e-mail addresses that have been copied into the temporary storage buffer. On a recipient terminal side, a title of the received e-mail is analyzed and when the e-mail is determined to relate to a telephone number notification, a character string required for the telephone number is obtained from the e-mail contents and this telephone number information is reflected in the telephone directory list.

10 Claims, 46 Drawing Sheets

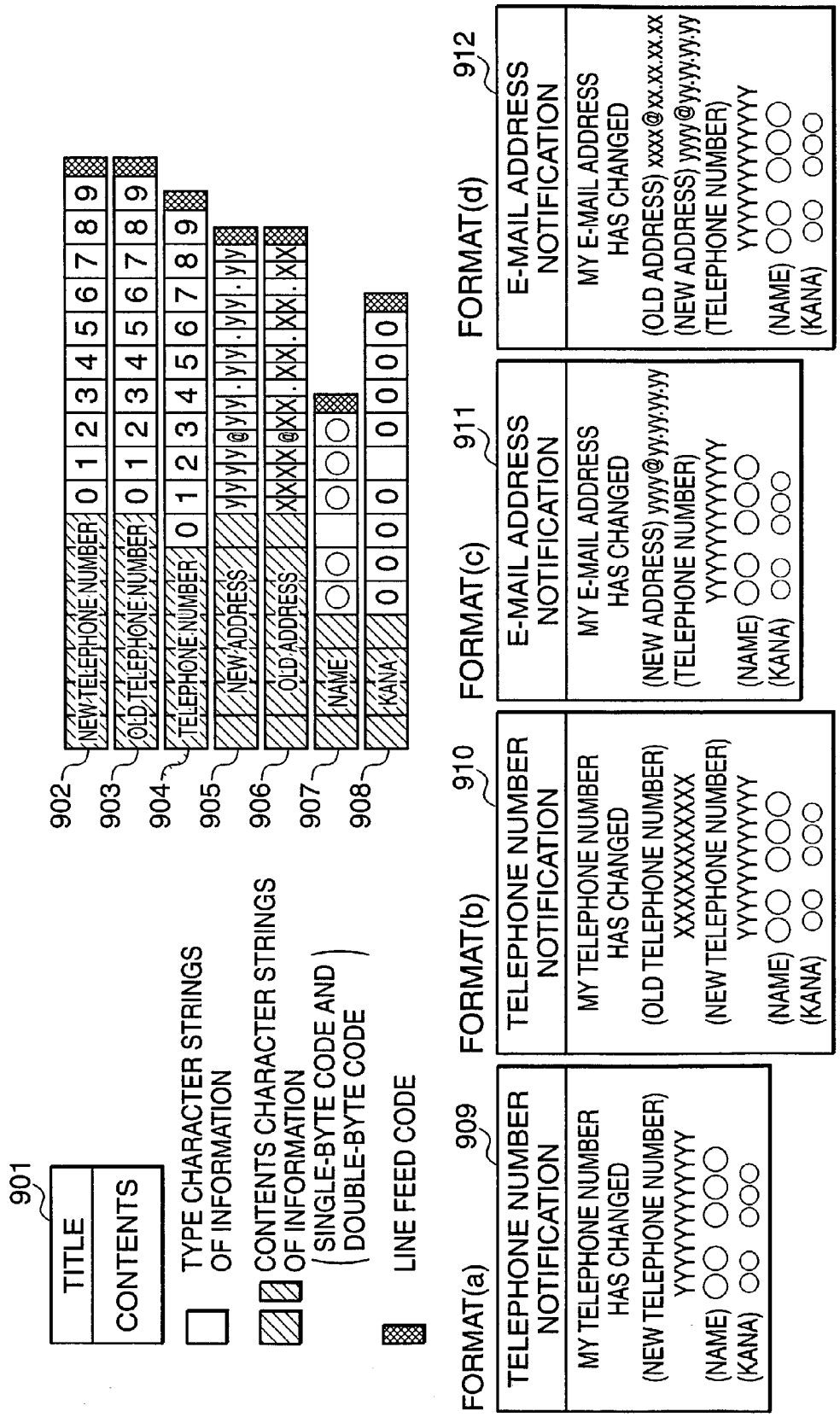

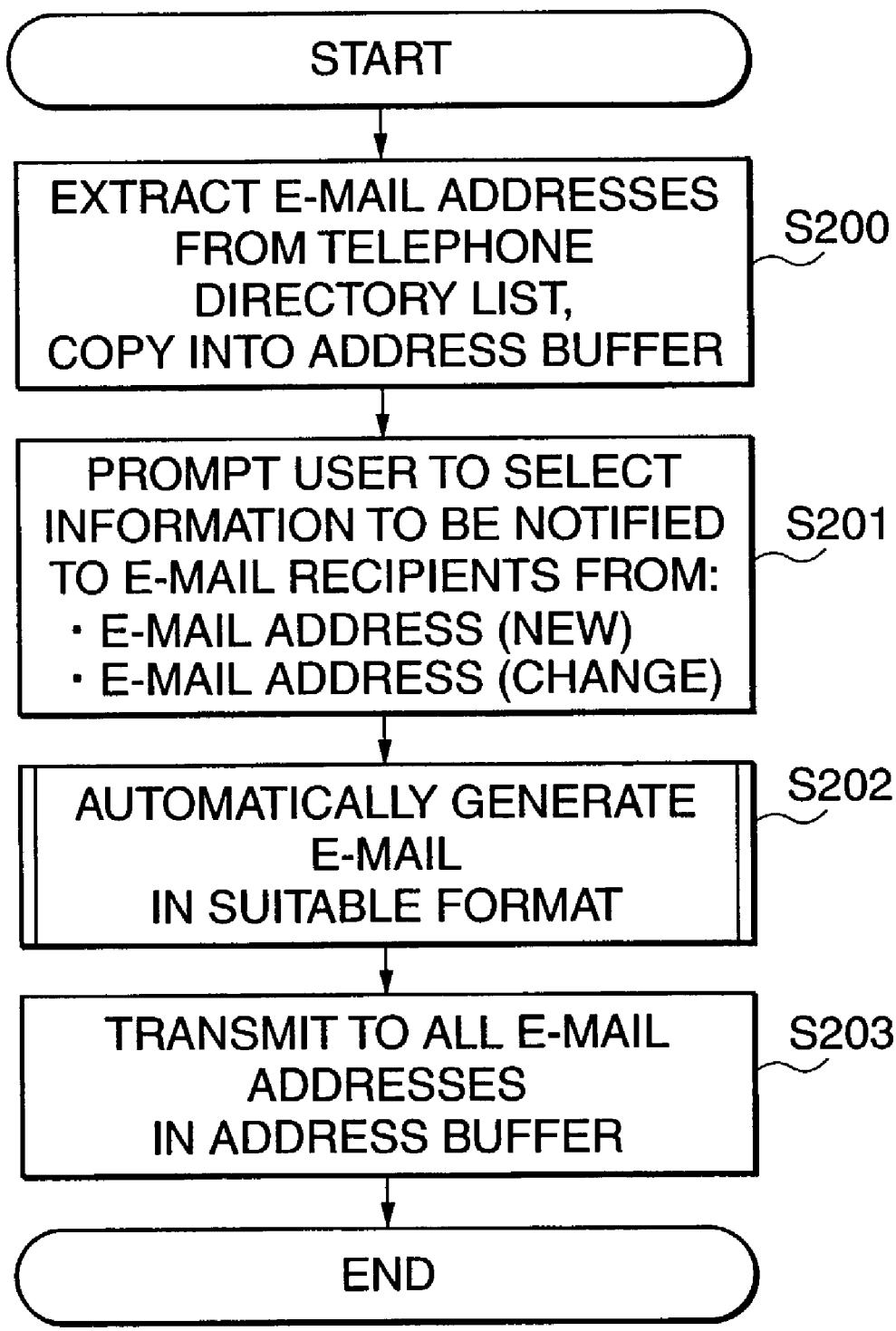

COMMUNICATION APPARATUS, COMMUNICATION METHOD, COMMUNICATION SYSTEM, PROGRAM, AND STORAGE MEDIUM

BACKGROUND OF THE INVENTION

1. Field of the Invention

The present invention relates to a communication apparatus, a communication method, and a communication system that transmit, when an electronic mail (hereinafter referred to as simply "e-mail") address or telephone number has changed, an e-mail notification of this change to e-mail addresses that have been registered in advance, and a program for implementing the communication method, and a storage medium storing the program.

The present invention also relates to a communication apparatus, a communication method, and a communication system that receive e-mail, and a program for implementing the communication method, and a storage medium storing the program.

2. Description of the Related Art

With conventional telephone terminals, such as telephone sets, facsimile apparatuses, and mobile telephone terminals, when the user changes an old telephone terminal to a new telephone terminal, such as when the user buys a new terminal, it is possible for the user to copy a telephone directory list of the old telephone terminal that the user formerly used into a telephone directory list of the new telephone terminal, with a personal computer (PC) as a medium, for example.

However, when the telephone number and/or e-mail address of a user have/has changed, such as when the user buys a new telephone terminal or moves house, the user has conventionally needed to notify the user's acquaintances of the change in telephone number and/or e-mail address by himself or herself. This task is very troublesome for the user.

Further, even in a case where it is made possible to automatically transmit a notification of the change in the user's telephone number and/or e-mail address via e-mail to users in the user's telephone directory list who have e-mail addresses, even if the recipients understand the contents of the notification of the change in the sender's telephone number and/or e-mail address when the notification has been received via e-mail, it is still necessary for each recipient to manually change the telephone directory list in his own terminal. Also, while a technique that automatically changes the telephone directory list using a special attachment file is known, it is difficult for users to readily comprehend this via e-mail, and it has been necessary for the terminals of both the e-mail senders and recipients to include means that handle the special attachment file.

SUMMARY OF THE INVENTION

It is a first object of the present invention to provide a communication apparatus, a communication method, and a communication system which, when a user's e-mail address has changed, can reduce the labor and time required to notify the change in the user's e-mail address by automatically generating e-mail for a change notification and automatically transmitting the e-mail to destinations, out of destinations registered in a telephone directory list, that have e-mail addresses, and a program for implementing the communication method, and a storage medium storing the program.

It is a second object of the present invention to provide a communication apparatus, a communication method, and a communication system which, in the case where (i) information that an e-mail sender wishes to provide to recipients is written according to certain rules so that the recipients can understand the information via text and (ii) recipient terminals has a controller for recognizing the rules, are capable of automatically performing suitable processing on the information that the e-mail sender wishes to provide, so that e-mails can be transmitted to the recipients without needing to be conscious of whether the recipients are capable of automatic rewriting, to thereby reduce the burden of selecting the recipients, and a program for implementing the communication method, and a storage medium storing the program.

To attain the first object, in a first aspect of the present invention, there is provided a communication apparatus that transmits an electronic mail for a change notification of at least one of an electronic mail address and a telephone number, comprising an electronic mail address registering means that registers at least one electronic mail address, an obtaining means that obtains at least one of the at least one electronic mail address registered in the electronic mail address registering device, and a transmitting means that transmits the electronic mail for the change notification to each of the obtained at least one electronic mail address.

Preferably, the communication apparatus according to the first aspect comprises an electronic mail generating means that automatically generates the electronic mail for the change notification to be sent to the registered at least one electronic mail address.

Also preferably, the obtaining means obtains electronic mail addresses for a maximum number of destinations to which the electronic mail for the change notification can be transmitted by a single transmission.

In a preferred form of the first aspect, the communication apparatus comprises a format registering means that registers at least one format to be used for generating the electronic mail for the change notification, a language determining means that determines whether a character code to be used for generating the electronic mail for the change notification is a double-byte character code, and a format selecting means that selects one of the registered at least one format based on a result of the determination by the language determining device, wherein the electronic mail address generating means generates the electronic mail for the change notification using the selected format.

As a preferred specific example of this form, when the character code to be used for generating the electronic mail for the change notification is the double-byte character code, one of a single-byte character code and the double-byte character code is used for a name and kana reading to be inserted into contents of the electronic mail for the change notification, and when the character code to be used for generating the electronic mail for the change notification is not the double-byte character code, the single-byte character code is used for the name and kana reading to be inserted into the contents of the electronic mail for the change notification.

In another preferred form of the first aspect, the communication apparatus comprises a normal transmission determining means that determines whether all transmissions to the obtained at least one electronic mail address have been performed successfully by comparing a number of electronic mail addresses to which transmission has been successfully performed by the transmitting means with a total number of electronic mail addresses that are registered in advance, a resuming means that resumes, when a transmission of the electronic mail for the change notification has not been performed successfully and has been discontinued, the transmission from an electronic mail address at which the transmission has been discontinued, a canceling means that cancels the transmission in a case where the discontinued transmission of the electronic mail for the change notification is not resumed, and a resume/cancel selecting means that selectively decides whether the discontinued transmission of the electronic mail for the change notification is resumed or canceled.

Preferably, the format selecting means selects a format that conforms to notification contents of the electronic mail for the change notification.

In a further preferred form of the first aspect, the communication apparatus comprises a format registering means that registers a format to be used for generating the electronic mail for the change notification, and a storing means that stores predetermined information data, wherein the electronic mail generating means comprises an inserting means that reads, based on the registered format, information data comprising at least one of a telephone number and an electronic mail address after a change and at least one of an electronic mail address before the change, and a name and kana reading of a sender, from the storing means and inserts the read information data into contents of the electronic mail for the change notification.

Preferably, the inserting means inserts the read information data following specific character strings representing attributes in accordance with predetermined rules, to produce a format in which a recipient terminal that has received the electronic mail for the change notification can automatically recognize the change notification in accordance with the predetermined rules.

Also preferably, the communication apparatus according to the first aspect comprises an input means that inputs the information data when the information data is not stored in the storing means.

Also preferably, the electronic mail generating means generates the electronic mail for the change notification using a format that conforms to notification contents of the electronic mail for the change notification.

To attain the first object, in a second aspect of the present invention, there is provided a communication method of notifying a change in at least one of an electronic mail address and a telephone number, comprising an electronic mail address registering step of registering at least one electronic mail address, an obtaining step of obtaining at least one of the at least one electronic mail address registered in the electronic mail address registering step, and a transmitting step of transmitting an electronic mail for a notification to each of the obtained at least one electronic mail address.

Preferably, the communication method according to the second aspect comprises an electronic mail generating step of automatically generating the electronic mail for the notification to be sent to the registered at least one electronic mail address.

Also preferably, the obtaining step comprises obtaining electronic mail addresses for a maximum number of destinations to which the electronic mail for the change notification can be transmitted by a single transmission.

In a preferred form of the second aspect, the communication method comprises a format registering step of registering at least one format to be used for generating the electronic mail for the notification, a language determining step of determining whether a character code to be used in generating the electronic mail for the change notification is a double-byte character code, and a format selecting step of selecting one of the registered at least one formats based on a result of the determination in the language determining step, wherein in the electronic mail address generating step the electronic mail for the notification is generated using the selected format.

As a preferred specific example of this form, when the character code to be used for generating the electronic mail for the change notification is the double-byte character code, one of a single-byte character code and the double-byte character code is used for a name and kana reading to be inserted into contents of the electronic mail for the change notification, and when the character code to be used for generating the electronic mail for the change notification is not the double-byte character code, the single-byte character code is used for the name and kana reading to be inserted into the contents of the electronic mail for the change notification.

In another preferred form of the second aspect, the communication method comprises a normal transmission determining step of determining whether all transmissions to the obtained at least one electronic mail address have been performed successfully by comparing a number of electronic mail addresses to which transmission has been successfully performed in the transmitting step with a total number of electronic mail addresses that are registered in advance, a resuming step of resuming, of the electronic mail for the change notification has not been performed successfully and has been discontinued, the transmission from an electronic mail address at which the transmission has been discontinued, a canceling step of canceling the transmission in a case where the discontinued transmission of the electronic mail for the change notification is not resumed, and a resume/cancel selecting step of selectively deciding whether the discontinued transmission of the electronic mail for the change notification is resumed or canceled.

Preferably, the format selecting step selects a format that conforms to notification contents of the electronic mail for the notification.

In a further preferred form of the second aspect, the communication method comprises a format registering step of registering a format to be used for generating the electronic mail for the notification, wherein the electronic mail generating step comprises an inserting step of reading, based on the registered format, information data comprising at least one of a telephone number and an electronic mail address after a change and at least one of an electronic mail address before the change, and a name and kana reading of a sender, from a storing device and inserting the read information data into contents of the electronic mail for the change notification.

Preferably, in the inserting step the read information data is inserted following specific character strings representing attributes in accordance with predetermined rules, to produce a format in which a recipient terminal that has received the electronic mail for the change notification can automatically recognize the change notification in accordance with the predetermined rules.

Preferably, in the electronic mail generating step the electronic mail for the notification is generated using a format that conforms to notification contents of the electronic mail for the notification.

Also preferably, the communication method according to the second aspect comprises an inputting step of inputting the information data when the information data is not stored in the storing device.

To attain the first object, in a third aspect of the present invention, there is provided a computer-readable storage medium storing a program code that realizes the communication method according to the second aspect.

To attain the first object, in a fourth aspect of the present invention, there is provided a program comprising a program code that realizes the communication method according to the second aspect.

Preferably, in the communication apparatus according to the first aspect, the inserting means further inserts a code indicating an end of the information data into the contents of the electronic mail for the change notification.

Preferably, in the communication method according to the second aspect, in the inserting step a code representing an end of the information data is further inserted into the contents of the electronic mail for the change notification.

To attain the second object, in a fifth aspect of the present invention, there is provided a communication apparatus that receives an electronic mail, comprising an obtaining means that obtains notification contents from the electronic mail, and a registering means that registers the obtained notification contents in a telephone directory list, wherein the electronic mail has a title and contents thereof generated using a format determined in accordance with predetermined rules, and wherein according to the predetermined rules, the notification contents are written between at least one specific character string representing at least one type of the notification contents and a line feed code.

Preferably, in the communication apparatus according to the fifth aspect, the obtaining means refers to the specific character string and obtains the notification contents written in accordance with the predetermined rules.

In a preferred form of the fifth aspect, when the obtained notification contents are a change of one of a telephone number and an electronic mail address and at least one of an old telephone number and an old electronic mail address, that is related to the change, is present in the telephone directory list, the registering means rewrites at least one of the old telephone number and the old electronic mail address to at least one of a new telephone number and a new electronic mail address obtained from the notification contents, and when the at least one of the old telephone number and the old electronic mail address is not present in the telephone directory list, or when the obtained notification contents are at least one of the new telephone number and the new electronic mail address, the registering device generates a new user and registers information on the new user in the telephone directory list.

Preferably, in generating the new user and registering the information on the new user in the telephone directory list, if a name of a sender is present in a format of the electronic mail, the registering device registers the name in the telephone directory list, while if the name of the sender is not present, the registering device registers a blank or a predetermined character string.

Also preferably in the communication apparatus according to the fifth aspect, when the obtained notification contents is not present in the telephone directory list, the registering means generates a new user and registers information on the new user in the telephone directory list.

More preferably, the notification contents comprises at least one of an old telephone number and an old electronic mail address.

To attain the second object, in a sixth aspect of the present invention, there is provided a communication method of receiving an electronic mail, comprising an obtaining step of obtaining notification contents from the electronic mail, and a registering step of registering the obtained notification contents, wherein the electronic mail has a title and contents thereof generated using a format determined in accordance with predetermined rules, and wherein according to the predetermined rules, the notification contents are written between at least one specific character string representing at least one type of the notification contents and a line feed code.

Preferably, in the communication method according to the sixth aspect, in the obtaining step the specific character string is referred to, to obtain the notification contents written in accordance with the predetermined rules.

In a preferred form of the sixth aspect, when the obtained notification contents are a change of one of a telephone number and an electronic mail address and at least one of an old telephone number and an old electronic mail address, that is related to the change, is present in a telephone directory list, in the registering step at least one of the old telephone number and the old electronic mail address is rewritten to at least one of a new telephone number and a new electronic mail address obtained from the notification contents, and when the at least one of the old telephone number and the old electronic mail address is not present in the telephone directory list, or when the obtained notification contents are at least one of the new telephone number and the new electronic mail address, in the registering step a new user is generated and information on the new user is registered in the telephone directory list.

Preferably, when the new user is generated and the information on the new user is registered in the telephone directory list, if a name of a sender is present in a format of the electronic mail, in the registering step the name is registered in the telephone directory list, while if the name of the sender is not present, in the registering step a blank or a predetermined character string is registered.

Also preferably, when the obtained notification contents are not present in the telephone directory list, in the registering step a new user is generated and information on the new user is registered in the telephone directory list.

More preferably, the notification contents comprises at least one of an old telephone number and an old electronic mail address.

To attain the second object, in a seventh aspect of the present invention, there is provided a communication system in which electronic mail is transmitted and received between a plurality of communication apparatuses, comprising a sender communication apparatus comprising an electronic mail generating means that generates an electronic mail in which notification contents are written according to predetermined rules, and a transmitting means that transmits the generated electronic mail, and a recipient communication apparatus comprising a receiving means that receives the transmitted electronic mail, an obtaining means that obtains the notification contents written according to the predetermined rules from the electronic mail, and a registering means that registers the obtained notification contents in a telephone directory list.

To attain the second object, in an eighth aspect of the present invention, there is provided a computer-readable storage medium storing a program code that realizes the communication method according to the sixth aspect.

To attain the second object, in a ninth aspect of the present invention, there is provided a program comprising a program code that realizes the communication method according to the sixth aspect.

The above and other objects, features, and advantages of the invention will become more apparent from the following detailed description taken in conjunction with the accompanying drawings.

BRIEF DESCRIPTION OF THE DRAWINGS

FIG. 16 is a diagram showing the formats of e-mail for notifications of user information;

FIG. 29 is a flowchart showing the procedure for a process for notifying a user's e-mail address through the automatic transmission of e-mail and the procedure for a process for receiving the notified e-mail address according to a fourth embodiment of the present embodiment;

DETAILED DESCRIPTION OF THE PREFERRED EMBODIMENTS

The present invention will now be described in detail with reference to the accompanying drawings showing preferred embodiments thereof.

First Embodiment

Figure 1:
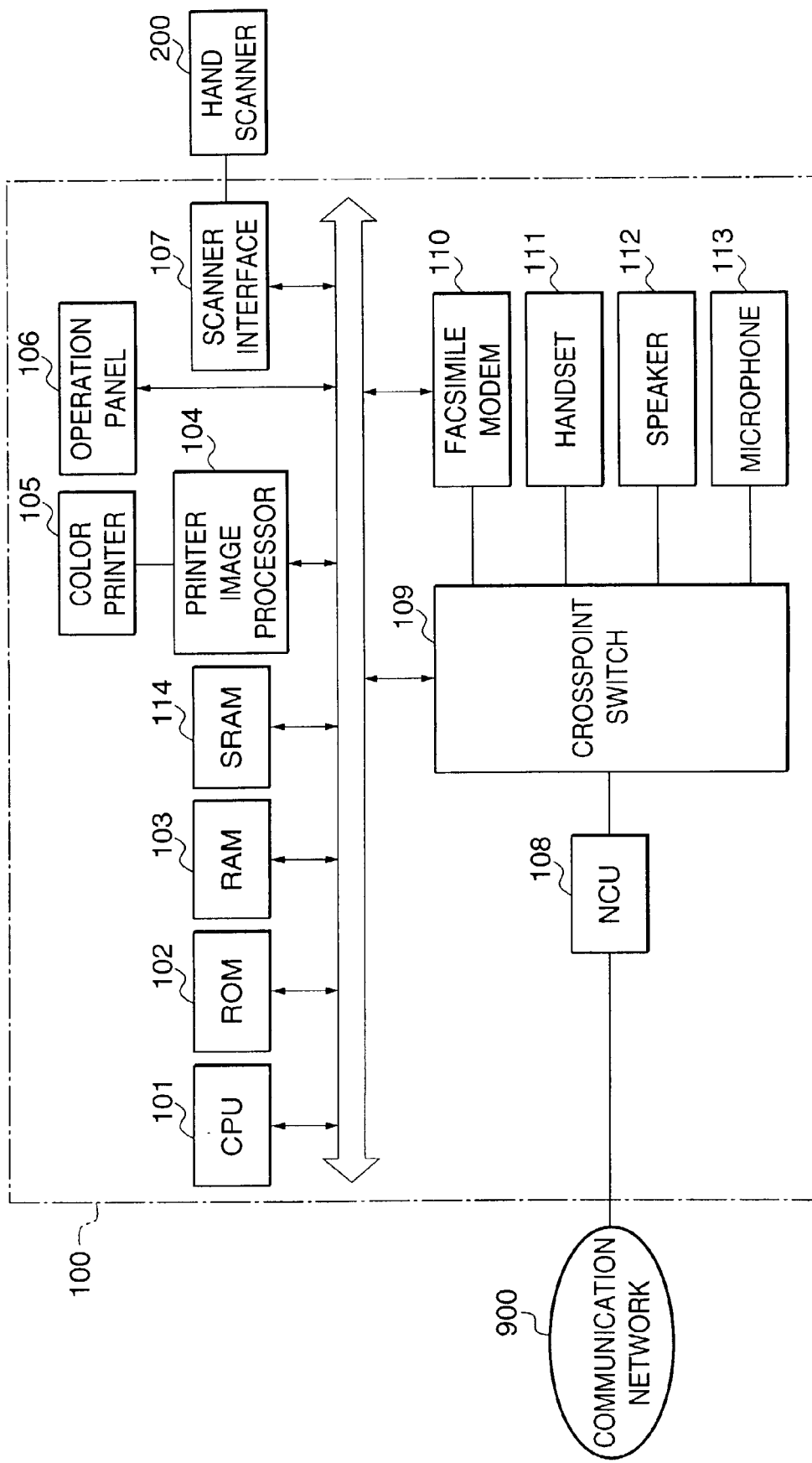
FIG. 1 is a block diagram showing the construction of a facsimile apparatus as a communication apparatus according to a first embodiment of the present invention.

FIG. 1 is a block diagram showing the construction of a facsimile apparatus as a communication apparatus according to a first embodiment of the present invention. In FIG. 1, reference numeral 100 designates a facsimile apparatus main body. Reference numeral 101 designates a central processing unit (CPU). Reference numeral 102 designates a ROM that stores programs for controlling communication and printing. Reference numeral 103 designates a RAM that is used as a storage area for a variety of data, such as images, audio, e-mail, and ring tones as well as a general-purpose work area for the CPU 101. Reference numeral 114 designates a non-volatile memory (SRAM) that can store contents of various data even when the power supply is OFF. A telephone directory list, a user telephone number, e-mail addresses, and other data are stored in the SRAM 114.

Reference numeral 104 designates a printer image processor. Reference numeral 105 designates a color printer. The printer image processor 104 performs a process for converting a printer resolution to 360 dpi and transmits print data to the color printer 105. The color printer 105 has a function of outputting received facsimile images and copy images. Reference numeral 106 designates an operation panel that is comprised of a key input section that performs dial operations and a variety of settings and a liquid crystal display section that displays a variety of data.

Reference numeral 107 designates a scanner interface that is comprised of a connector to which a hand scanner 200 is attached, and a data transmitting/receiving register. Reference numeral 109 designates a crosspoint switch that switches a connection between analog signal lines under the control of the CPU 101. Reference numeral 110 designates a facsimile modem that has a function of modulating a received facsimile signal and an image read by a scanner to analog signals. Reference numeral 111 designates a handset. Reference numeral 112 designates a speaker. Reference numeral 108 designates an NCU as a communication line interface.

Figure 2:
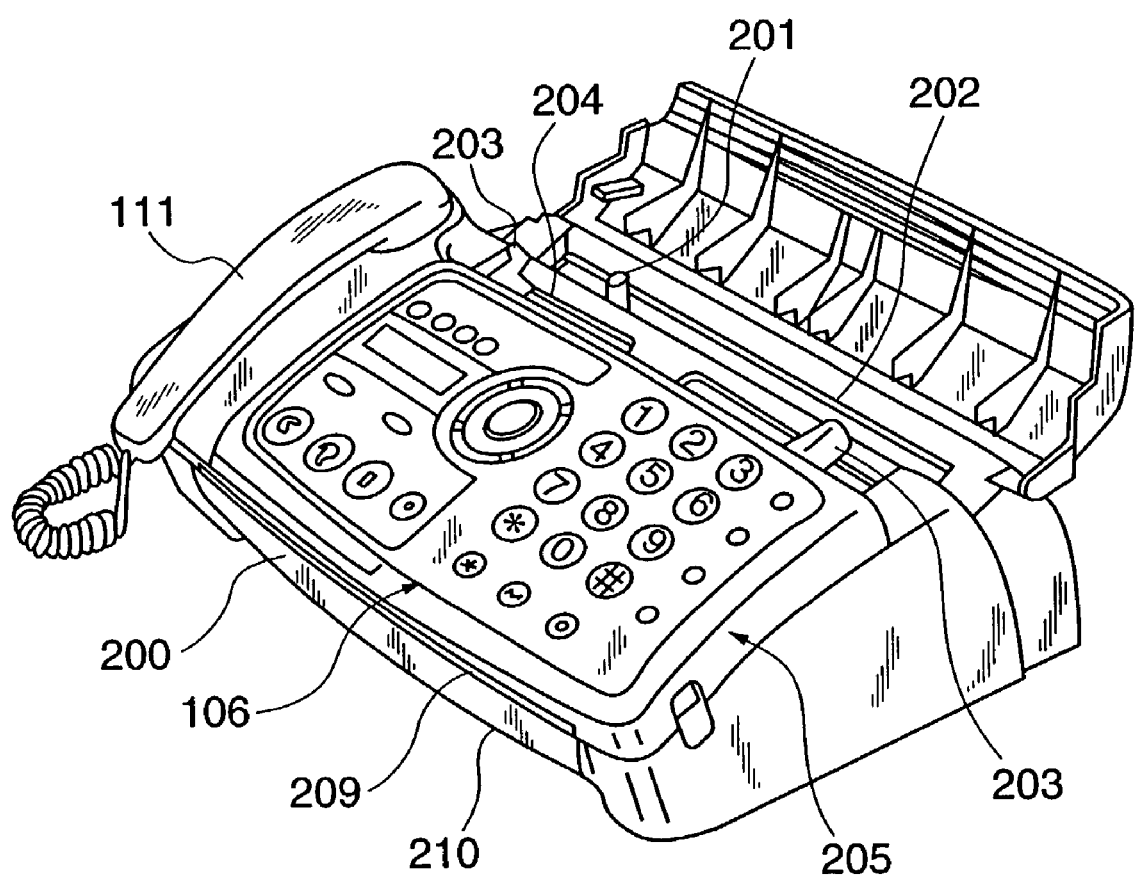
FIG. 2 is a perspective view showing the external appearance of the facsimile apparatus in FIG. 1.

FIG. 2 is a perspective view showing the external appearance of the facsimile apparatus. In FIG. 2, reference numeral 201 designates a sheet guide that is comprised of a guide mechanism that is set in accordance with the width of a recording sheet. Reference numeral 202 designates a sheet intake slot into which recording sheets are fed.

Reference numeral 203 designates an original guide that is set in accordance with the width of an original. This original guide 203 is equipped with a position sensor, with the CPU 101 detecting the size of the original based on the set position of the original guide 203. Reference numeral 204 designates an original intake slot into which the original is fed.

Reference numeral 205 designates an upper cover that is opened when removing originals and/or recording sheets that have become jammed inside the apparatus during feeding and when a cartridge of a printer unit is replaced. The upper cover 205 is comprised of the operation panel 106 and a handset cradle.

Reference numeral 111 designates the handset mentioned above, which is used during telephone conversations. Reference numeral 200 designates the cordless hand scanner (hand scanner) mentioned above, which is removed from the main body by opening the upper cover 205. Reference numeral 106 designates the operation panel mentioned above. Reference numeral 209 designates an original discharge slot from which originals that have been read by the main body are discharged. Reference numeral 210 designates a sheet discharge slot from which recording sheets that have been printed upon by the printer unit are discharged.

Figure 3:
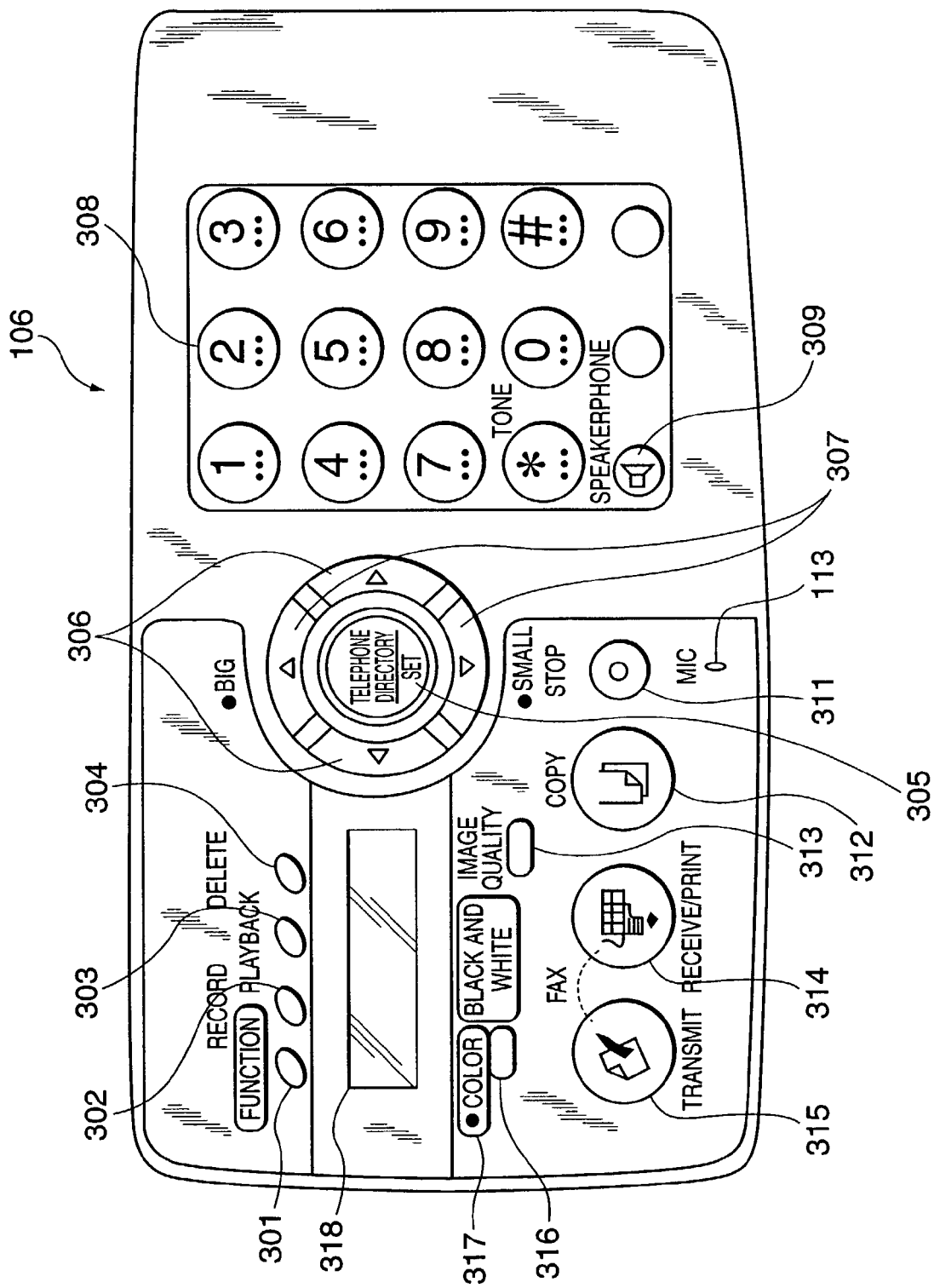
FIG. 3 is a diagram showing the construction of an operation panel in FIG. 2.

FIG. 3 is a diagram showing the construction of the operation panel 106. In FIG. 3, reference numeral 301 designates a function button that is used when starting a setting or registration operation. Reference numeral 302 designates a record button that is used when recording an audio memo. Reference numeral 303 designates a playback button that is used when listening to answer phone messages and audio memos. Reference numeral 304 designates a delete button that is used when deleting answer phone messages, audio memos, and facsimiles from a memory. Reference numeral 305 designates a telephone directory/set button that is used when dialing using a telephone directory or confirming settings that have been made. Reference numeral 306 designates left and right buttons that are used when selecting function items and inputting characters. Reference numeral 307 designates up and down buttons that are used when searching the telephone directory, when displaying function items, and when adjusting volume.

Reference numeral 309 designates a speakerphone button that is used when holding a conversation without using the handset. Reference numeral 113 designates a microphone that is used when speaking without using the handset. Reference numeral 311 designates a stop button that is used when stopping a facsimile transmission/reception, copy, playback, or setting operation and when stopping an operation midway. Reference numeral 312 designates a copy button that is used when executing a copy operation. Reference numeral 313 designates an image quality button that is used when transmitting a photo or an original with small characters. Reference numeral 314 designates a receive/print button that is used when receiving a facsimile or when printing. Reference numeral 315 designates a transmit button that is used when transmitting a facsimile. Reference numeral 316 designates a color/black-and-white button that is used when switching the color mode for copying and faxing. Reference numeral 317 designates a color lamp that is lighted when color mode is selected.

Next, a notifying of the user's telephone number and e-mail address through an automatic e-mail transmission will be described. In this first embodiment, the procedure for processing as far as the notifying of the user's telephone number and e-mail address by e-mail to users, out of the users in the telephone directory list provided in the user's own facsimile apparatus, that have e-mail addresses will be described.

Figure 4:
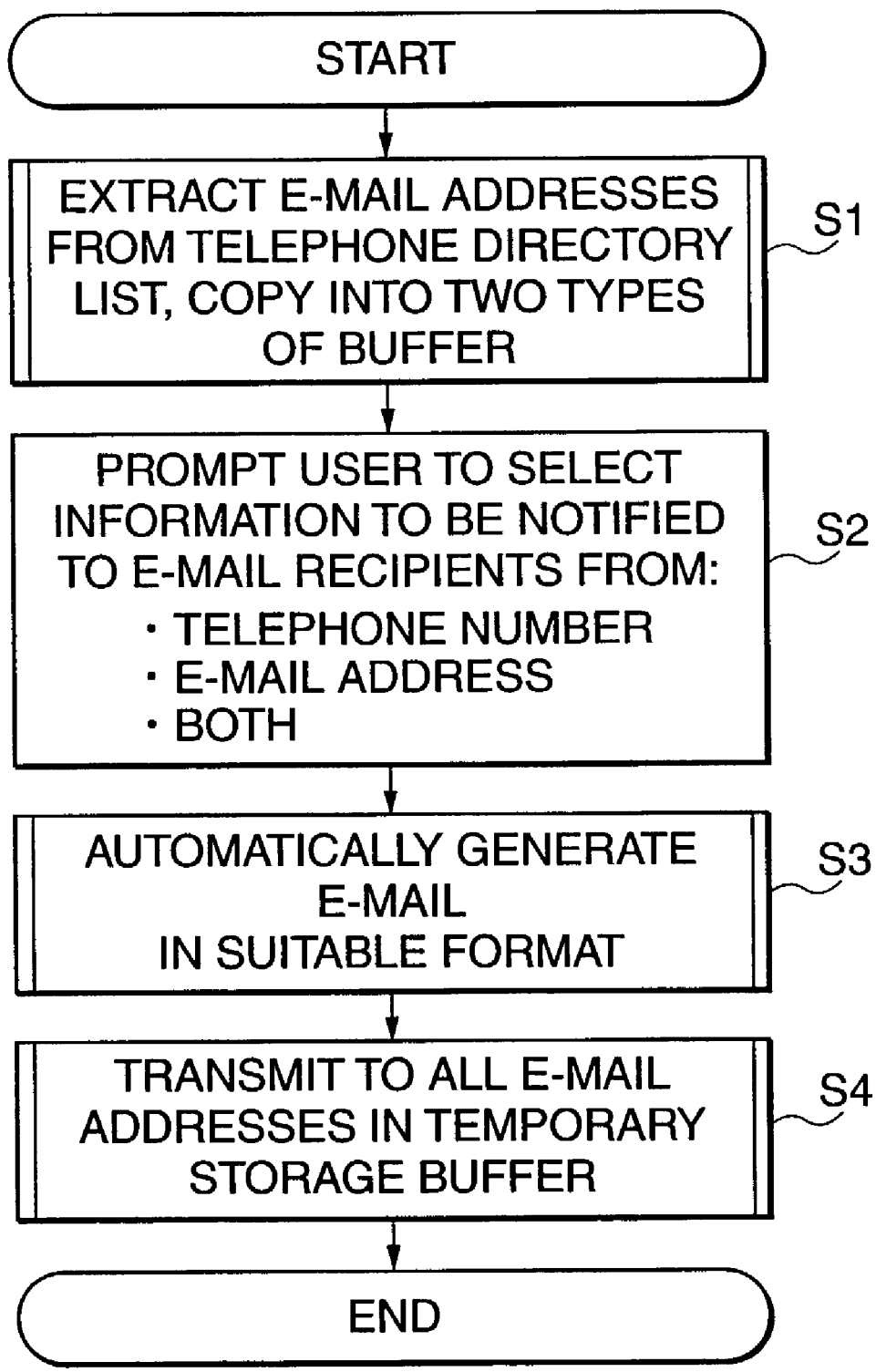
FIG. 4 is a flowchart showing the procedure for a notification process for the user's telephone number and e-mail address through an automatic transmission of e-mail.

FIG. 4 is a flowchart showing the procedure for a notification process for the user's telephone number and e-mail address through an automatic transmission of e-mail. A program that executes this process is stored in the ROM 102 and is executed by the CPU 101. First, when the user's telephone number and/or e-mail address have/has changed, information on e-mail addresses only is extracted from the telephone directory list provided in the facsimile apparatus and is copied into a temporary storage buffer (step S1). Here, the trailing end of each of the e-mail addresses is obtained and e-mail addresses that end in "jp" are assigned a copy destination that is a dedicated buffer for domestic addresses (i.e., addresses within Japan) and addresses that do no end in "jp" are assigned a copy destination that is a dedicated buffer for international addresses (i.e., addresses outside Japan).

After this, the user that possesses the facsimile apparatus is prompted to select information to be transmitted by e-mail (step S2). In the present embodiment, the user can select the transmission by e-mail of the user's telephone number only, e-mail address only, or both.

E-mail is automatically generated based on a suitable format for the transmission contents that was selected in step S2 (step S3). The e-mail that is generated in step S3 is transmitted to the addresses that were copied into the temporary storage buffer in step S1 (step S4). After this, the process is terminated.

Figure 5:
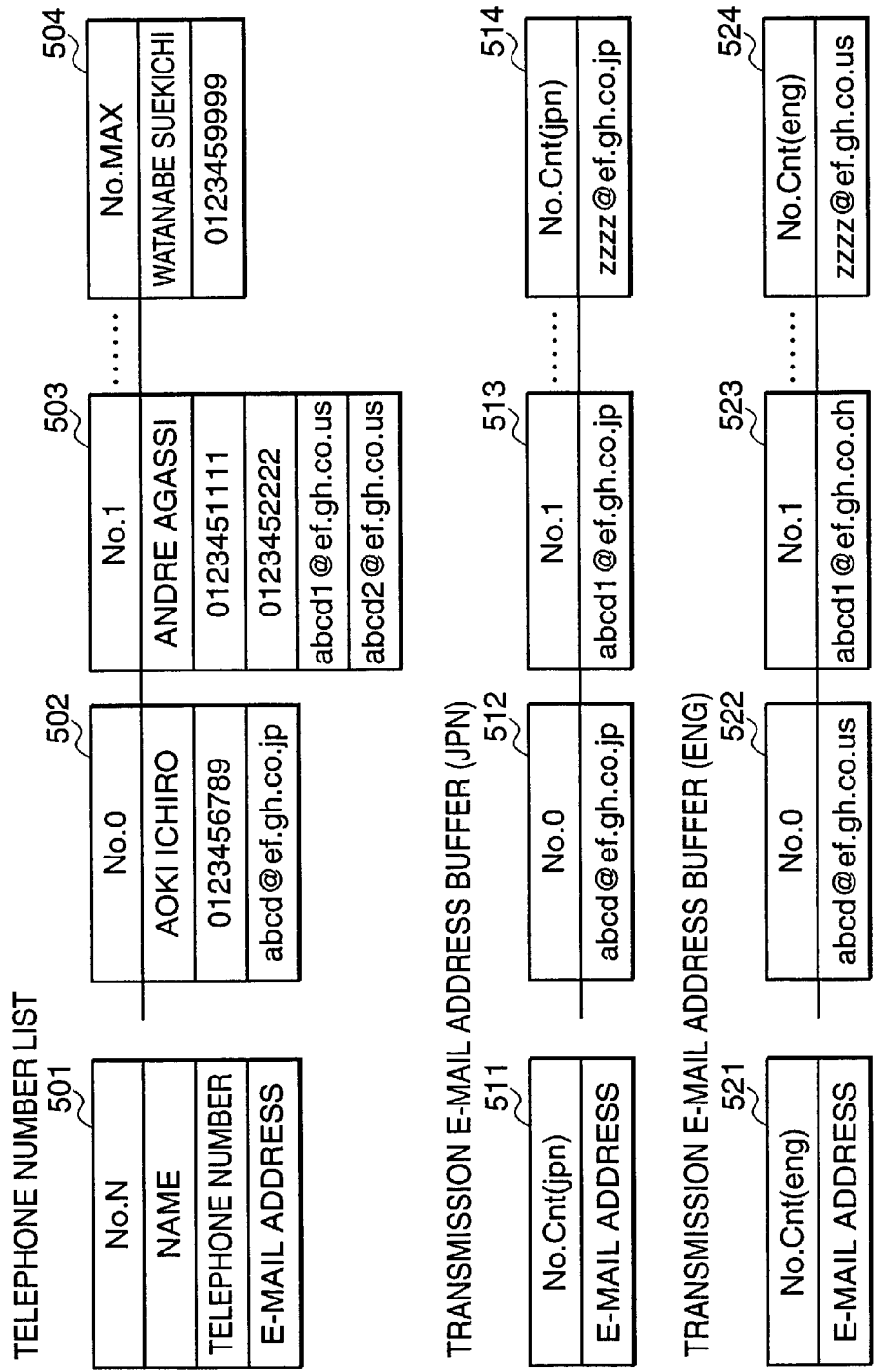
FIG. 5 is a diagram showing the data structure of a telephone directory list and the data structure of transmission e-mail address buffers provided in the facsimile apparatus in FIG. 1.

FIG. 5 is a diagram showing the data structure of transmission e-mail address buffers and the data structure of the telephone directory list provided in the facsimile apparatus. Symbol "N" in a telephone directory list 501 designates a consecutive number that is used as a user ID. Legend "Cnt" in transmission e-mail address buffers 511, 521 represents the number of e-mail addresses that have been copied into the transmission e-mail address buffers 511, 521. Legend "MAX" in user information 504 that will be described later represents the total number of users in the telephone directory list 501.

The telephone directory list 501 is comprised of user information composed of the consecutive number "N", and the user's name, telephone number, and e-mail address. User information 502 to 504 for each user is consecutively registered in the telephone directory list 501.

Also, as shown in FIG. 5, the user information 503 can include a plurality of telephone numbers and e-mail addresses. In the present embodiment, attention is only paid to the number of users and the e-mail addresses registered in the telephone directory list. As shown in FIG. 5, both domestic user information 502 and international user information 503 are present in the telephone directory list of the present embodiment.

Two types of transmission e-mail address buffer, which is to say, a domestic transmission e-mail address buffer 511 and an international transmission e-mail address buffer 521 are present as the transmission e-mail address buffer that is provided for transmitting e-mail. This is because different languages are used domestically and overseas, so that consideration can be paid to differences in the character codes that are valid for the terminal apparatuses to which the e-mail is to be transmitted. This will be described in detail later.

As shown in FIG. 5, the domestic transmission e-mail address buffer 511 stores e-mail addresses that definitely end in "jp" (reference numerals 512 to 514). On the other hand, the international transmission e-mail address buffer 521 stores e-mail addresses that do not end in "jp" (reference numerals 522 to 524).

Figure 6:
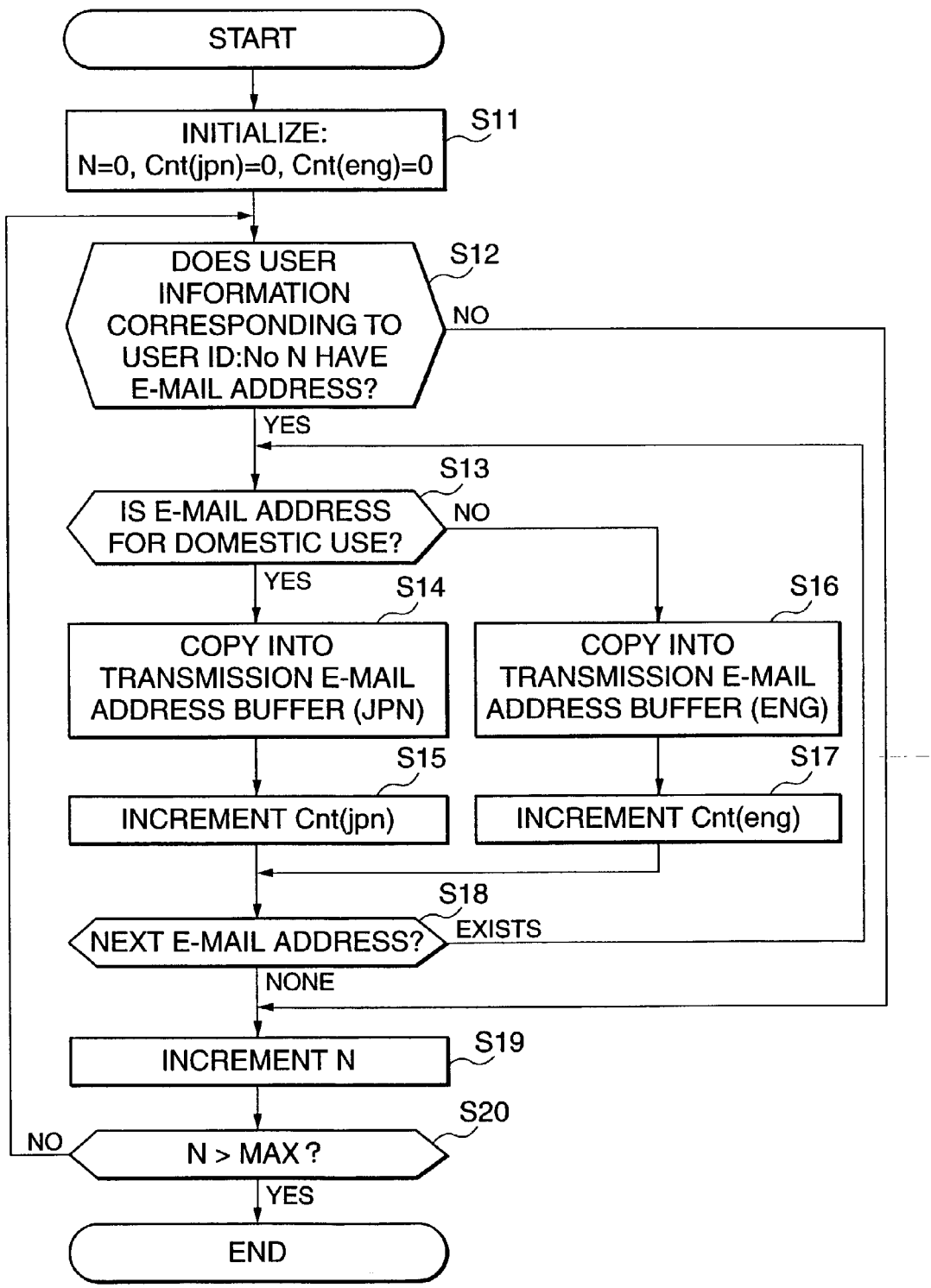
FIG. 6 is a flowchart showing the procedure for processing in step S1 in FIG. 4 that extracts e-mail addresses from the telephone directory list and copies the e-mail addresses into two types of buffers.

FIG. 6 is a flowchart showing the procedure for the processing in step S1 that extracts e-mail addresses from the telephone directory list and copies the addresses into the two types of buffer.

First, initialization is executed and the consecutive number N for the user IDs and the numbers Cnt(jpn) and Cnt(eng) of e-mail addresses that have been copied into the transmission e-mail address buffers are reset to a value of zero (step S11).

It is determined whether an e-mail address is present in the user information corresponding to the user ID number "N" (step S12). When there is no e-mail address, the consecutive number N is incremented so that the user information corresponding to the next user ID number is investigated (step S19).

On the other hand, when there is an e-mail address, it is determined whether this e-mail address is a domestic e-mail address or an international e-mail address (step S13). More specifically, e-mail addresses that end in "jp" are determined to be domestic e-mail addresses and other e-mail addresses are determined to be international e-mail addresses.

When the e-mail address is a domestic e-mail address, the e-mail address is copied into the domestic transmission e-mail address buffer (JPN) 511 (step S14) and the number of addresses Cnt(jpn) is incremented (step S15). On the other hand, when the e-mail address is an international e-mail address, the e-mail address is copied into the international transmission e-mail address buffer (ENG) 521 (step S16) and the number of addresses Cnt(eng) is incremented (step S17). After this, it is determined whether there is another e-mail address in the user information with the same user ID number (step S18).

When the user information corresponding to the same user ID number includes two or more e-mail addresses and it is thus determined that there is another e-mail address, the process returns to step S13 to repeat the processing in step S13, and another determination is performed for an e-mail address. By performing this process, e-mail can be transmitted to every e-mail address of users that have two or more e-mail addresses.

Although in the present embodiment, e-mail is transmitted to every e-mail address of users that have two or more e-mail addresses, by omitting the processing of step S18, it is possible to have only one e-mail transmitted to each user.

In step S18, when there are no more e-mail addresses for the same user, the consecutive number N is incremented so that the user information corresponding to the next user ID number is investigated (step S19). It is then determined whether the consecutive number N exceeds the total number of users MAX in the telephone directory list (step S20). When the consecutive number N exceeds the total number of users MAX, the process is terminated. On the other hand, when the consecutive number N does not exceed the total number of users MAX, the process returns to step S12 to repeat the same processing.

Figure 7A:
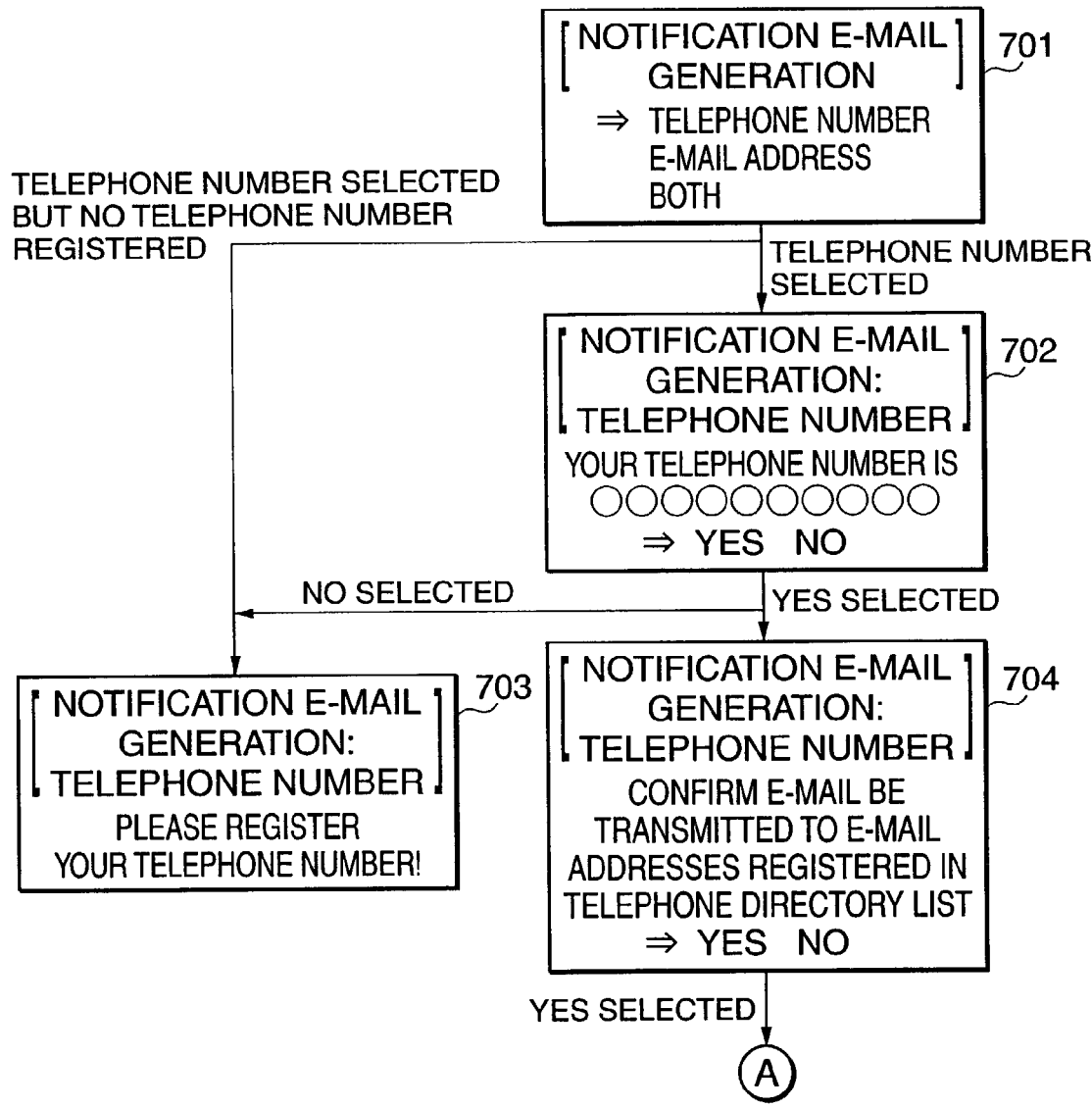
FIG. 7 is a diagram showing a state transition of a display screen of the facsimile apparatus in the case where the user selects information to be transmitted as e-mail and the e-mail is transmitted and in the case where a transmission is resumed or canceled after being discontinued.
Figure 7B:
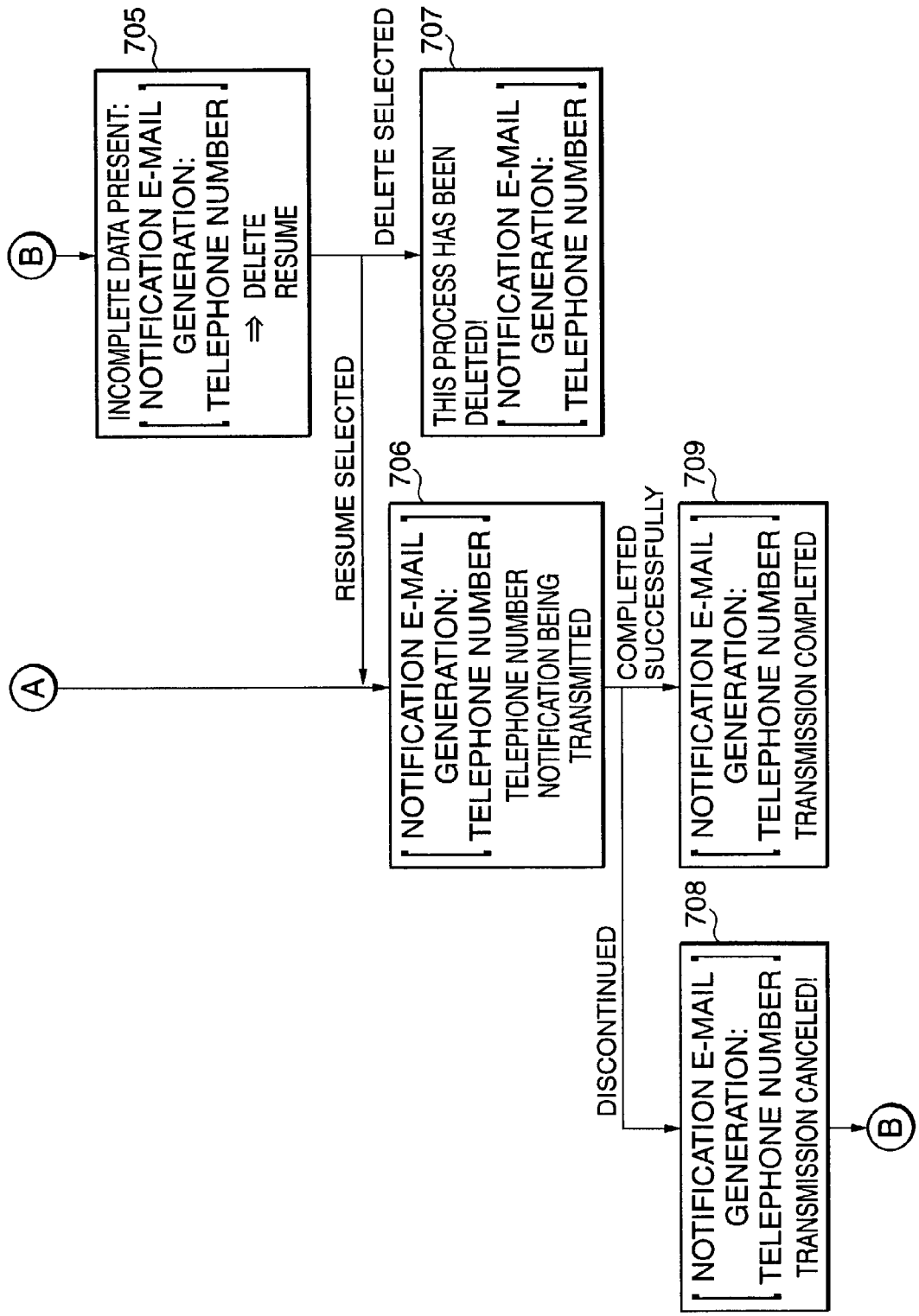

FIG. 7 is a diagram showing a state transition of a display screen of the facsimile apparatus in the case where the user selects information to be transmitted as e-mail and the e-mail is transmitted, or in the case where the transmission is resumed or canceled after being discontinued.

A description will now be given of a case where the telephone number of the user is registered in the telephone directory list of the user's own facsimile apparatus and notifications are made by e-mail to users that have e-mail addresses, with reference to FIG. 7.

First, on a screen 701, the user himself or herself selects information to be transmitted by e-mail. When the user wishes to inform users of the user's telephone number, the user selects "TELEPHONE NUMBER". When the user wishes to inform users of the user's e-mail address, the user selects "E-MAIL ADDRESS". When the user wishes to inform other users of both the user's telephone number and the user's e-mail address, the user selects "BOTH". Here, the case when "TELEPHONE NUMBER" is selected will be described.

When "TELEPHONE NUMBER" is selected on the screen 701, the telephone number stored in the SRAM 114 of the facsimile apparatus is displayed on a screen 702. At this point, when the user's telephone number is not registered in the facsimile apparatus, or when "NO" has been selected on the screen 702, a screen 703 that prompts the user to register the correct telephone number for the user in the facsimile apparatus in advance is displayed, and the e-mail transmission process for notifying users of the user's telephone number is canceled or terminated.

On the other hand, when the user's telephone number is registered in the facsimile apparatus and "YES" is selected on the screen 702, an e-mail that notifies the user's telephone number is generated in accordance with a predetermined format. When "YES" is selected on a screen 704, the transmission of the e-mail is commenced. A screen 706 is displayed until the transmission of e-mail is discontinued or completed. On the other hand, when "NO" is selected on the screen 704, the process is canceled or terminated at this point.

Figure 8:
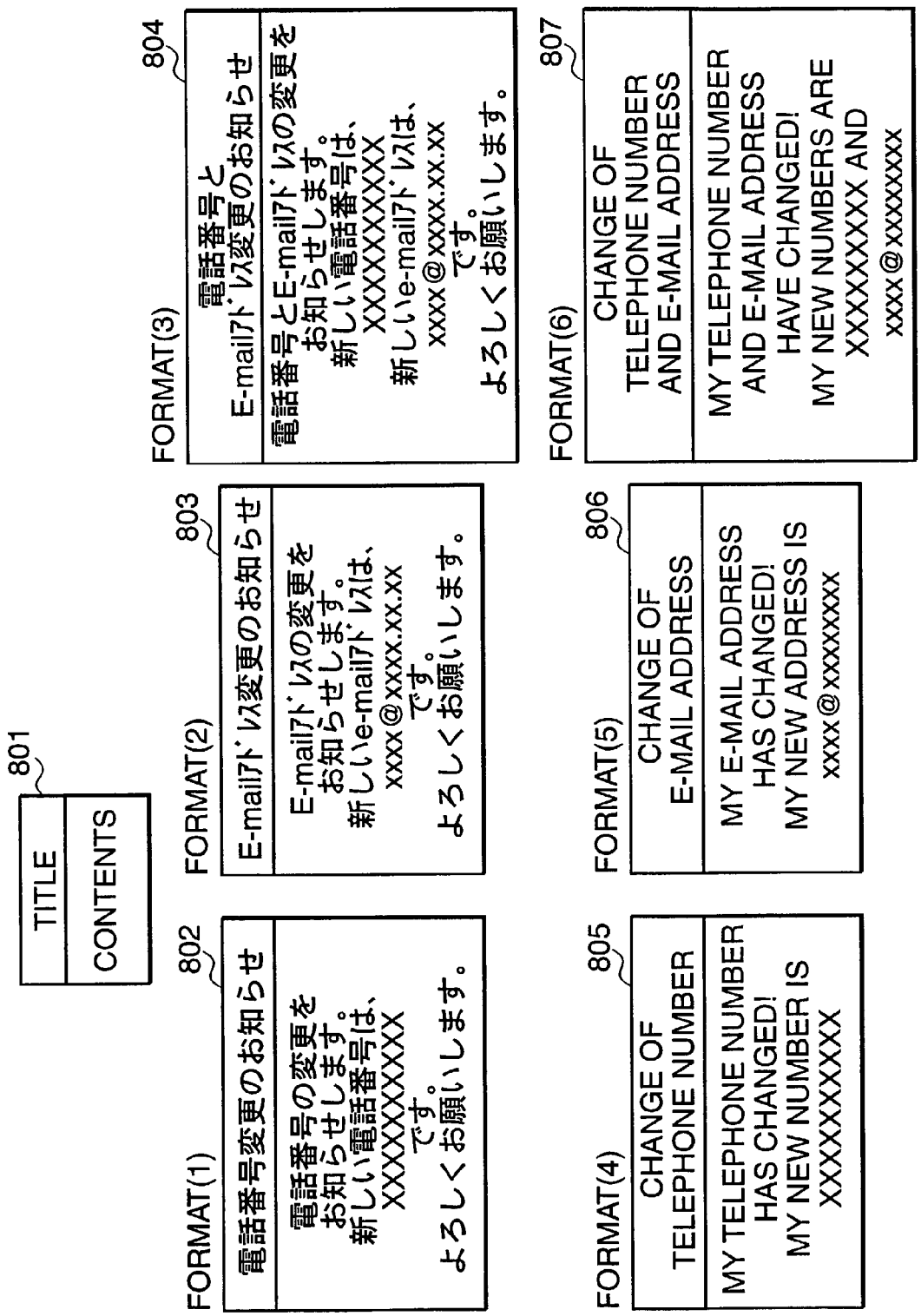
FIG. 8 is a diagram showing the formats of e-mails used when notifying user information.

FIG. 8 is a diagram showing the formats of the e-mails used when notifying user information. In the present embodiment, as designated by reference numeral 801, predetermined formats for the "TITLE" and "CONTENTS" of the e-mail are provided in the facsimile apparatus.

A format (1) designated by reference numeral 802 is a Japanese-oriented format for a notification of a telephone number, and is generated using a double-byte character code. On the other hand, a format (4) designated by reference numeral 805 is an internationally oriented format for a notification of a telephone number and is generated using a single-byte ASCII code.

A format (2) designated by reference numeral 803 is a Japanese-oriented format for a notification of an e-mail address, and is generated using the double-byte character code. A format (5) designated by reference numeral 806 is an internationally oriented format for a notification of an e-mail address and is generated using the single-byte ASCII code.

A format (3) designated by reference numeral 804 is a Japanese-oriented format for a notification of a telephone number and an e-mail address, and is generated using the double-byte character code. A format (6) designated by reference numeral 807 is an internationally oriented format for a notification of a telephone number and an e-mail address and is generated using the single-byte ASCII code.

Figure 9:
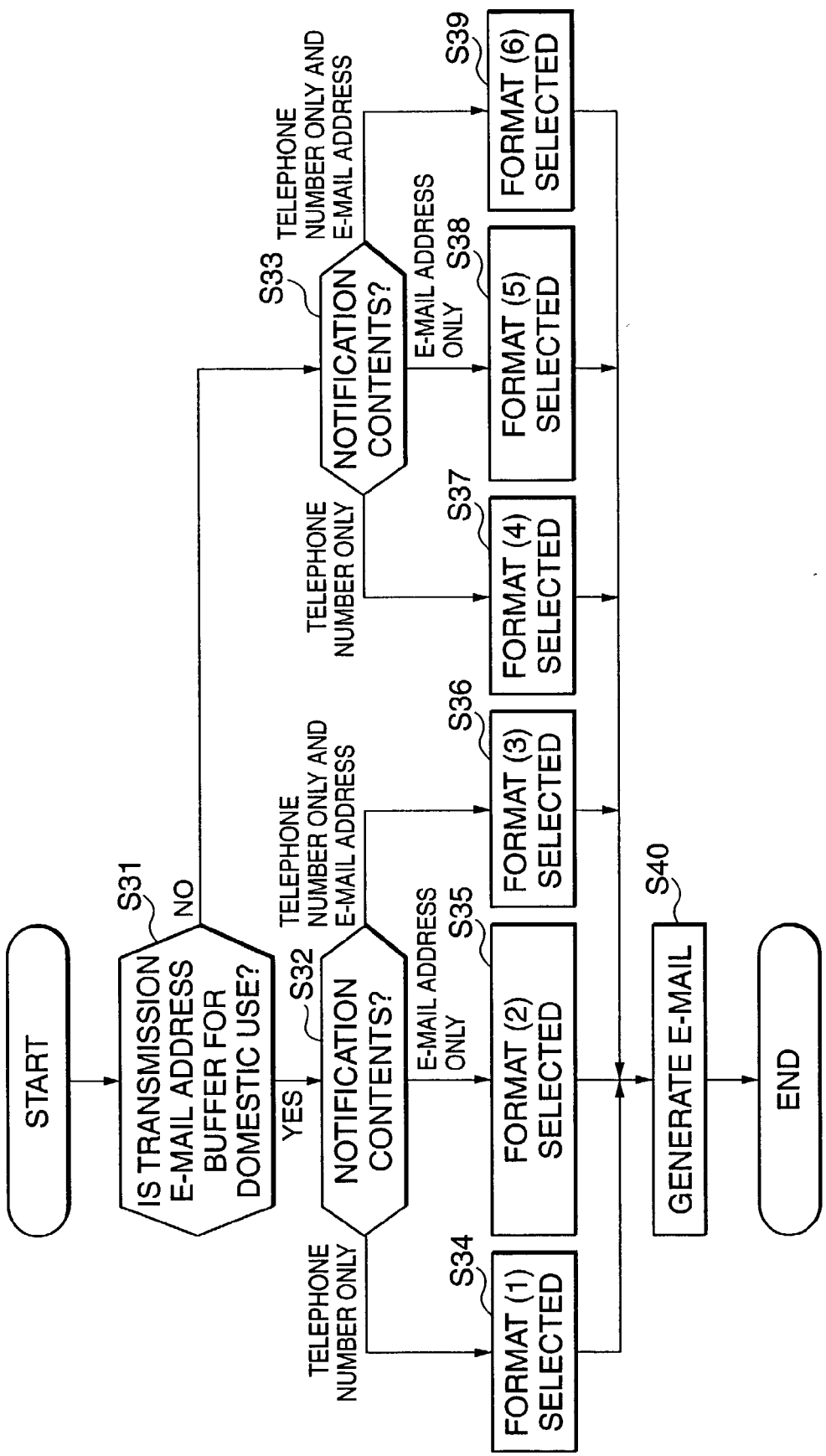
FIG. 9 is a flowchart showing the procedure for a selection process in step S3 in FIG. 4 that selects the e-mail formats appearing in FIG. 8.

FIG. 9 is a flowchart showing the procedure for the selection process in step S3 in FIG. 4 that selects the e-mail formats appearing in FIG. 8. In each format, sentences that are set in advance are prepared as a standard text that includes a greeting. For the telephone number and the e-mail address, it is necessary to insert the information stored in the SRAM 114 into the contents part of a format. First, it is determined whether the transmission e-mail address buffer is the domestic transmission e-mail address buffer (step S31).

When the buffer is the domestic buffer, the notification contents are next checked (step S32). When the notification contents are the telephone number only, the format (1) is selected (step S34) and the e-mail is generated (step S40). In another case when in step S32 the notification contents are the e-mail address only, the format (2) is selected (step S35) and the e-mail is generated in step S40. In yet another case when in step S32 the notification contents are both the telephone number and the e-mail address, the format (3) is selected (step S36) and the e-mail is generated in step S40. After this, the process is terminated.

On the other hand, when in step S31 the buffer is the international buffer, the notification contents are next checked (step S33). When the notification contents are the telephone number only, the format (4) is selected (step S37) and the e-mail is generated in step S40. In another case when in step S33 the notification contents are the e-mail address only, the format (5) is selected (step S38) and the e-mail is generated in step S40. In yet another case when in step S33 the notification contents are both the telephone number and the e-mail address, the format (6) is selected (step S39) and the e-mail is generated in step S40. After this, the process is terminated.

Figure 10:
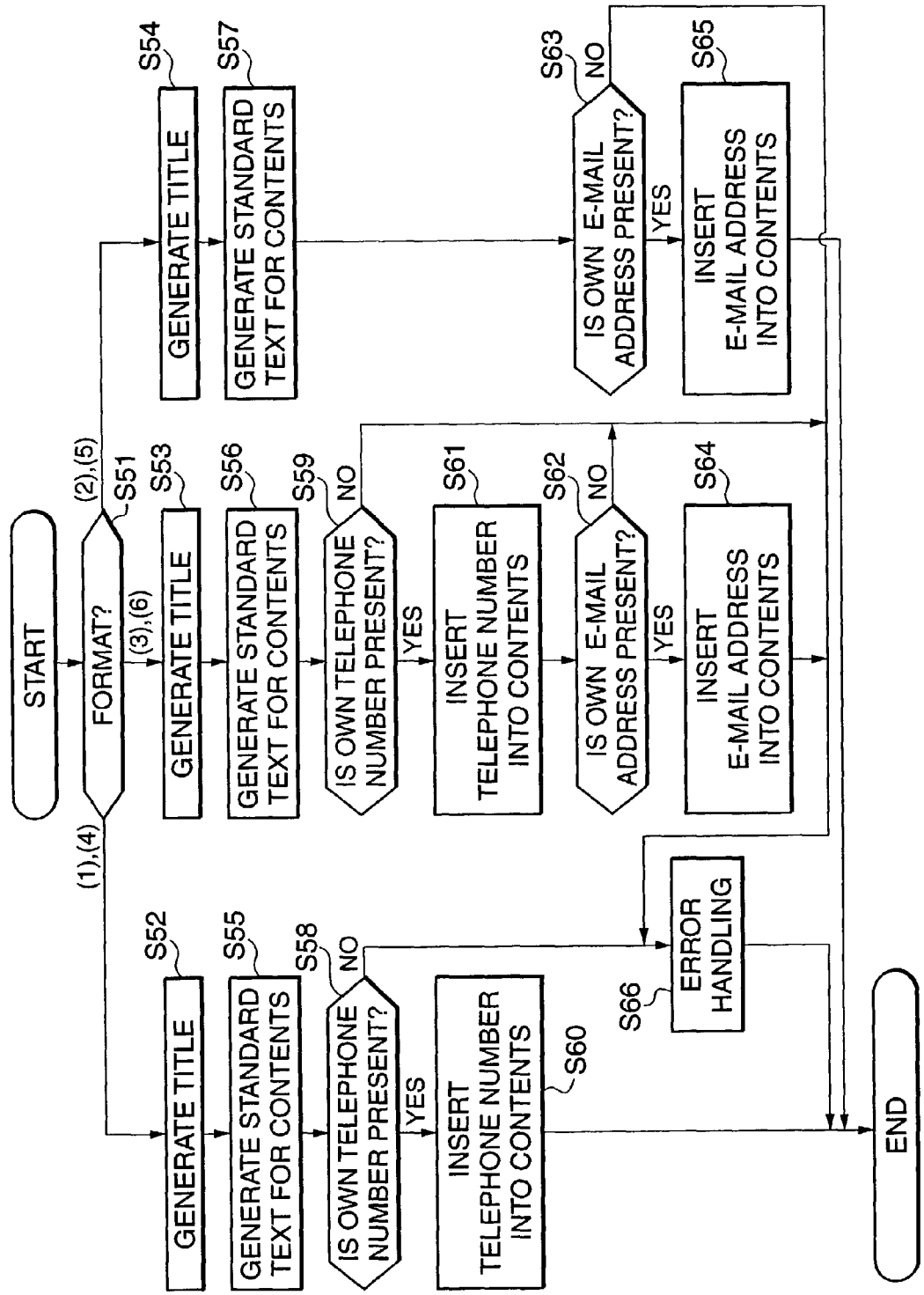
FIG. 10 is a flowchart showing the procedure for a e-mail generation process in step S3 in FIG. 4.

FIG. 10 is a flowchart showing the procedure for the e-mail generation process in step S3 of FIG. 4. First, a format in which the e-mail is to be generated is determined (step S51). When the format (1) or (4) is selected, when the format (2) or (5) is selected, and when the format (3) or (6) is selected, character strings that are suitable for these respective formats are selected as the titles of the e-mail (steps S52, S53, S54).

Also, a text that is determined in advance for each format is selected as a standard text, such as a greeting, for informing a recipient of the contents of the e-mail (step S55, S56, S57). After this, the "telephone number" and/or "e-mail address" that are the unique information of the user are/is inserted into the format.

That is, when the generated e-mail indicates only the user's telephone number, it is determined once again whether the user's telephone number is registered in the SRAM 114 (step S58).

When the result of this determination is not correct, error handling that cancels the e-mail generation process is executed (step S66), and the process is terminated. On the other hand, when the result of this determination is correct, the telephone number read from the SRAM 114 is inserted at a predetermined location in the e-mail contents (step S60). After this, the present process is terminated.

When the generated e-mail indicates only the user's e-mail address, it is determined once again whether the user's e-mail address is registered in the SRAM 114 (step S63). When the result of this determination is not correct, error handling that cancels the e-mail generation process is executed (step S66), and the present process is terminated. On the other hand, when the result of this determination is correct, the e-mail address read from the SRAM 114 is inserted at a predetermined location in the e-mail contents (step S65). After this, the present process is terminated.

When the generated e-mail notifies other users of both the user's telephone number and e-mail address, it is determined once again whether the user's telephone number and e-mail address are registered in the SRAM 114 (steps S59, S62). When the result of this determination is not correct, error handling for canceling the e-mail generation process is executed (step S66), and the present process is terminated. On the other hand, when the result of this determination is correct, the telephone number and e-mail address read from the SRAM 114 are inserted at predetermined locations in the e-mail contents (steps S61, S64). After this, the present process is terminated.

Once the e-mail to be transmitted has been generated in this way, the facsimile apparatus commences the actual transmission of the e-mail.

Figure 11:
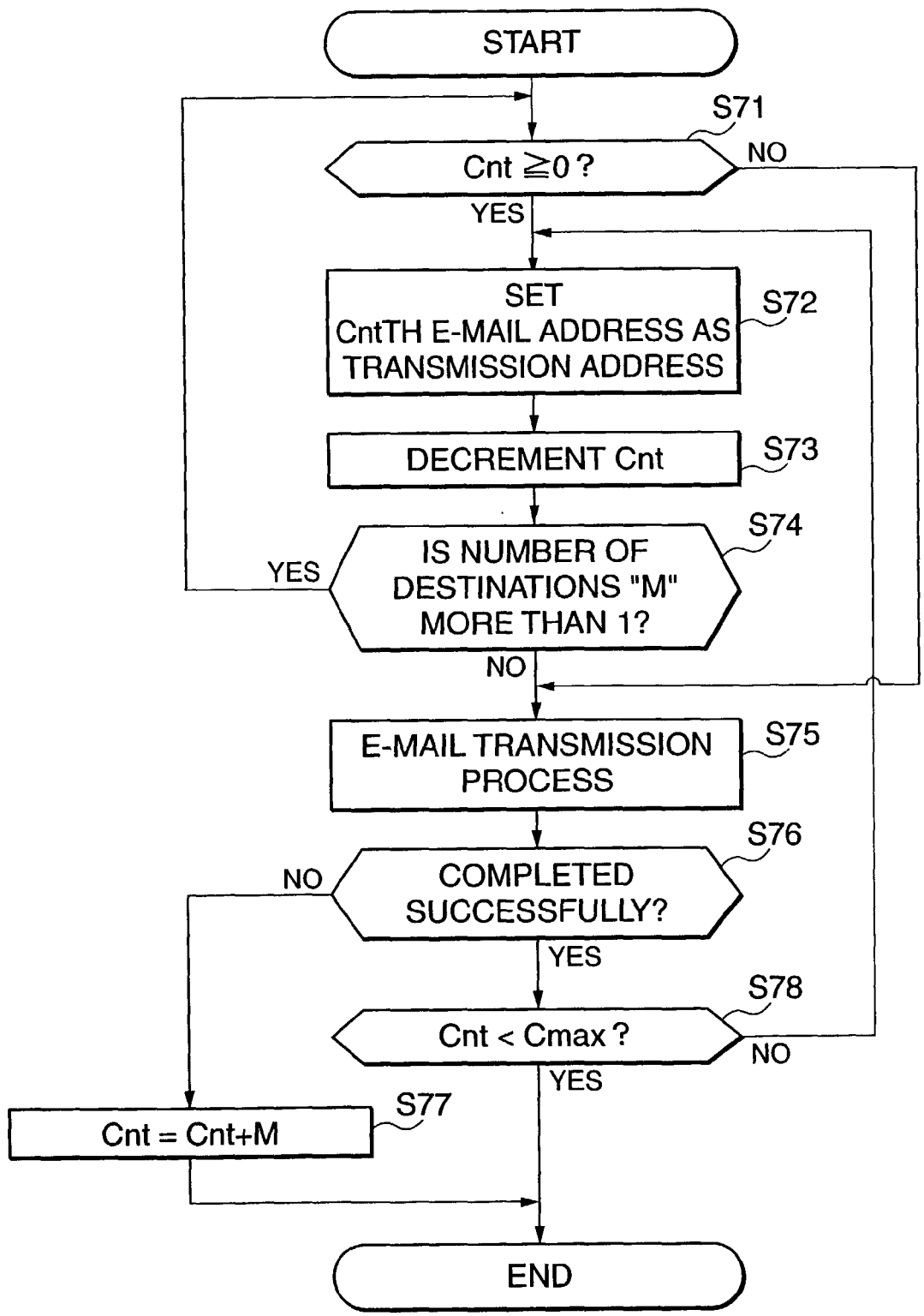
FIG. 11 is a flowchart showing the procedure for an e-mail transmission process in step S4 in FIG. 4.

FIG. 11 is a flowchart showing the procedure for the e-mail transmission process in step S4 in FIG. 4. Here, "Cnt" denotes the number of e-mail addresses stored in the transmission e-mail address buffer. The number of addresses Cnt is in fact managed separately for the domestic transmission e-mail address buffer 511 and the international transmission e-mail address buffer 521, but when e-mail is transmitted, no distinction is made between the buffers and the total number of e-mail addresses is shown by "Cnt".

First, the number of addresses Cnt is checked (step S71). For example, when fifty e-mail addresses have been stored in the domestic transmission e-mail address buffer 511, Cnt≧0, so that the $Cnt^{th}$ e-mail address is stored in the transmission address buffer that is actually used for transmitting e-mail (step S72). After the $Cnt^{th}$ e-mail address has been stored, the value of the number of addresses Cnt is decremented (step S73).

It is then determined whether the number of destinations to which e-mail can be sent in a single transmission by the facsimile apparatus is more than 1 (step S74). Here, the number of destinations to which e-mail can be sent in a single transmission is set as "M". For example, when it is possible according to the facsimile apparatus specification to send e-mail to only one destination in a single transmission, the transmission of e-mail is performed without further processing (step S75). On the other hand, when it is possible to send e-mail to a plurality of destinations in a single transmission, it is determined whether any e-mail addresses to which e-mail has not been transmitted are left in the domestic transmission e-mail address buffer 511.

In this way, the process returns to step S71 and the same processing is repeated until there are no more e-mail addresses, to which e-mail remains to be transmitted, in the domestic transmission e-mail address buffer 511 or the number of destinations to which e-mail can be sent by a single transmission is reached. Once the preparation of addresses for e-mail transmission has been completed, the e-mail is actually transmitted. It should be noted that the conventional technique is used as the transmission protocol for e-mail, and therefore this will not be described.

Next, it is determined whether the transmission of the e-mail has been successful or the transmission has been discontinued for whatever reason (step S76). When the transmission has been successful, it is determined whether there are any e-mail addresses to which transmission has not been performed yet in the transmission e-mail address buffer (step S78). That is, when Cnt≧Cmax so that there are remaining e-mail addresses, the process returns to step S72 and the same processing is repeated. Here, Cmax represents the value that limits the number of e-mail addresses to be stored in the transmission e-mail address buffer, and the value Cmax may be set at a value of 1, for example. On the other hand, when Cnt<Cmax, there are no remaining e-mail addresses, and therefore the process is terminated.

When the determination in step S76 finds that the e-mail transmission has been discontinued, the maximum value M is added to the number of addresses Cnt so that the number of e-mail addresses in the transmission e-mail address buffer to which e-mail has not been transmitted yet is stored (step S77). By doing so, the e-mail address to which e-mail has not been transmitted yet can be managed, so that even if the e-mail transmission process is discontinued, the resumed transmission of e-mail can be performed for only the addresses to which e-mail has not been transmitted. In step S71, when the condition Cnt≧0 does not hold (NO), the process proceeds to step S75.

In the state transition of screens in FIG. 7, when the transmission process is discontinued during the transmission of e-mail for whatever reason, an indication that the transmission of e-mail has been discontinued is provided on a screen 708.

Thereafter, when the user makes a selection, the user is informed by a message on a screen 705 that there is a process that has been discontinued. At this point, the user can select a resumption of the discontinued processing ("resume") or a deletion of the processing ("delete"). When "resume" has been selected, the number Cnt that was calculated in step S77 of FIG. 11 and shows the number of e-mail addresses to which e-mail has not been transmitted is accessed, and as indicated on a screen 706, the e-mail transmission process is resumed from the point at which it was discontinued.

On the other hand, when "delete" is selected on the screen 705, the value of the number of addresses Cnt is cleared to zero on a screen 707, and the processing is canceled. When all of the e-mails have been transmitted successfully, the user is informed by a message on a screen 709 that the transmission has been completed, thus completing one series of the e-mail transmission process.

In this way, the user can easily transmit e-mail that notifies users of e-mail addresses registered in the user's telephone directory list of the user's telephone number and/or e-mail address.

Second Embodiment

The mechanical and electrical construction of a facsimile apparatus according to a second embodiment of the present invention is the same as that of the first embodiment described above, description of which is therefore omitted.

Figure 12:
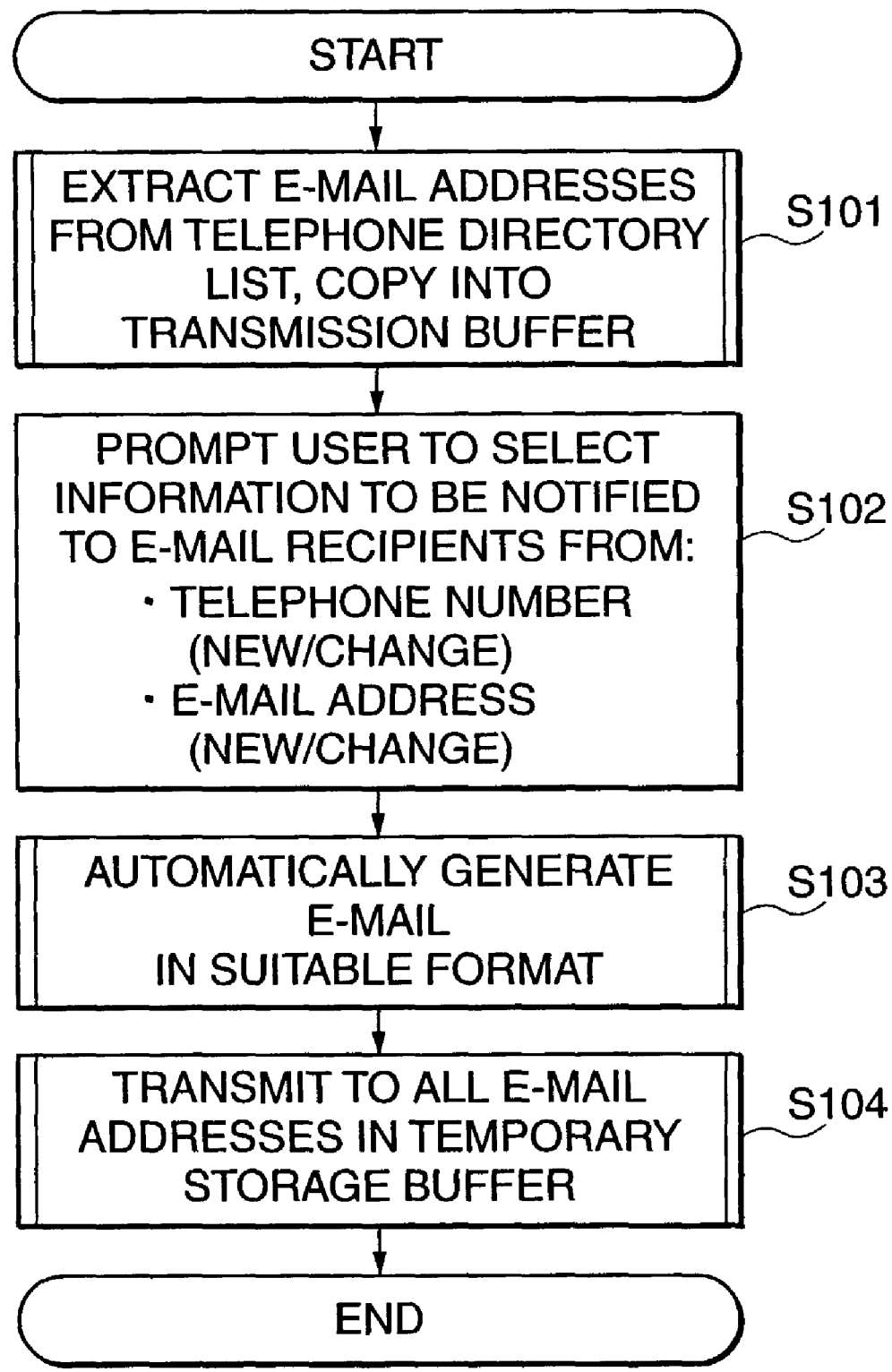
FIG. 12 is a flowchart showing the procedure for a notification process for the user's telephone number and e-mail address through an automatic transmission of e-mail according to a second embodiment of the present invention.

FIG. 12 is a flowchart showing the procedure for notification process for the user's telephone number and e-mail address through an automatic transmission of e-mail according to the second embodiment. A program for executing the process is stored in the ROM 102 and is executed by the CPU 101.

First, information on e-mail addresses only is extracted from the telephone directory list provided in the facsimile apparatus and is copied into a temporary storage buffer (step S101). After this, the user that possesses the facsimile apparatus is prompted to select information to be transmitted by e-mail (step S102). At this point, a selection of whether this information is being newly indicated or notified or is a change to information that was previously indicated or notified is made. In the present embodiment, the user selects the transmission by e-mail of a telephone number (new/changed) or an e-mail address (new/changed).

E-mail is automatically generated based on a suitable format for the transmission contents that was selected in step S102 (step S103). The e-mail that is generated in step S103 is transmitted to all of the e-mail addresses that were copied into the temporary storage buffer in step S101 (step S104). After this, the process is terminated.

The data structure of the telephone directory list provided in the facsimile apparatus and the data structure of the transmission e-mail address buffer are the same as those shown in FIG. 5.

In the second embodiment, two types of transmission e-mail address buffer, i.e., domestic and international buffers, do not need to be provided.

Figure 13:
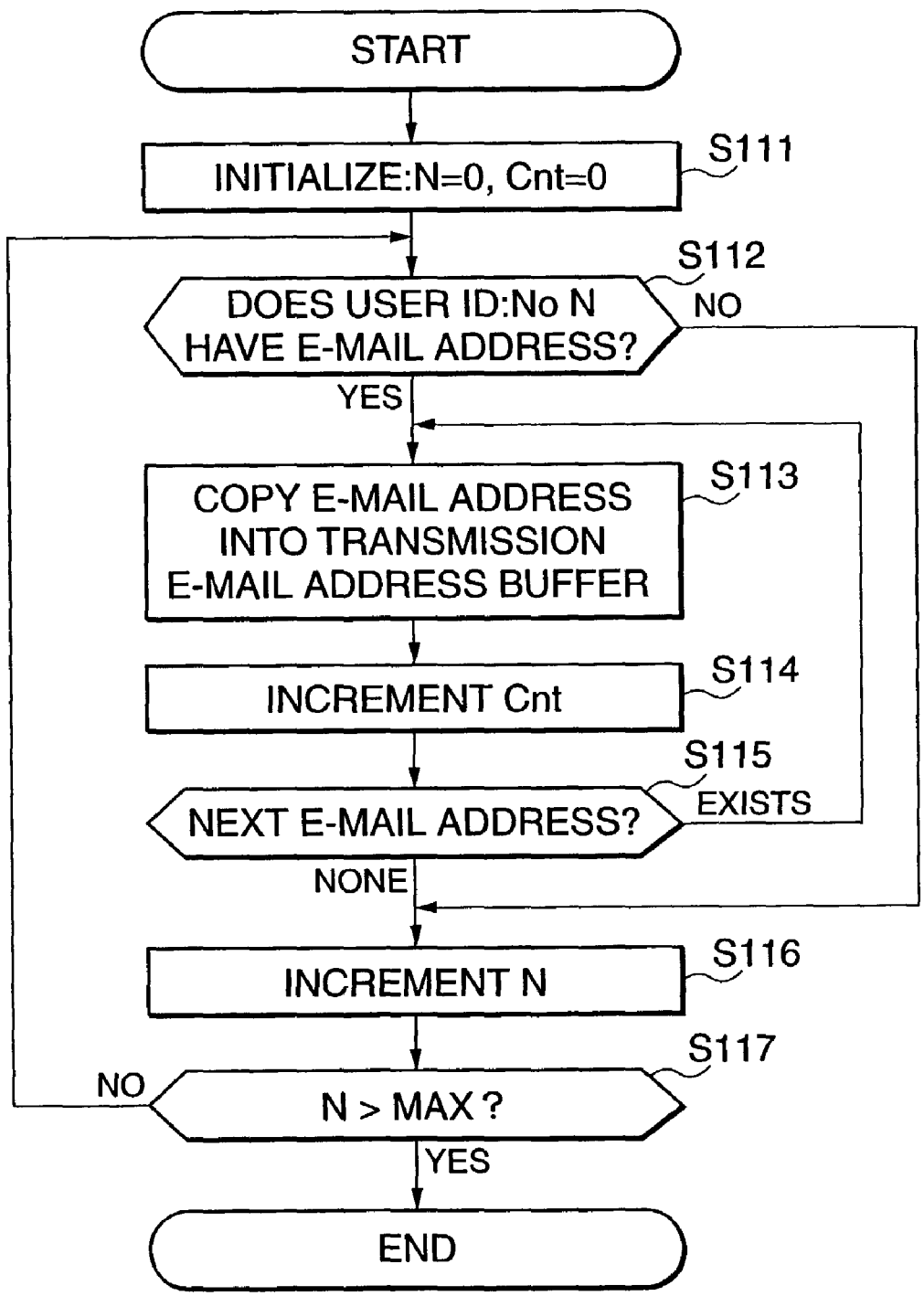
FIG. 13 is a flowchart showing the procedure for processing in step S101 in FIG. 12 that extracts e-mail addresses from the telephone directory list and copies the e-mail addresses into a transmission e-mail address buffer.

FIG. 13 is a flowchart showing the procedure for the process in step S101 in FIG. 12 that extracts e-mail addresses from the telephone directory list and copies the e-mail addresses into a transmission e-mail address buffer.

This process is almost the same as the process in FIG. 6 in the first embodiment, but only one type of transmission e-mail address buffer needs to be used in this second embodiment, with only this address buffer being initialized (step S111). There is also no need to determine whether an e-mail address is a domestic address (step S13).

Figure 14A:
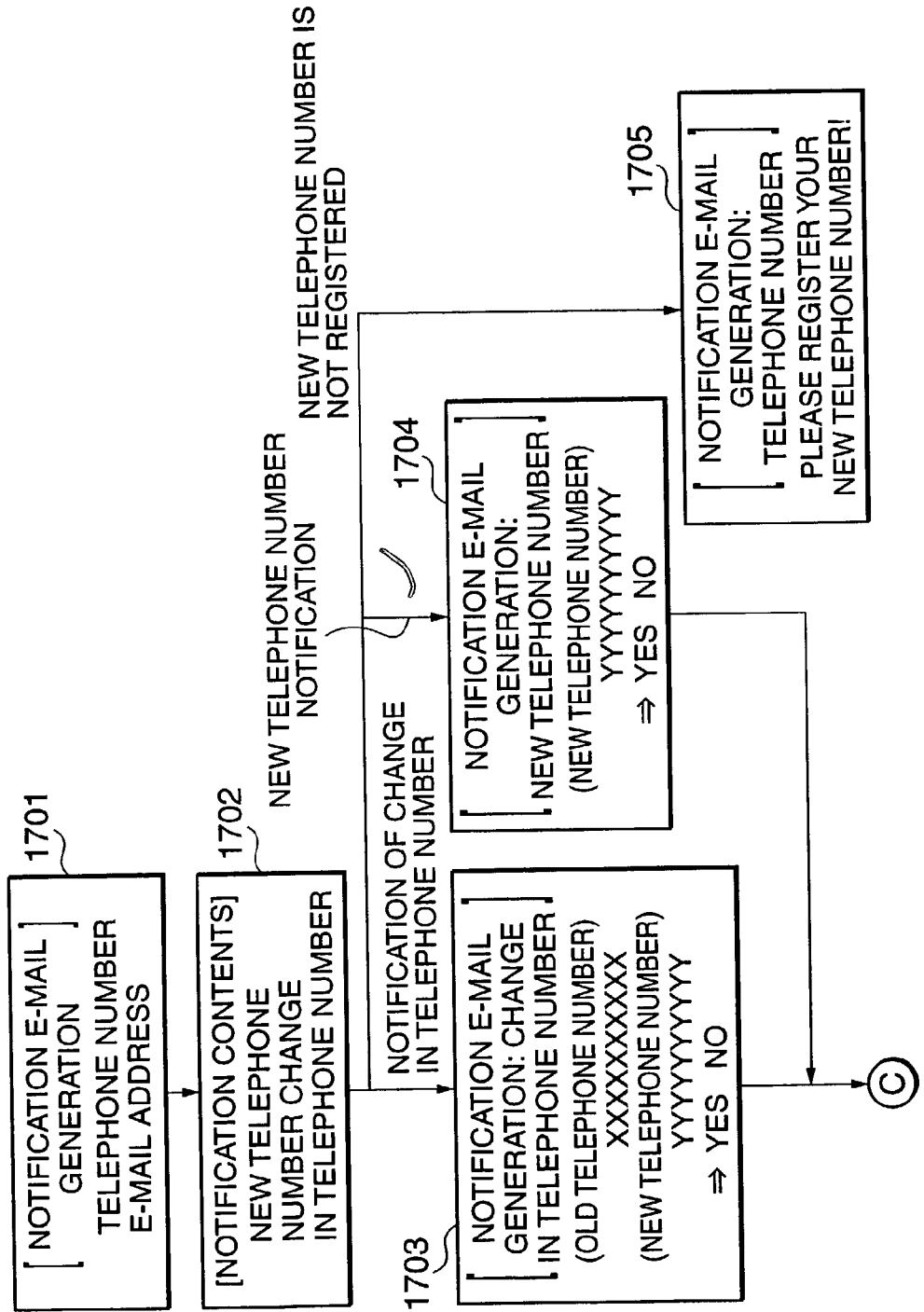
FIG. 14 is a diagram showing a state transition of a display screen of the facsimile apparatus when the user transmits e-mail for a notification relating to the user's telephone number.
Figure 14B:
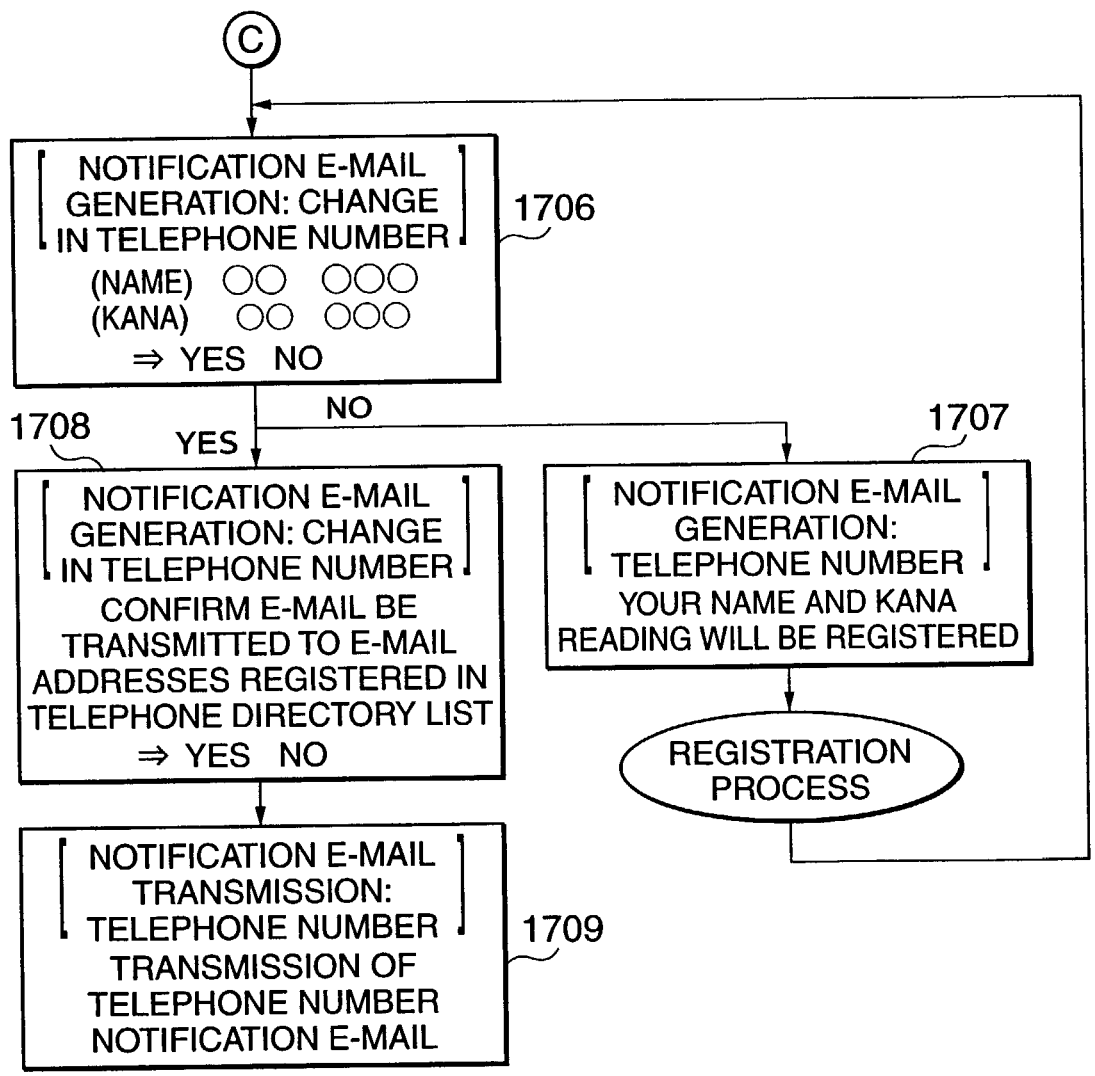

FIG. 14 is a diagram showing a state transition of the display screen of the facsimile apparatus when the user transmits e-mail for a notification relating to the user's telephone number. First, on a screen 1701, the user selects information to be transmitted by e-mail. When the user wishes to indicate the user's telephone number, "TELEPHONE NUMBER" is selected. When the user wishes to indicate the user's e-mail address, "E-MAIL ADDRESS" is selected. Here, the case when "TELEPHONE NUMBER" is selected will be described.

When "TELEPHONE NUMBER" is selected on the screen 1701, on a screen 1702 it is selected whether a new telephone number or a change in telephone number is to be indicated. When a change in telephone number is selected, on a screen 1703 the old telephone number and a new telephone number that are registered in a storage device (SRAM 114) of the facsimile apparatus are displayed. When a new telephone number is selected on the screen 1702, on a screen 1704 the new telephone number registered in the storage unit of the facsimile apparatus is displayed. At this point, when the numbers that need to be displayed on the screens 1703, 1704 respectively have not been registered in the storage device of the facsimile apparatus, on a screen 1705 a message that prompts the user to register the required telephone numbers is displayed and the process is canceled.

When "YES" is selected on the screens 1703, 1704, the name and kana reading that are registered in the storage device of the facsimile apparatus are displayed on a screen 1706. At this point, when the required information has not been registered or "NO" is selected, on a screen 1707 the process proceeds to input processing for the name and kana reading to be inserted into the transmitted e-mail. When the name and kana reading have been registered on the screen 1707, confirmation is performed again on the screen 1706.

When "YES" is selected on the screen 1706, a confirmation as to whether e-mail for a notification of the user's telephone number is to be transmitted is performed on a screen 1708. When "YES" is selected, an e-mail is generated based on the old telephone number, new telephone number, name, and kana reading, and transmission is performed on a screen 1709.

Figure 15A:
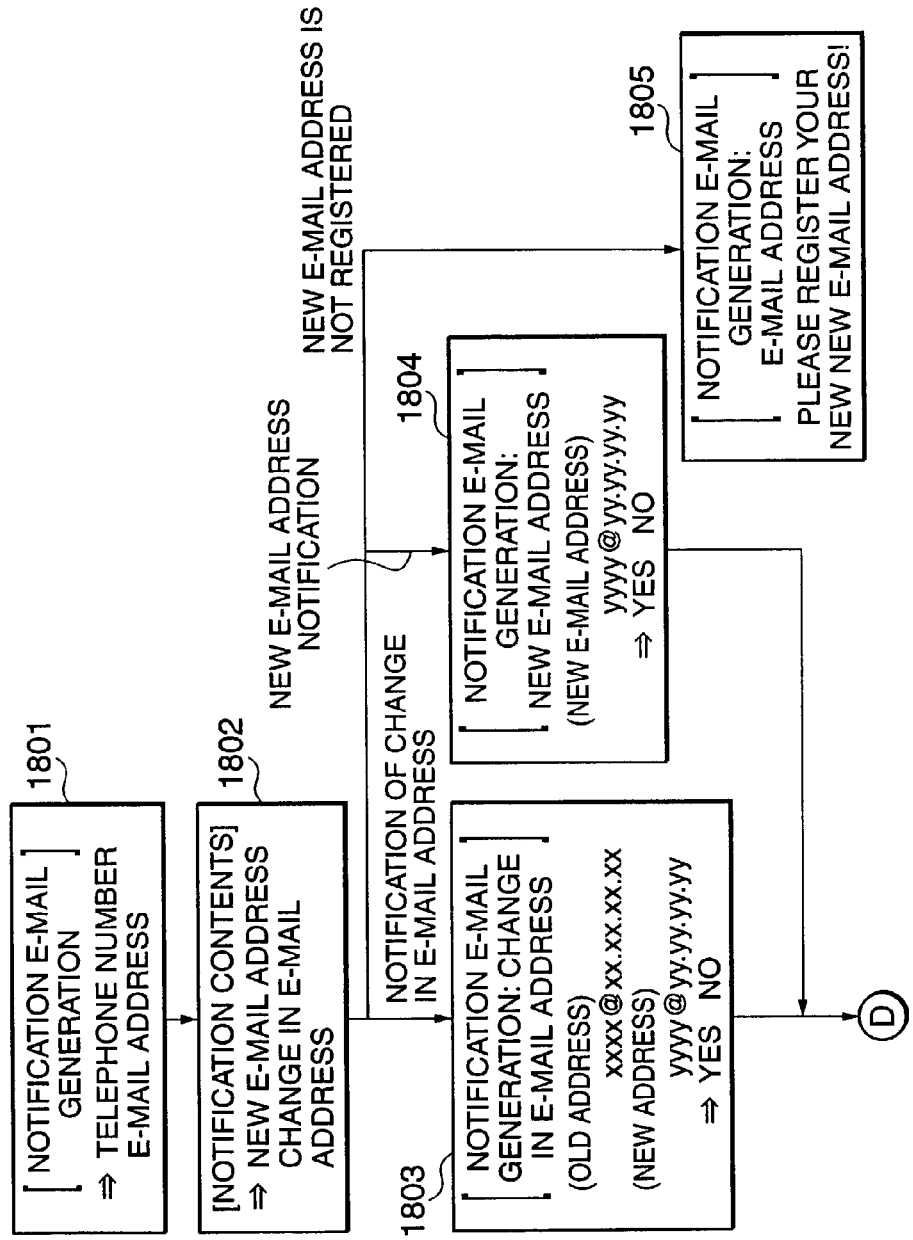
FIG. 15 is a diagram showing a state transition of a display screen of the facsimile apparatus when the user transmits e-mail for a notification relating to the user's e-mail address.
Figure 15B:
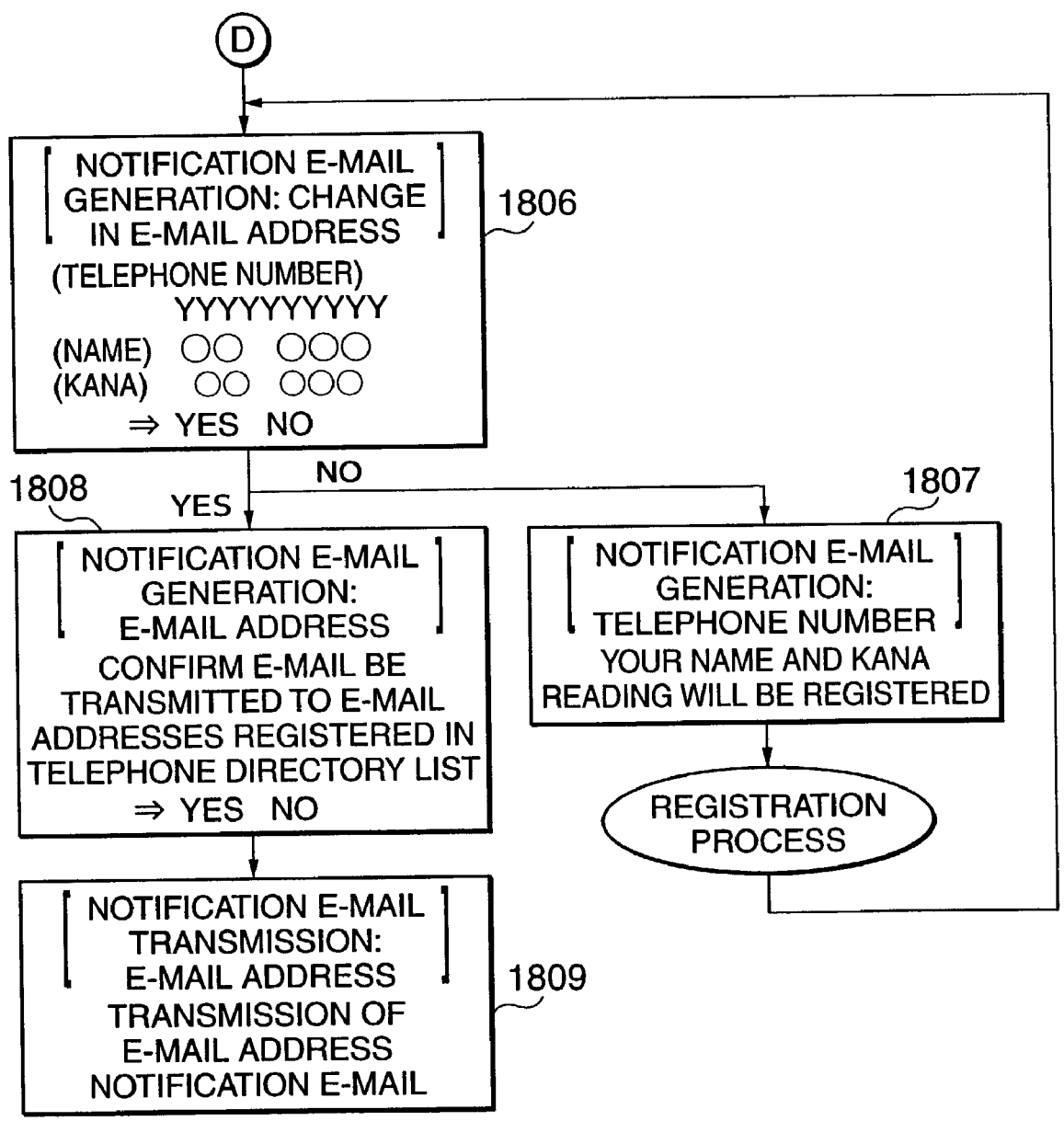

FIG. 15 is a diagram showing a state transition of the display screen of the facsimile apparatus when the user's e-mail address has been selected on the screen 1701 in FIG. 14.

On a screen 1807, registration is performed for the user's name, kana reading, and telephone number. However, when the user's e-mail address is to be indicated, such information is not essential and therefore does not need to be inputted. Also, the user's name, kana reading, and telephone number do not need to be displayed on a screen 1806.

Apart from this, the procedure for the processing is the same as in FIG. 14, and therefore description thereof is omitted.

FIG. 16 is a diagram showing the formats of e-mail for notifications of user information. In the present embodiment, as designated by reference numeral 901, predetermined formats for the "TITLE" and "TEXT (CONTENTS)" of the e-mail are provided in advance in the facsimile apparatus.

Here, in order to generate a format that can be understood by recipients and is suited to an automatic obtaining of information by recipient terminals, e-mail is generated in accordance with the rules designated by reference numerals 902 to 908. In the present embodiment, type character strings representing the attributes of information, such as "NEW TELEPHONE NUMBER" designated by reference numeral 902 and "OLD TELEPHONE NUMBER" designated by reference numeral 903, are inserted into the contents of the e-mail as consecutive character strings. Character strings that represent the information contents are inserted consecutively following these type character strings. It should be noted that the character strings representing the information contents include those represented by a 1-byte (single-byte) code and those represented by a 2-byte (double-byte) code. After this, a code showing the end of the information contents, such as a line feed code, is inserted following the information contents.

If e-mail is generated according to these rules, when a terminal that has received this e-mail is comprised of a controller that can handle the rules and perform processing according to the rules in the present embodiment, the terminal can automatically acquire information data from the contents of the e-mail, with the recipient also being able to understand the contents. In FIG. 16, reference numerals 909 to 912 designate actual examples of e-mail formats (a) to (d).

The actual e-mail transmission processing is then executed using the same procedure as the flowchart shown in FIG. 11 of the first embodiment described above. Here, Cnt represents the number of e-mail addresses stored in the transmission e-mail address buffer.

In this way, with the facsimile apparatus of the second embodiment, e-mail that is suited to the purpose can be automatically generated and transmitted to e-mail addresses that are registered in the telephone directory list.

The first and second embodiments of the present invention have been described above, but the present invention is not limited to these embodiments and can be applied to any construction that is capable of achieving the functions that are disclosed by the appended claims or the functions of the constructions of the embodiments.

For example, although in the first and second embodiments every e-mail address in the user information that is registered in the telephone directory list is copied into the transmission e-mail address buffer, the user may conceivably not wish to notify certain users, in which case it may be possible to set in advance users whose e-mail addresses are to be copied from the telephone directory list into the transmission e-mail address buffer.

The present invention may either be applied to a system composed of a plurality of apparatuses (e.g. a host computer, interface equipment, a reader, and a printer) or to a single apparatus.

It is to be understood that the object of the present invention may also be accomplished by supplying a system or an apparatus with a program code of software which realizes the functions of the above described first or second embodiment, and causing a computer (or CPU or MPU) of the system or apparatus to execute the supplied program code.

In this case, the program code itself realizes the novel functions of the present invention, and hence the program code and a storage medium on which the program code is stored constitute the present invention.

A program code representing the flowcharts of FIGS. 4, 6, 9, 10, and 11 of the first embodiment, or the flowcharts of FIGS. 12, and 13 of the second embodiment is stored in a ROM as a storage medium. However, the storage medium for supplying the program code is not limited to a ROM, and a floppy (registered trademark) disk, a hard disk, an optical disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a download performed via a network may be used.

According to the present invention, the automatic generation of e-mail for notifications when there is a change in the user's e-mail address and/or telephone number and the automatic transmission of such e-mail to destinations registered in the telephone directory list that have e-mail addresses reduces the labor and time required to notify a change in the user's e-mail address. E-mail can also be transmitted with due consideration to cases where the recipient of the e-mail is a terminal that cannot receive Japanese character codes. Also, when the transmission of a series of e-mails is discontinued, the transmission can be resumed from the point where the transmission was discontinued.

Further, according to the present invention, by writing information that the e-mail sender wishes to provide to the recipients according to special rules, the recipients are able to understand the information from the text as it is, and when recipient terminals that have received this e-mail have a controller that can cope with or handle the special rules, the terminals can automatically perform suitable processing on the information that the e-mail sender has provided, so that the e-mail can be transmitted without having to be conscious of whether the recipients are capable of automatically rewriting information. As a result, this lessens the burden of selecting the recipients of e-mail transmissions.

Third Embodiment

The mechanical and electrical construction of a facsimile apparatus according to a third embodiment of the present invention is the same as that of the first embodiment described above, description of which is therefore omitted.

First, a case where the user's telephone number is notified by an automatic transmission of e-mail will be described. In the third embodiment, there are carried out a process for indicating the user's telephone number by e-mail to users, out of the users in the telephone directory list provided in the user's facsimile apparatus, that have e-mail addresses and a process for receiving e-mail for a notification of a telephone number.

Figure 17:
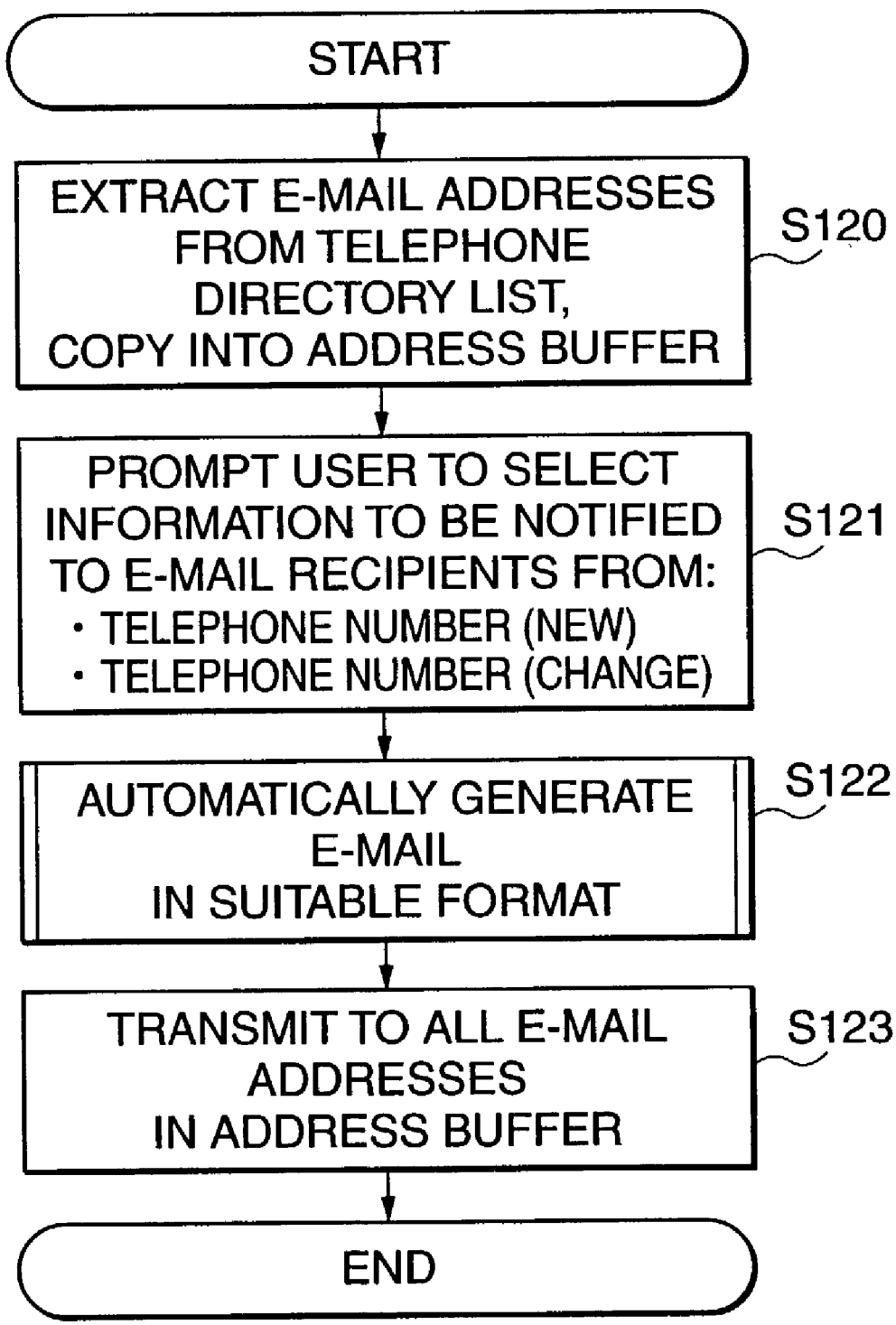
FIG. 17 is a flowchart showing the procedure for a notification process for the user's telephone number through an automatic transmission of e-mail according to a third embodiment of the present invention.
Figure 21:
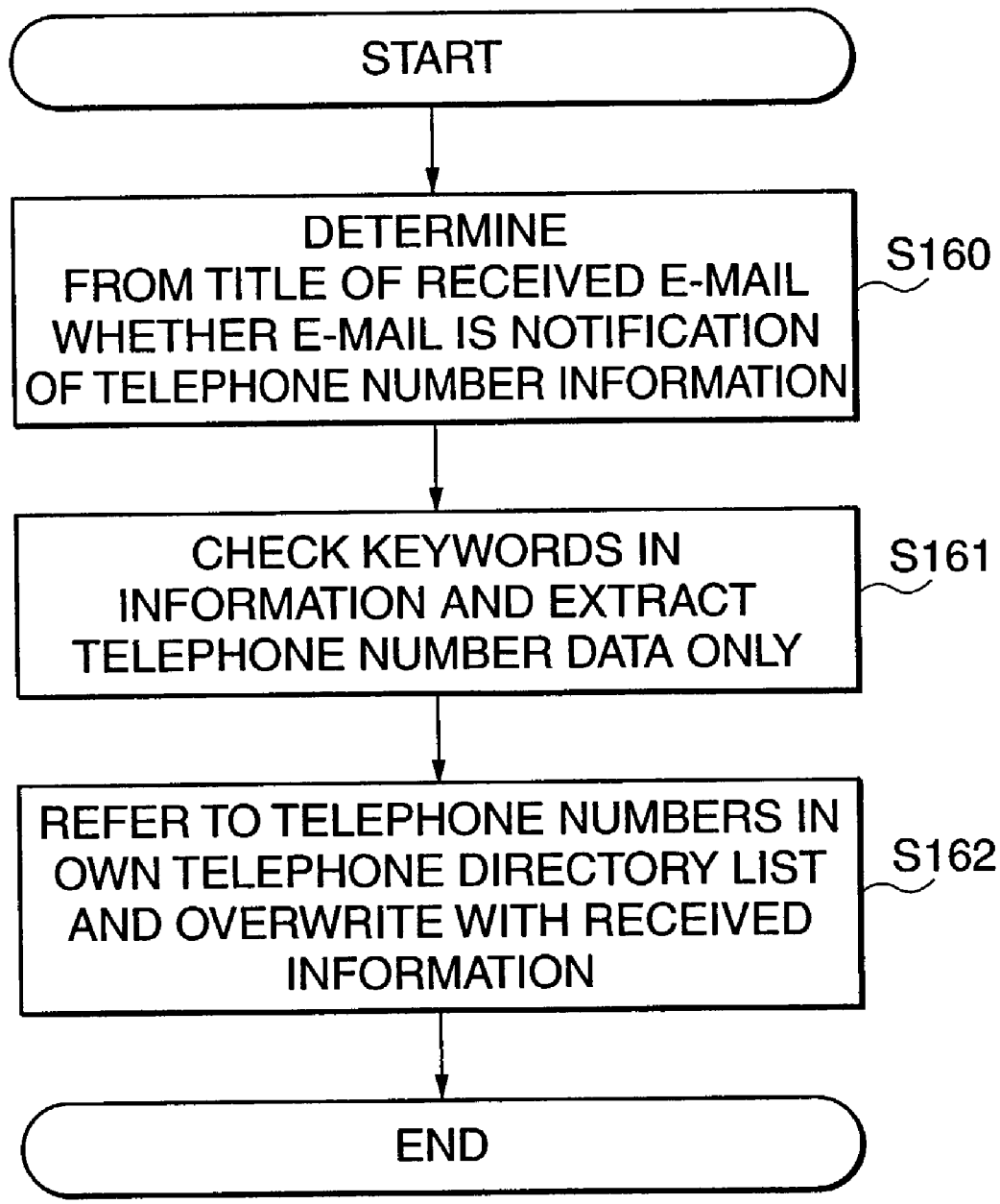
FIG. 21 is a flowchart showing the procedure for a reception process for a notified telephone number according to the third embodiment.

FIG. 17 is a flowchart showing the procedure for a notification process for the user's telephone number through an automatic transmission of e-mail. FIG. 21 is a flowchart showing the procedure for a reception process for the notified telephone number. Programs for executing these processes are stored in the ROM 102 and are executed by the CPU 101.

In the facsimile apparatus as a transmission terminal, information on e-mail addresses only is extracted from the telephone directory list provided in the facsimile apparatus and is copied into a temporary storage buffer (step S120). The user that possesses the facsimile apparatus is prompted to select information to be transmitted by e-mail (step S121). In the present embodiment, the user can notify a change in telephone number or notify a new telephone number by e-mail.

E-mail to be transmitted is automatically generated based on a suitable format for the notification content that the user selected in step S121 (step S122). The e-mail that is generated in step S122 is transmitted to the e-mail addresses that were copied into the temporary storage buffer in step S120 (step S123), and the process is terminated.

It should be noted that the data structure of the transmission e-mail address buffer and the data structure of the telephone directory list provided in the facsimile apparatus are the same as those shown in FIG. 5 of the first embodiment. Like the second embodiment, two types of transmission e-mail address buffer do not need to be provided.

The state transition of the display screen of the facsimile apparatus when notifying a telephone number is the same as in FIG. 14 of the second embodiment.

The formats designated by reference numerals 909 and 910 in FIG. 16 of the second embodiment are used as the format of the e-mail for a telephone number notification.

Figure 18:
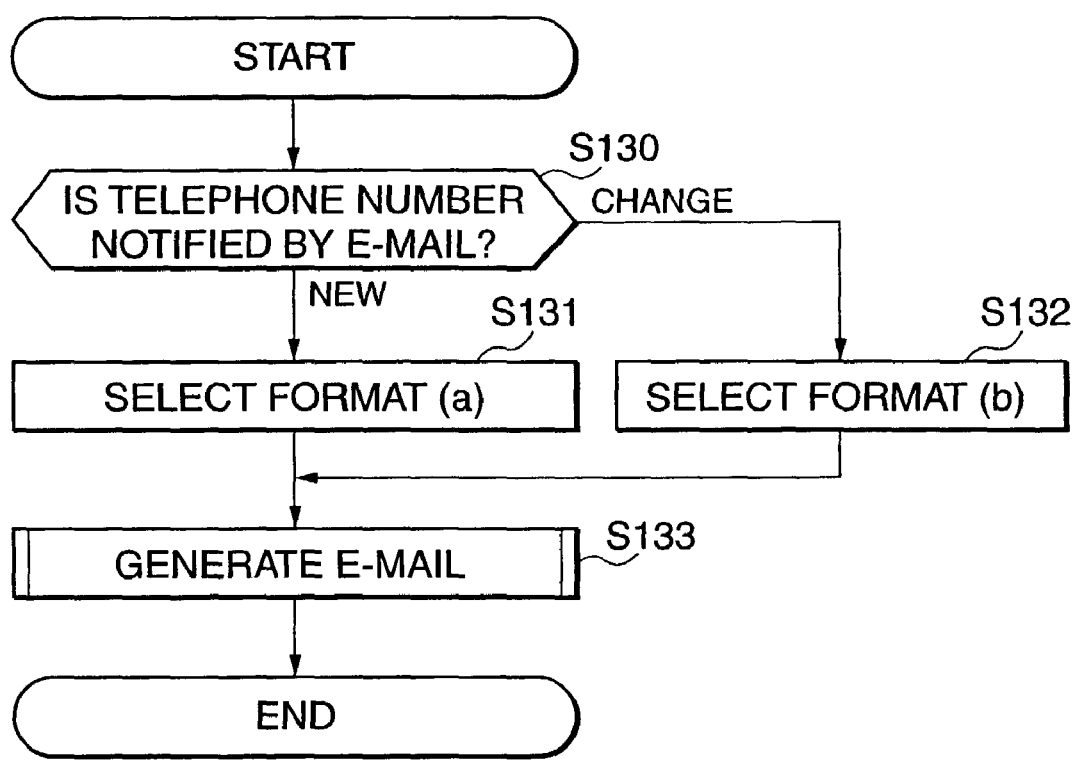
FIG. 18 is a flowchart showing the procedure for a selection process in step S122 that selects an e-mail format.

While the rules for generating a format suited to the notification content are the same as those in the second embodiment, in the present or third embodiment the notification content is the user's telephone number only, so that reference numerals 904 to 906 may not be required. Here, the format is selected in accordance the selection procedure shown in FIG. 18.

First, it is determined whether the telephone number that the e-mail is to indicate or notify is a new number or a number that has been changed (step S130).

When the telephone number is a new number, the format (a) is selected (step S131). On the other hand, when the telephone number has been changed, the format (b) is selected (step S132). After this, e-mail is generated using the selected format (step S133), and the present process is terminated.

Figure 19:
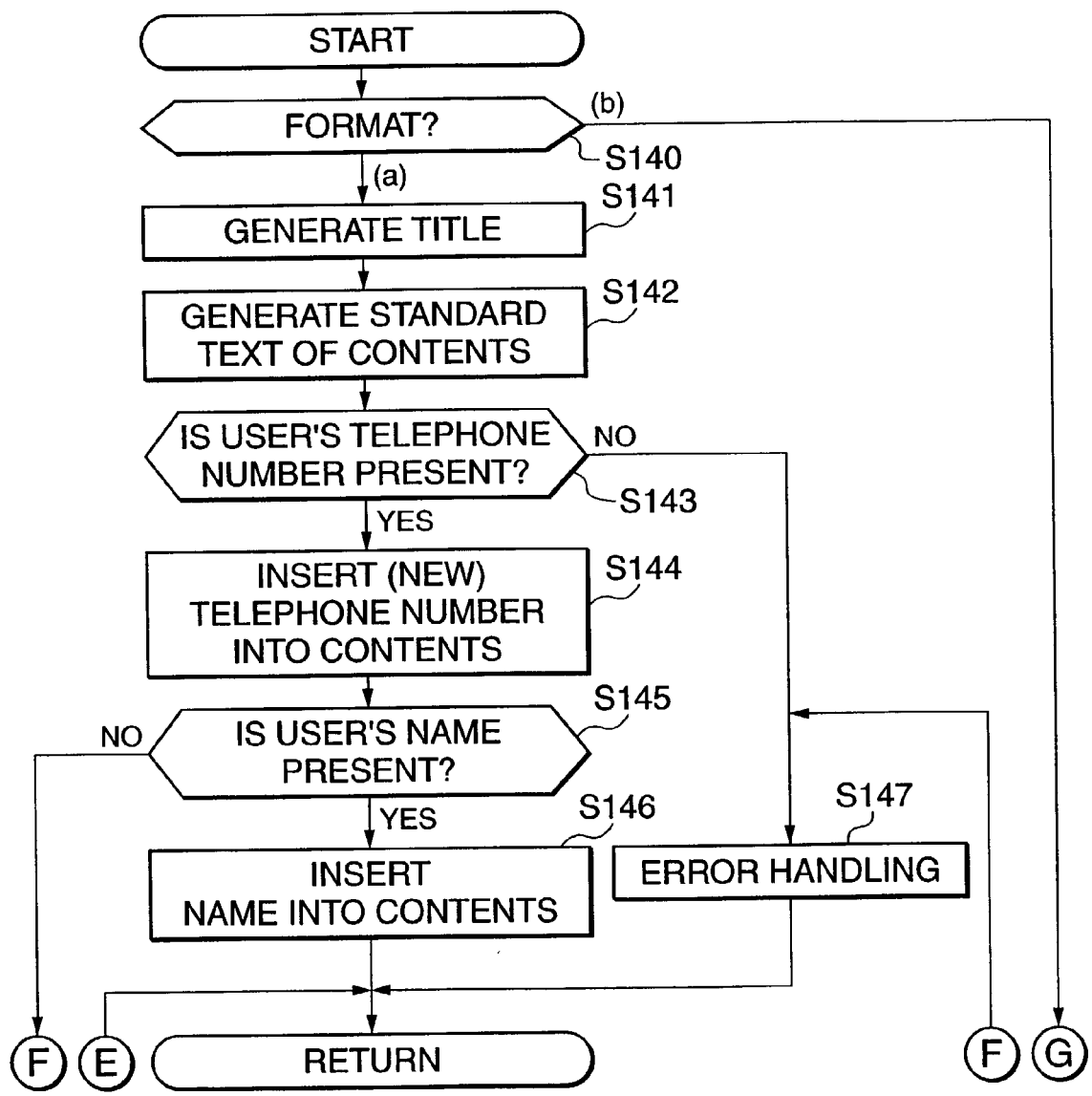
FIG. 19 is a flowchart showing the procedure for an e-mail generation process in step S133 in FIG. 18.
Figure 20:
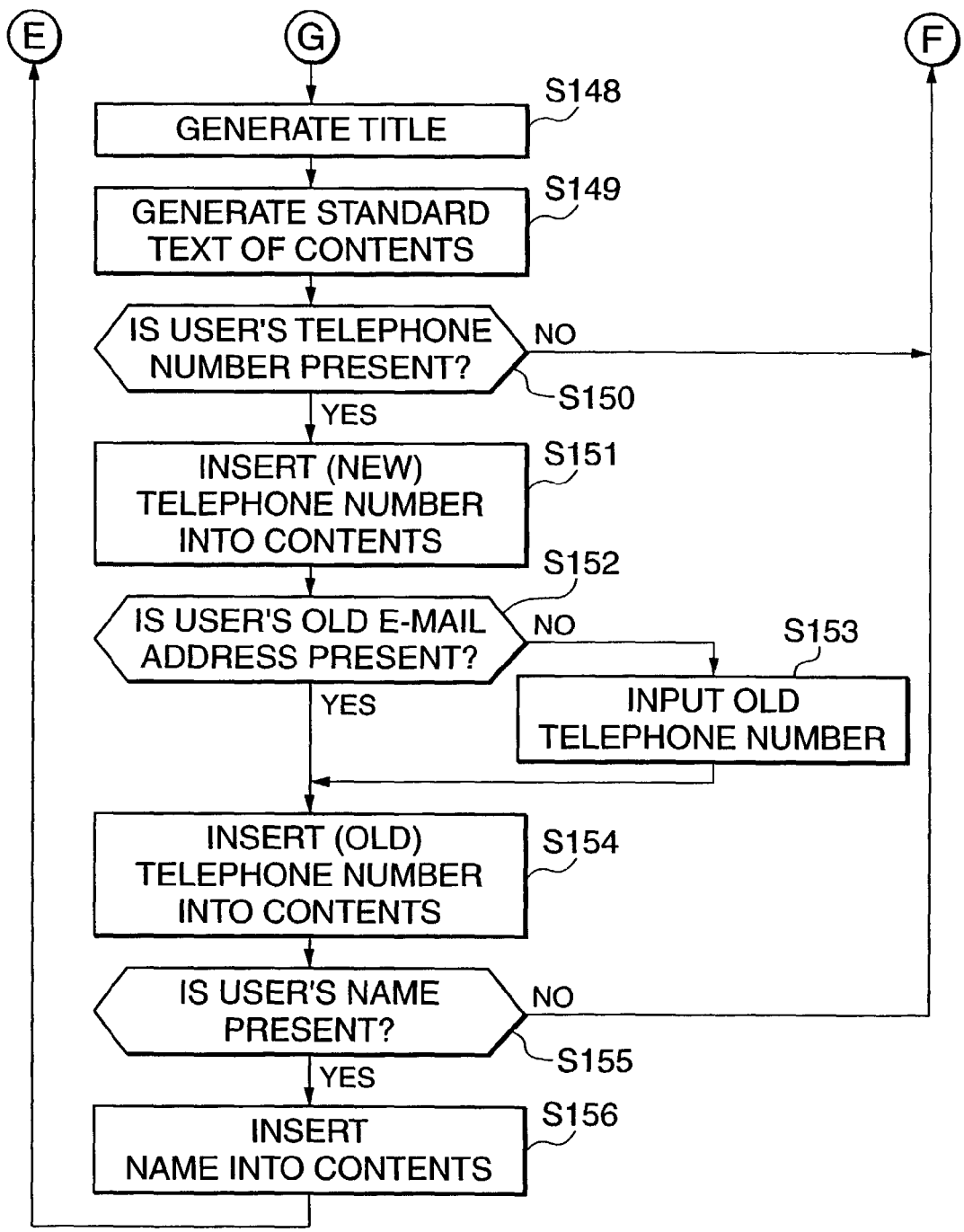
FIG. 20 is a continued part of the FIG. 19 flowchart.

FIGS. 19 and 20 are flowcharts showing the procedure for the e-mail generation process in step S133. First, the format in which the e-mail is to be generated is determined (step S140).

A character string in the format determined in step S140 is selected as the e-mail title (steps S141, S148). Also, sentences, such as a greeting, that are set in advance are selected as a standard text for informing the recipients of the contents of the e-mail (steps S142, S149). After this, a process for inserting the "TELEPHONE NUMBER" and "NAME" that are the unique user information into the format is performed.

That is, when the e-mail to be generated indicates the user's telephone number, it is determined whether the user's telephone number is registered in the SRAM 114 (step S143, S150). When the result of this determination is not correct, error handling is performed (step S147) and the process returns to the main routine. On the other hand, when the result of this determination is correct, the telephone number read from the SRAM 114 is inserted at a predetermined location in the contents of the e-mail (steps S144, S151).

When the format is for a notification of a change in the user's telephone number, it is determined whether the user's old telephone number is registered (step S152). When this telephone number is registered, the process proceeds to step S154, while when this telephone number is not registered, the old telephone number is inputted (step S153). After this, in the same way as with a new telephone number, the old telephone number is inserted at a predetermined location in the e-mail contents (step S154).

Next, it is determined whether the user's name has been registered (steps S145, S155). When the user's name has been registered, the name is inserted at a predetermined location in the e-mail contents (steps S146, S156) and the process returns to the main routine. On the other hand, when the user's name has not been registered, error handling is performed in step S147 and the process returns to the main routine.

Once the e-mail to be transmitted has been generated in this way, the facsimile apparatus commences the actual transmission of the e-mail.

The procedure for processing e-mail is the same as that shown in FIG. 11 of the first embodiment, and therefore will not be described.

Next, the operation on the recipient terminal side that receives the e-mail for a notification of a telephone number will be described. As shown in FIG. 21, the facsimile apparatus as a recipient terminal side analyses the title of the received e-mail in accordance with special rules (step S160).

When the analysis result shows that the received e-mail is an e-mail for a notification of a telephone number, character codes required for the telephone number are obtained from the contents of the received e-mail in accordance with the special rules (step S161). After this, the telephone directory list of the facsimile apparatus is accessed and the telephone number information of the received e-mail is reflected in the telephone directory list (step S162). Then, the present process is terminated.

Figure 22:
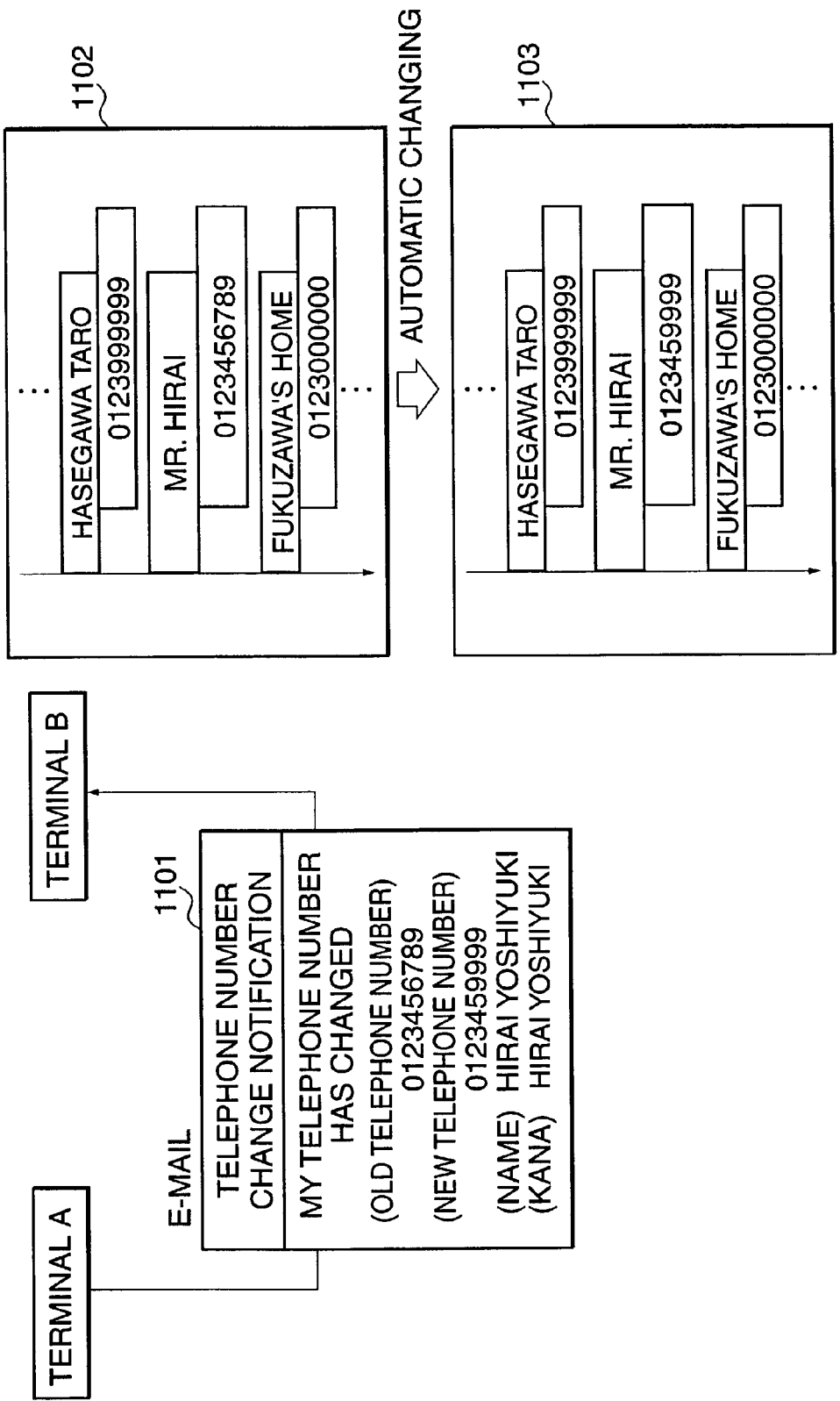
FIG. 22 is a diagram showing an operation of the facsimile apparatus after e-mail for notification of a telephone number has been received.
Figure 23:
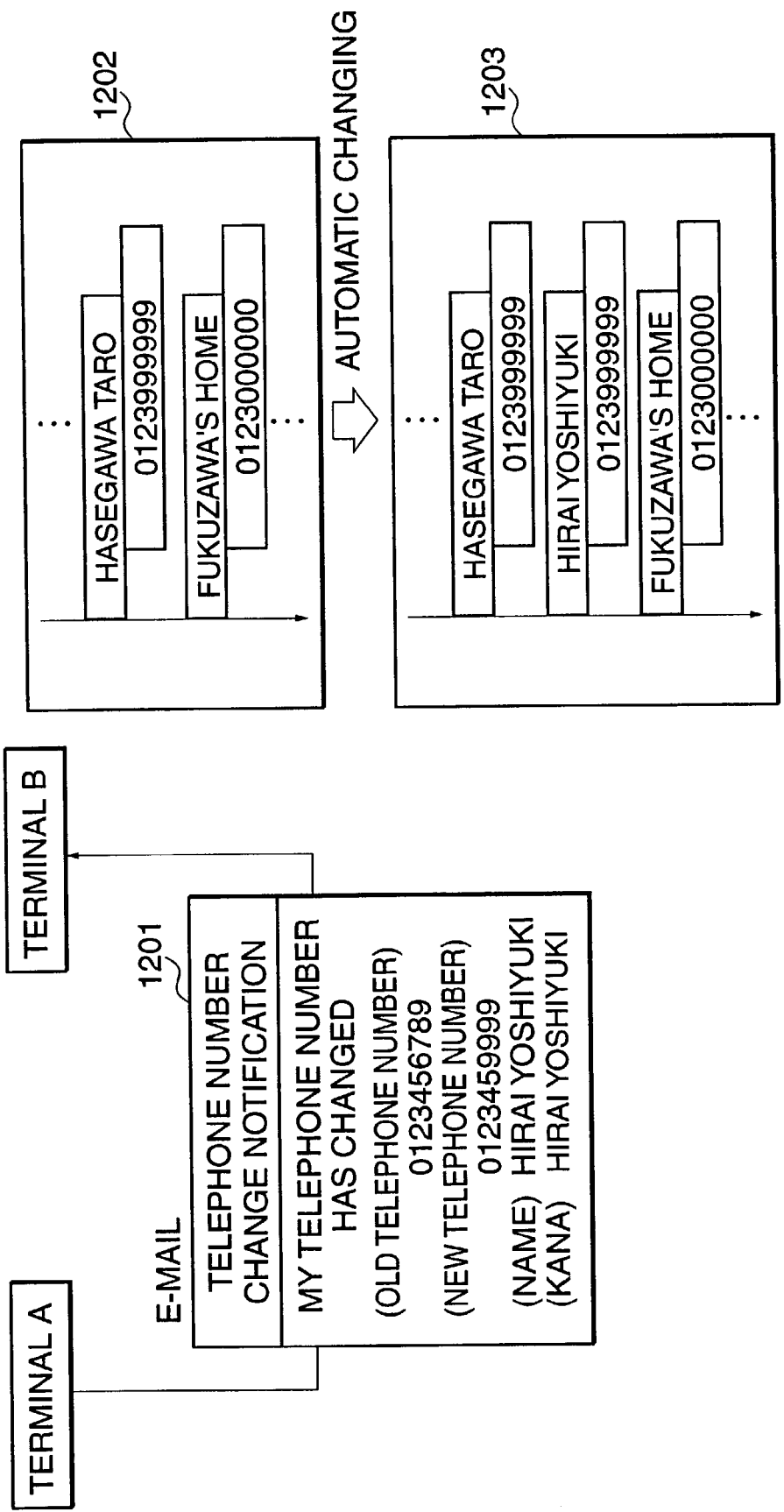
FIG. 23 is a diagram showing the operation of the facsimile apparatus after an e-mail for notification of a telephone number has been received.

FIGS. 22 and 23 are diagrams showing the operation of the facsimile apparatus after receiving e-mail for a notification of a telephone number. FIG. 22 is a diagram showing the operation when e-mail for a notification of a change in the telephone number has been received and the telephone number of the sender is present in the telephone directory list of the recipient terminal.

When an e-mail 1101 is sent from a sender terminal A, in a recipient terminal B the telephone number of "MR. HIRAI" in the telephone directory list 1102 thereof matches the old telephone number in the e-mail 1101, so that as shown in FIG. 22, the telephone number of "MR. HIRAI" in the telephone directory list 1103 thereof is changed to the new telephone number given in the e-mail 1101.

FIG. 23 is a diagram showing the operation in the case where an e-mail for a notification of a telephone number has been received but there is no telephone number of the sender in the telephone directory list of the recipient terminal or in the case where an e-mail for a notification of a new telephone number has been received. In a telephone directory list 1202 of the recipient terminal, the user indicated in the e-mail for the notification of the new telephone number is not present, so that the name and kana reading in the e-mail 1201 are read and "NAME (YOSHIYUKI HIRAI)" is registered in the telephone directory list 1203 thereof as shown in FIG. 23.

Figure 24:
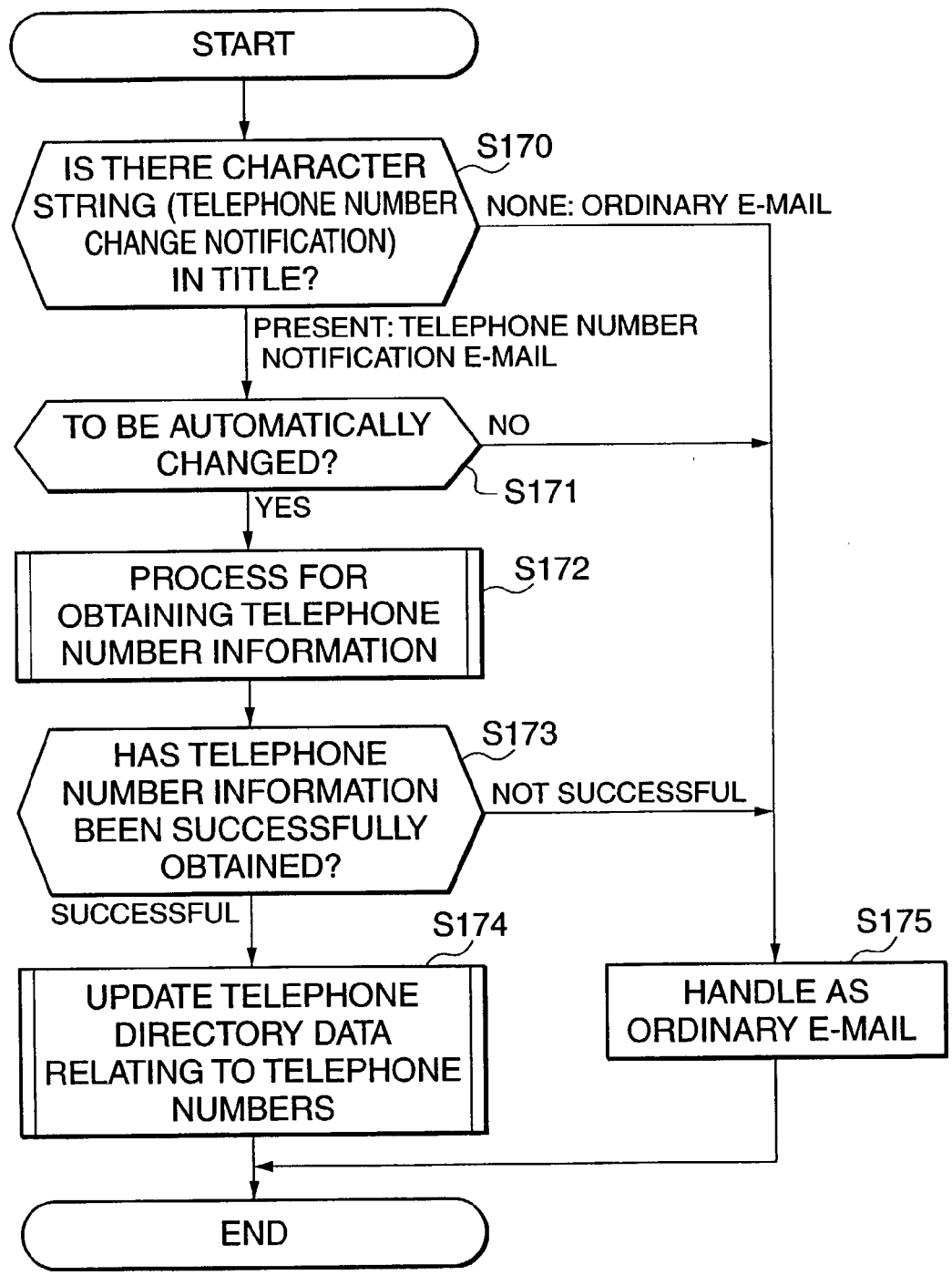
FIG. 24 is a flowchart showing the procedure for a process for reflecting information in the telephone directory list after an e-mail has been received.

FIG. 24 is a flowchart showing the procedure for a process for reflecting the contents of an e-mail in the telephone directory list following the reception of the e-mail. A program for executing this process is stored in the ROM 102 of the facsimile apparatus as the recipient terminal and is executed by the CPU 101. First, when the reception of the e-mail has been successful, the title of the received e-mail is checked (step S170). In this check, it is determined whether or not the e-mail relates to a telephone number notification. Here, when character codes for "TELEPHONE NUMBER CHANGE NOTIFICATION" are present consecutively in the title of the received e-mail, it is determined that the e-mail is for a notification of a telephone number. When character codes for "TELEPHONE NUMBER CHANGE NOTIFICATION" are not present consecutively, it is determined that the received e-mail is not for a notification of a telephone number, so that the received e-mail is handled as an ordinary e-mail (step S175). Then, the present process is terminated.

On the other hand, when the received e-mail is determined in step S170 to be for a notification of a telephone number, at the time of opening the e-mail, an query is made on screens 1501, 1601, referred to later, as to whether the telephone directory list is to be automatically changed in accordance with the notification of the telephone number (step S171). When the result of this query is that the telephone directory list is not to be automatically changed, the process proceeds to step S175.

On the other hand, when the telephone directory list is to be automatically changed, a process for obtaining the telephone number information in the e-mail contents is performed (step S172). It is then determined whether this process has successfully obtained the telephone number information or has failed (step S173).

When the process has failed to obtain the telephone number information, in step S175 the received e-mail is handled as a normal e-mail, but when the process has successfully obtained the telephone number information, the telephone number information in the telephone directory list is updated (step S174). Then, the present process is terminated.

Figure 25:
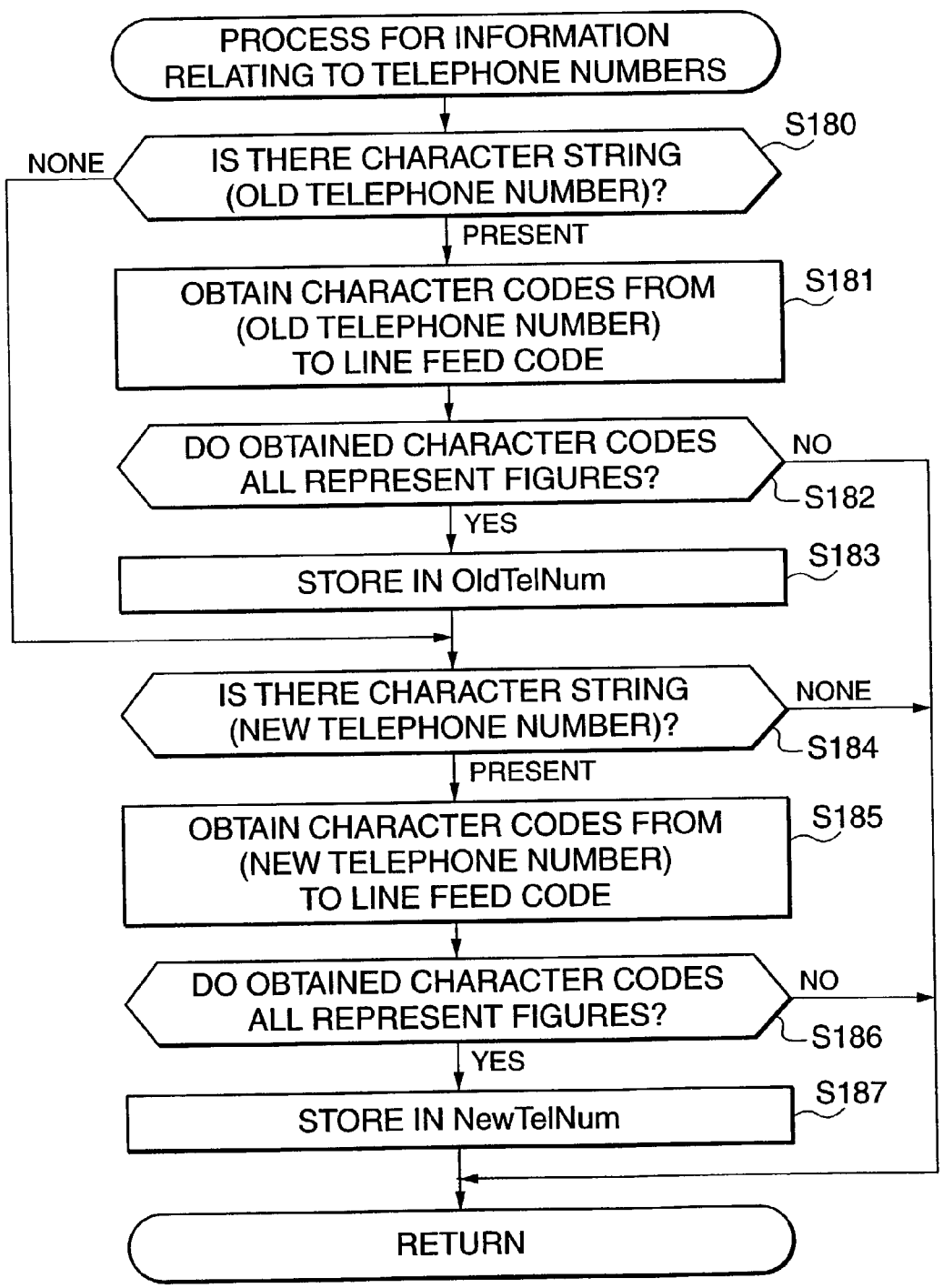
FIG. 25 is a flowchart showing the procedure for a process for obtaining telephone number information in step S172 in FIG. 24.

FIG. 25 is a flowchart showing the procedure for a process for obtaining the telephone number information in step S172 in FIG. 24. First, the character strings are checked from the start of the e-mail contents onwards and it is determined whether a character string "OLD TELEPHONE NUMBER" is present in the e-mail contents (step S180).

When the character string "OLD TELEPHONE NUMBER" is present in the e-mail contents, a character string that follows immediately after "OLD TELEPHONE NUMBER" as far as a line feed code is obtained as telephone number data (step S181). It is then determined whether the obtained telephone number data is character codes that all represent figures (step S182).

When the obtained telephone number data is character codes all representing figures, the character codes are stored in a buffer "OldTelNum" (step S183). Here, the buffer "OldTelNum" is a telephone number storage buffer for an old telephone number.

On the other hand, when the character codes obtained in step S182 include codes aside from figures, it is deemed that an error occurred in obtaining the telephone number information, and the process returns to the main routine.

On the other hand, when the character string "OLD TELEPHONE NUMBER" is not detected in step S180 or when the obtaining of information on the "OLD TELEPHONE NUMBER" in step S183 has been successful, detection is then performed of the character string "NEW TELEPHONE NUMBER" (step S184).

The detection method is the same as in step S180. Regardless of whether the received e-mail is for a notification of a change in telephone number or for a notification of a new telephone number, the character string "NEW TELEPHONE NUMBER" should definitely be present, so that when the determination "NONE" is obtained in step S184, it is deemed that an error occurred in the telephone number obtaining process, and the process returns to the main routine.

On the other hand, when the character string "NEW TELEPHONE NUMBER" has been detected in step S184, a character string that follows immediately after "NEW TELEPHONE NUMBER" as far as a line feed code is obtained as telephone number data (step S185).

In the same way as in the determination method in step S182, it is then determined whether the obtained character codes all represent figures (step S186). When not all of the obtained character codes represent figures, it is deemed that an error occurred in the processing, and the process returns to the main routine. On the other hand, when all of the obtained character codes represent figures, the obtained character codes are stored in a buffer "NewTelNum" (step S187). Here, the buffer "NewTelNum" is a telephone number storage buffer for a new telephone number. In this way, the telephone number obtaining process is completed successfully, and the process returns to the main routine.

Figure 26:
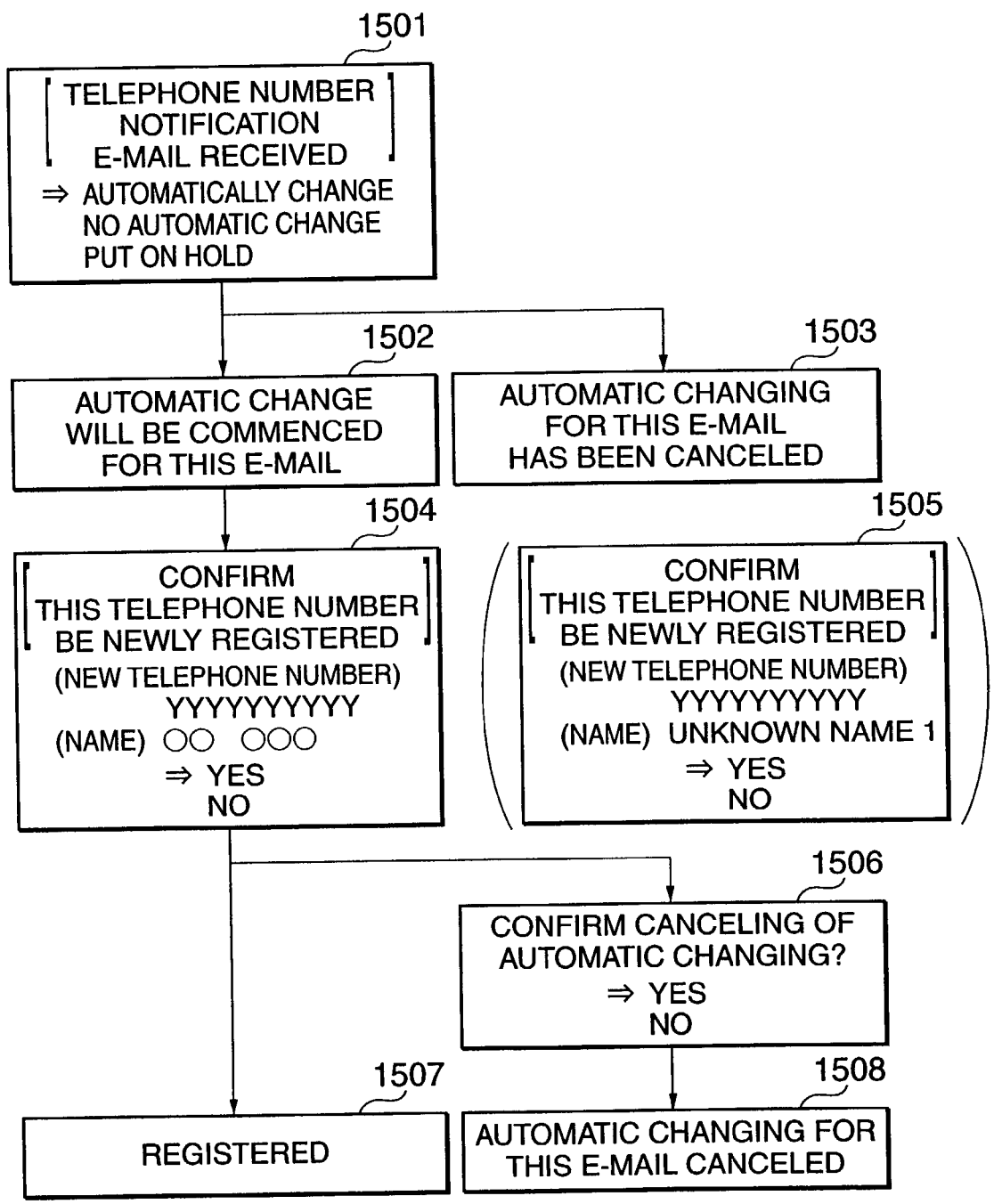
FIG. 26 is a diagram showing a state transition of the display screen up to the registration of a new telephone number in the telephone directory list, after an e-mail for a notification with a new telephone number has been received and the telephone number data has been obtained.

Next, the process for updating the telephone directory list of the recipient terminal with the telephone number obtained by e-mail will be described. FIG. 26 is a diagram showing a state transition of the display screen up to the registration of the new telephone number in the telephone directory list, after an e-mail with a new telephone number has been received and telephone number data has been obtained.

First, when an e-mail including a new telephone number has been received and telephone number data has been obtained, as shown on a screen 1501, an indication that an e-mail for a notification of a telephone number has been received is displayed. Here, when "NO AUTOMATIC CHANGE" is selected, on a screen 1503 the automatic changing by the e-mail has been canceled. It should be noted that at this point the e-mail for the notification of the new telephone number is itself not deleted, and only the processing task of automatically changing is canceled.

When "PUT ON HOLD" is selected on the screen 1501, the displaying of screen 1501 is terminated, and the screen 1501 is not displayed again until it is recalled via a menu or the like that relates to the updating of telephone numbers. When "AUTOMATICALLY CHANGE" is selected on the screen 1501, an indication that an automatic changing will be commenced is displayed on a screen 1502.

On a screen 1504 the telephone number that has been obtained and stored in the buffer NewTelNum and the name are displayed. It should be noted that when the name is not obtained from the e-mail for the notification of the telephone number and therefore the name of the sender is unclear, the name is registered as "UNKNOWN NAME 1" as shown on a screen 1505.

When "YES" is selected on the screen 1504 or 1505, an indication that a telephone number has been newly registered is displayed on a screen 1507. Here, when "NO" is selected, a screen indicating a selection of whether an automatic changing is to be canceled or not is displayed on a screen 1506. In the same way as with the screen 1501, when "YES" is selected, the process for automatically changing the telephone directory list is canceled. Alternatively, when "NO" is selected, the process is put on hold.

Figure 27A:
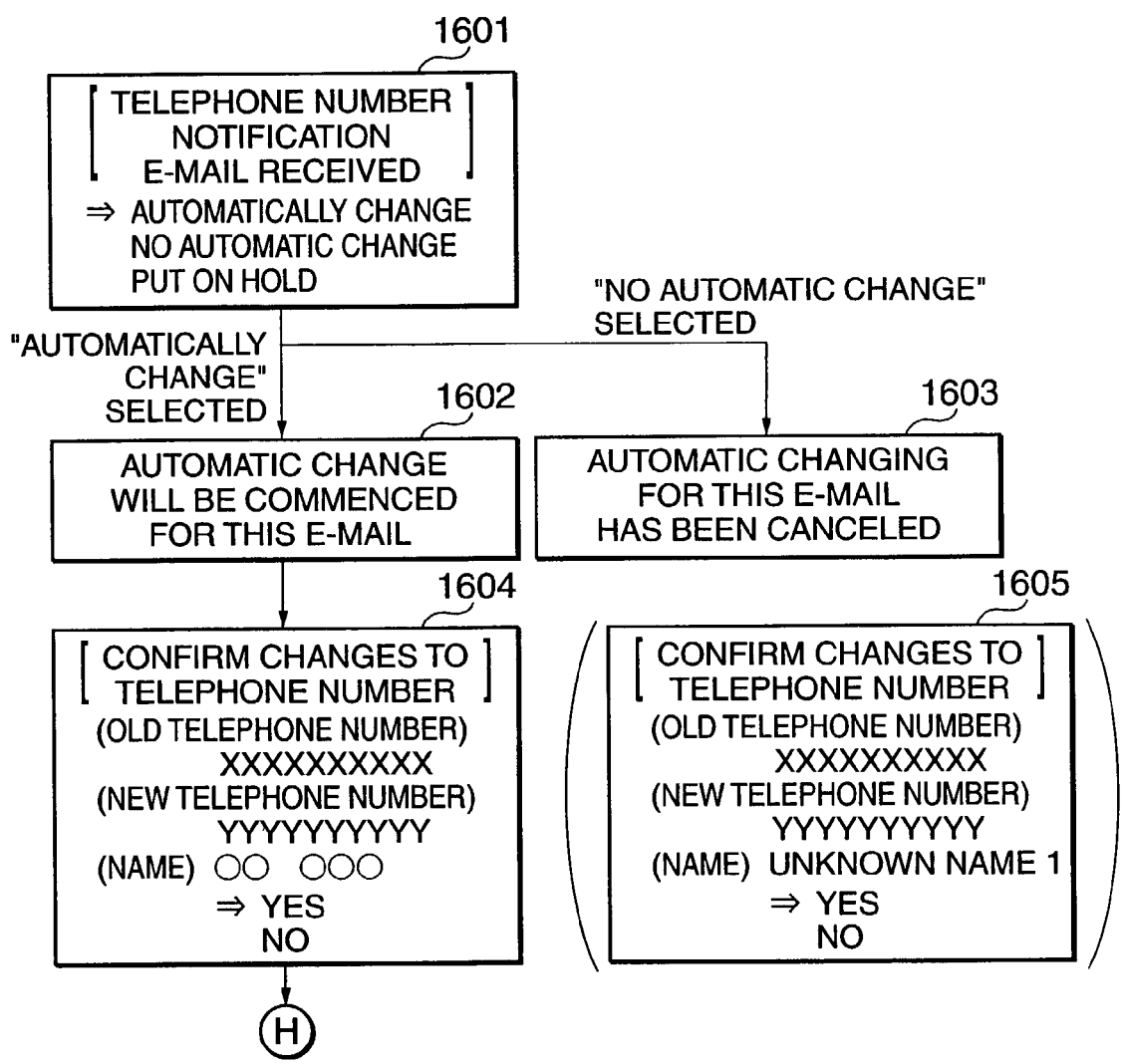
FIG. 27 is a diagram showing a state transition of the display screen up to the changing of a telephone number in the telephone directory list, after an e-mail for a notification of a change in telephone number has been received and the telephone number data has been obtained.
Figure 27B:
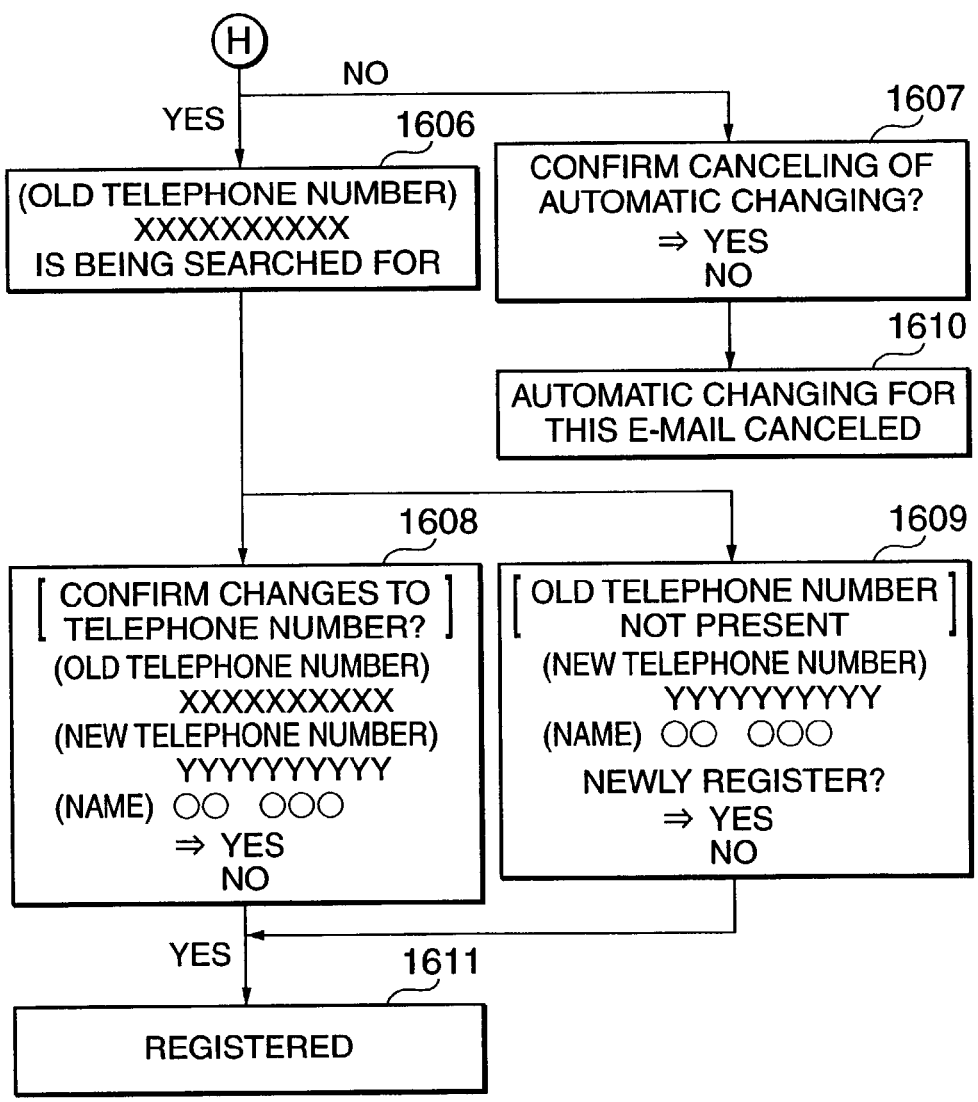

FIG. 27 is a diagram showing a state transition of the display screen up to the changing of the telephone number in the telephone directory list, after an e-mail for a notification of a change in telephone number has been received and telephone number data has been obtained.

Once an e-mail for a telephone number change notification has been received and data for the old telephone number and the new telephone number has been obtained, as shown on a screen 1601 an indication that the e-mail for a telephone number change notification has been received is displayed. When "NO AUTOMATIC CHANGE" is selected at this point, the automatic changing by the e-mail is canceled. It should be noted that at this point the e-mail for the telephone number change notification is itself not deleted, and only the processing task of automatically changing is canceled.

When "PUT ON HOLD" is selected on a screen 1601, the displaying of screen 1601 is terminated, and the screen 1601 is not displayed again until it is recalled via a menu or the like that relates to the updating of telephone numbers.

When "AUTOMATICALLY CHANGE" is selected on the screen 1601, an indication that an automatic changing will be commenced is displayed on a screen 1602. On a screen 1604, the old telephone number that has been obtained and stored in the buffer OldTelNum, the new telephone number that has been obtained and stored in the buffer NewTelNum, and the name are displayed. It should be noted that when the name is not obtained from the e-mail for the telephone number change notification and therefore the name of the sender is unclear, the name is registered as "UNKNOWN NAME 1" as shown on a screen 1605.

When "NO" is selected on the screen 1604 or 1605, a screen indicating a selection of whether an automatic changing is to be canceled or not is displayed on a screen 1607. In the same way as with screen 1601, when "YES" is selected, the process for automatically changing the telephone directory list is canceled. Alternatively, when "NO" is selected, the process is put on hold.

When "YES" is selected on the screen 1604 or 1605, a process for comparing the old telephone number stored in the buffer OldTelNum with all of the telephone numbers in the telephone directory list is performed, and an indication that a search for the old telephone number is being performed is displayed on a screen 1606. When the search finds the old telephone number in the telephone directory list, an indication that the telephone number (old telephone number) in the telephone directory list will be rewritten using the new telephone number is displayed on a screen 1608. When the search does not find the old telephone number, a screen indicating that the new telephone number will be registered as a new telephone number is displayed on a screen 1609.

When "NO" is selected on the screen 1608 or screen 1609, the display is changed to a screen 1607. On the other hand, when "YES" is selected, an indication that registration is being performed is shown on a screen 1611 and the new telephone number is registered in the telephone directory list.

Figure 28:
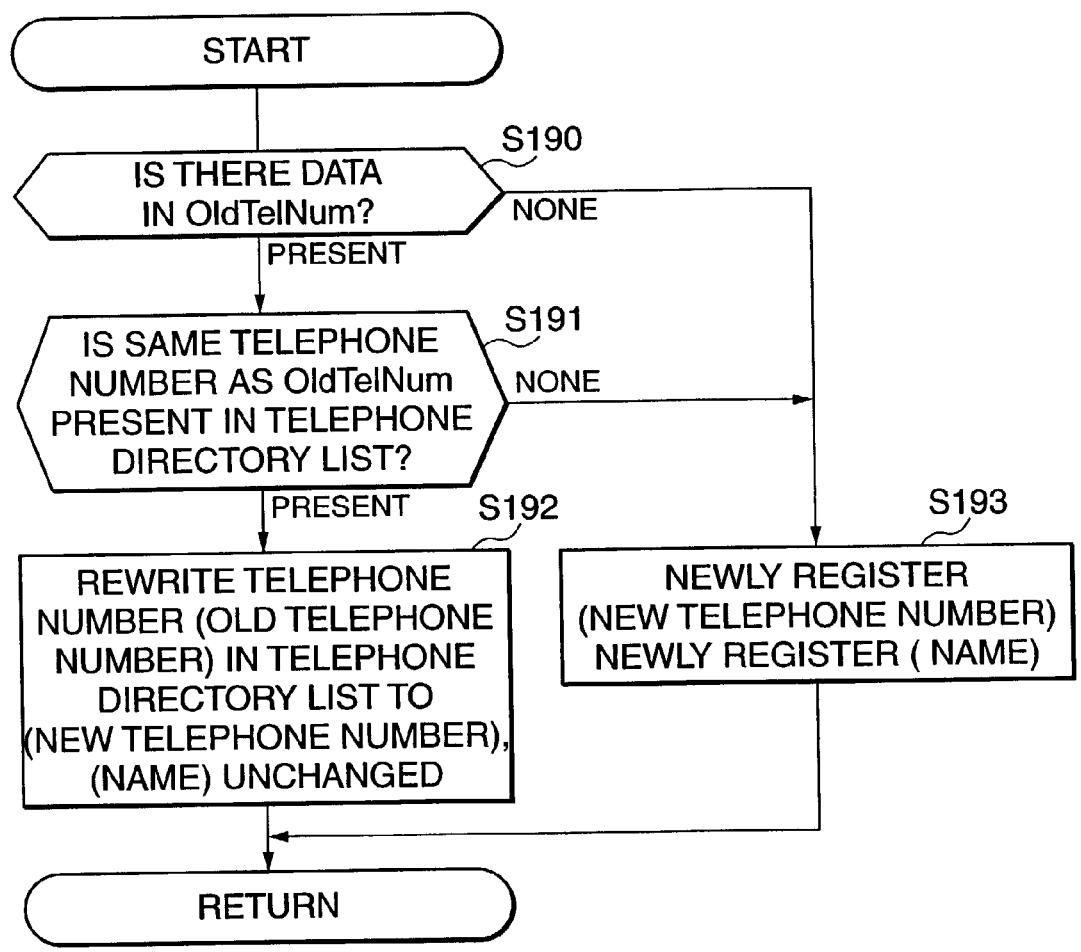
FIG. 28 is a flowchart showing the procedure for a process for updating the telephone directory list data in step S174.

FIG. 28 is a flowchart showing the procedure for a process for updating the telephone directory list data in step S174. When the telephone directory list updating process is commenced, it is first determined whether there is data in the buffer OldTelNum (step S190)

When there is no data in the buffer OldTelNum, the new telephone number in the buffer NewTelNum is registered (step S193). After this, the process returns to the main routine. On the other hand, when there is data in the buffer OldTelNum in step S190, it is determined whether the same telephone number as the number stored in the buffer OldTelNum is present in the telephone directory list (step S191).

When the same telephone number as the number stored in the buffer OldTelNum is not present, even though the received e-mail is a telephone number change notification, the e-mail should be handled by the recipient terminal in the same way as a new telephone number notification, and therefore the process for registration of a new telephone number is performed in step S193.

When the same telephone number stored in the buffer OldTelNum is present in step S191, the telephone number is changed (step S192). In actuality, the number in the telephone directory list that is the same as the number stored in the buffer OldTelNum is rewritten to the telephone number data in the buffer NewTelNum. After this, the process returns to the main routine.

In this way, a recipient terminal that has received an e-mail that is for a telephone number notification in a predetermined format can automatically update the data in the telephone directory list according to the user's selection.

Also, in the case where the sender terminal sends a telephone number change notification that does not indicate the old telephone number, the recipient terminal may compare the sender's name or kana reading in place of the old telephone number and when matching information is found in the telephone directory list, may then change the telephone number data for the sender.

Fourth Embodiment

While the above-described third embodiment is directed to the transmission and reception process for e-mail related to telephone number notifications, the fourth embodiment of the present invention is directed to the transmission and reception process for e-mail related to e-mail address notifications.

Figure 34:
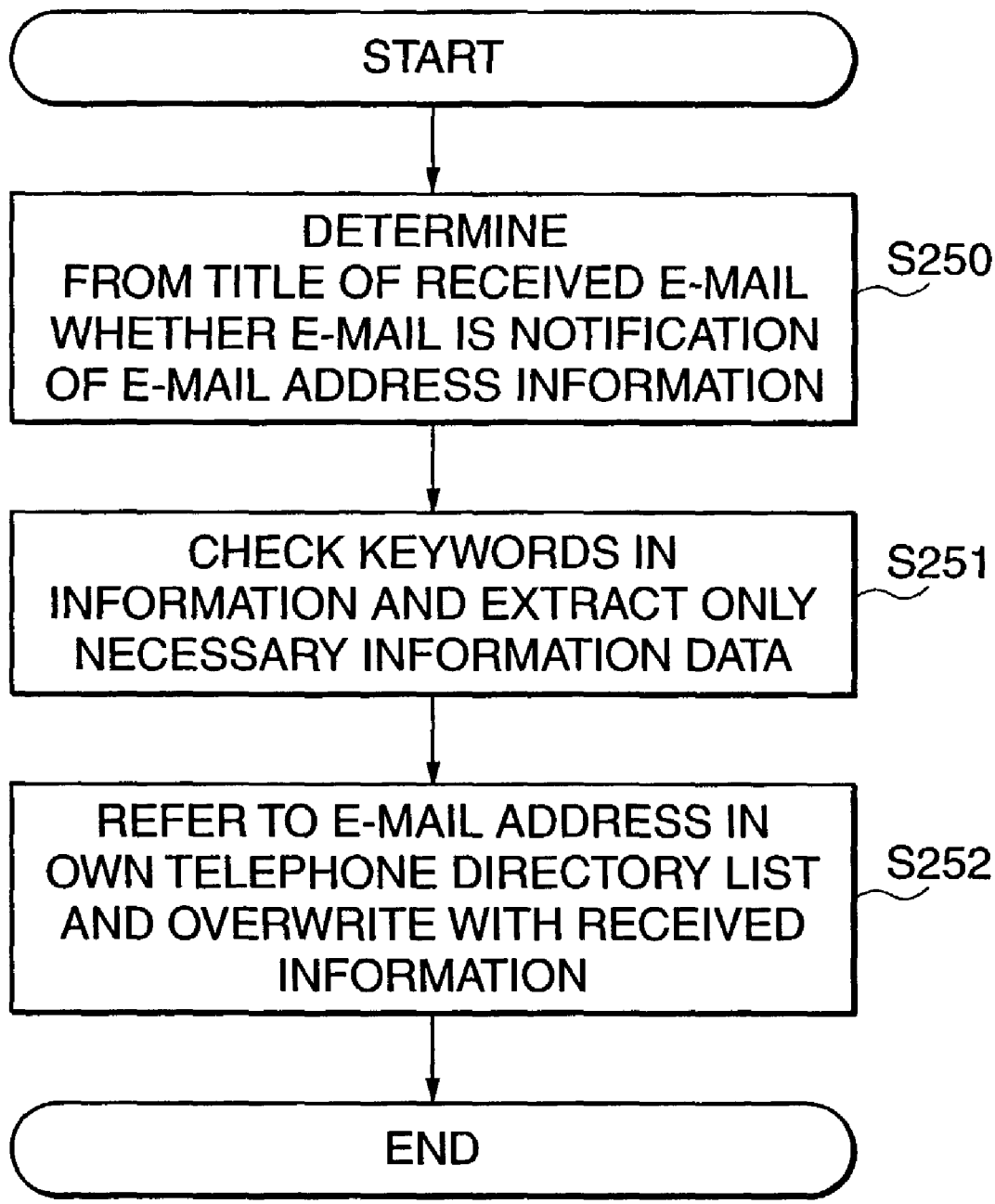
FIG. 34 is a flowchart showing the procedure for a reception process for a notified e-mail address according to the fourth embodiment.

FIG. 29 is a flowchart showing the procedure for a process for notifying the user's e-mail address through the automatic transmission of e-mail according to the fourth embodiment. FIG. 34 is a flowchart showing the procedure for a reception process for a notified e-mail address. Programs that execute these processes are stored in the ROM 102 and are executed by the CPU 101.

On the transmitter terminal, information on e-mail addresses is extracted from the telephone directory list provided in the facsimile apparatus and is copied into a temporary storage buffer (step S200). The user that possesses the facsimile apparatus is prompted to select information to be transmitted by e-mail (step S201). In the present embodiment, the user can notify a change in the user's e-mail address or notify a new e-mail address by e-mail.

E-mail to be transmitted is automatically generated based on a suitable format for the notification contents that the user selected in step S201 (step S202). The e-mail that has been generated in step S202 is transmitted to the e-mail addresses that were copied into the temporary storage buffer in step S201 (step S203), and the process is terminated.

The data structure of the telephone directory list provided in the facsimile apparatus and the data structure of the transmission e-mail address buffer are the same as those shown in FIG. 5 of the first embodiment. Also, like the second and third embodiments, two types of transmission e-mail address buffer do not need to be provided.

Figure 30B:
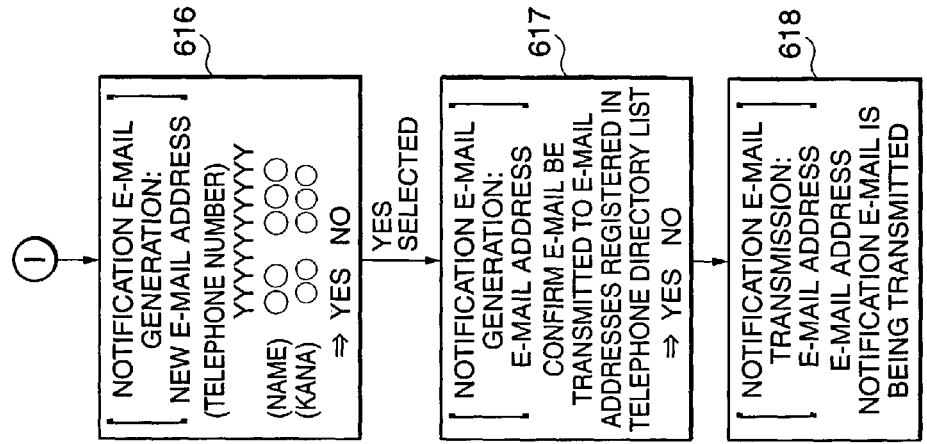
FIG. 30 is a diagram showing a state transition of the display screen of the facsimile apparatus when information to be transmitted by e-mail is selected by the user and transmitted.
Figure 30A:
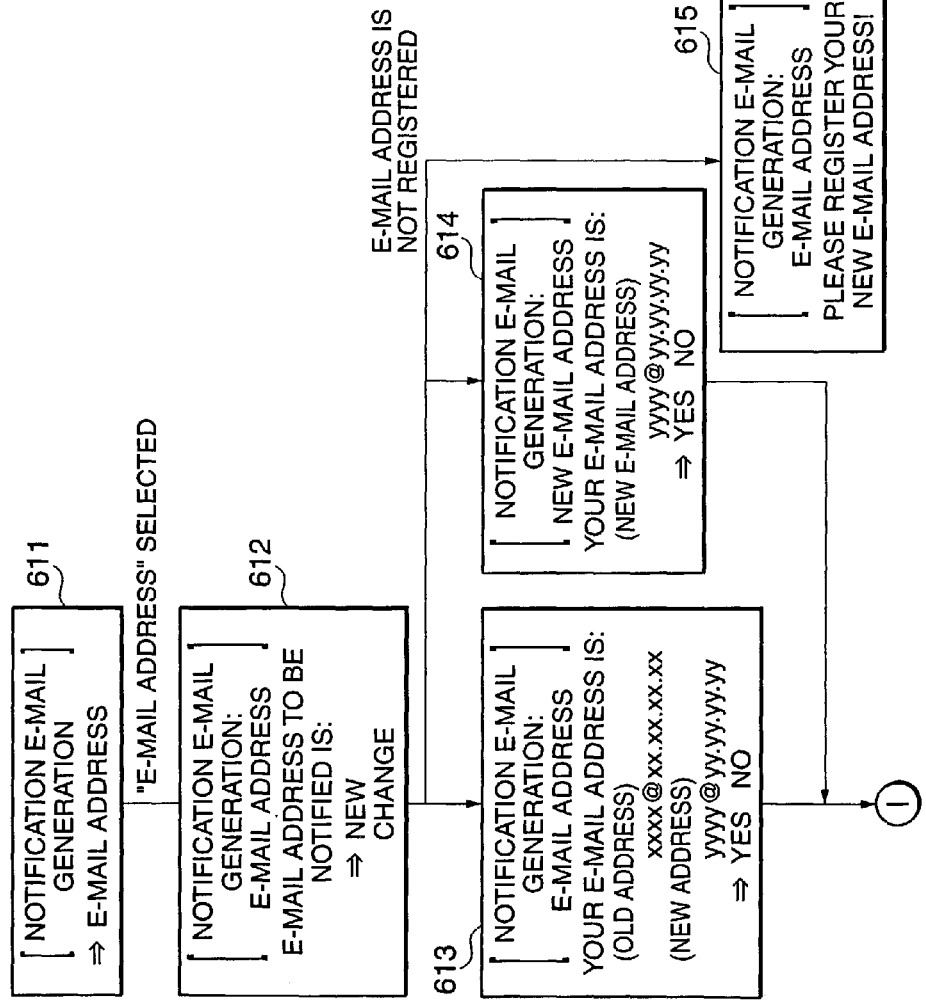

FIG. 30 is a diagram showing a state transition of the display screen of the facsimile apparatus when the user selects the contents of the information to be notified by e-mail and transmission is performed. As mentioned above, a new e-mail address notification or an e-mail address change notification can be selected in the present embodiment.

First, when the user wishes to notify other users of the user's e-mail address, "e-mail address" is selected on a screen 611, and on a screen 612 the user selects a "CHANGE" in e-mail address or a "NEW" e-mail address as the information to be notified.

On screens 613, 614 the e-mail address stored in the SRAM 114 of the facsimile apparatus is displayed. At this point, when the user's e-mail address is not registered in the facsimile apparatus, a screen 615 that prompts the user to register the correct e-mail address in the facsimile apparatus in advance is displayed and the process for transmitting e-mail for a notification of an e-mail address notification is canceled.

When "YES" is selected on the screen 613 or screen 614, a confirmation screen for the user's name and kana reading is displayed on a screen 616. When the user's name and kana reading is registered in the facsimile apparatus in advance, the registered contents are displayed, but when the user's name and kana reading are not registered, an indication that they are not registered is displayed. Even when such information is not registered, the user is free to select "YES" with the process proceeding without the user's name.

When "YES" is selected on a confirmation screen 617, an e-mail transmission process is executed and a screen 618 is displayed until the e-mail transmission is discontinued or completed.

The formats shown by reference numerals 911 and 912 in FIG. 16 of the second embodiment are used as the formats of the e-mail for notifications of addresses to be sent by e-mail.

The rules for generating a format that is suited to the notification contents are also the same as in the second embodiment. In the fourth embodiment, however, the notification contents are only an e-mail address, so that reference numerals 902 to 904 may not be needed.

Figure 31:
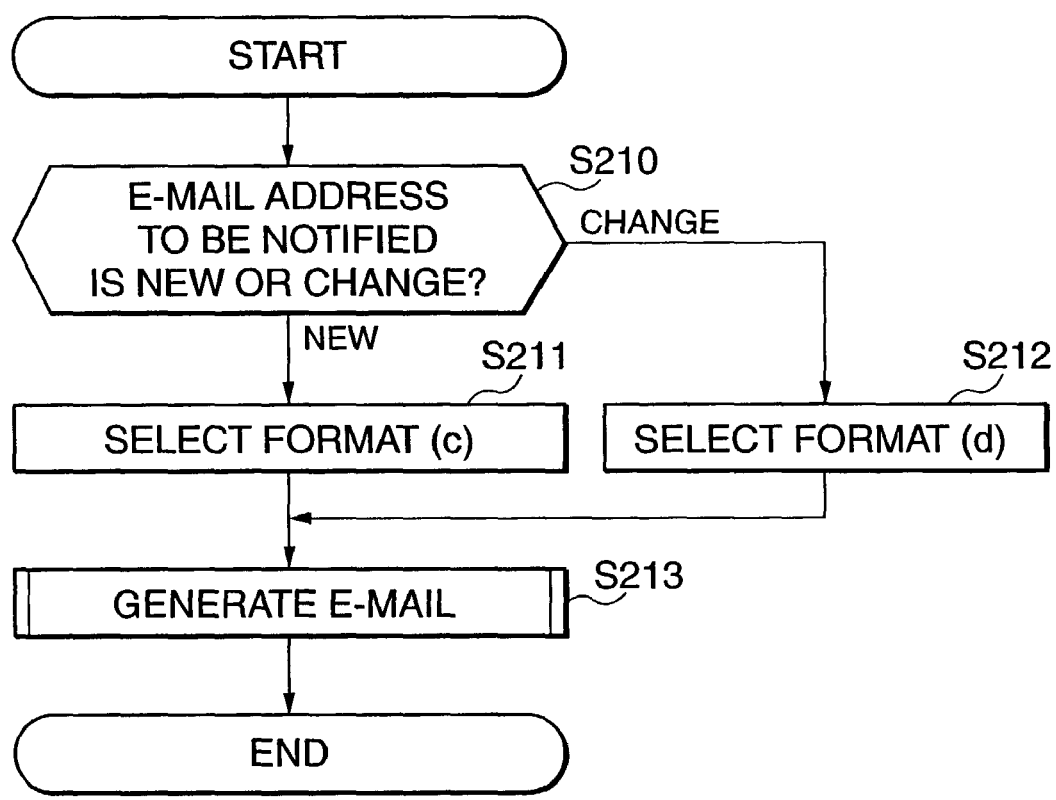
FIG. 31 is a flowchart showing the procedure for a selection process for a format in step S202.

FIG. 31 is a flowchart showing the procedure for the selection process for a format in step S202. First, it is determined whether the e-mail address to be indicated in the notification corresponds to a new e-mail address or a change in e-mail address (step S210).

When the e-mail address corresponds to a new address, the format (c) designated by reference numeral 911 is selected (step S211). On the other hand, when the e-mail address corresponds to a change in address, the format (d) designated by reference numeral 911 is selected (step S212). After this, e-mail is generated using the selected format (step S213), and the present process is terminated.

Figure 32:
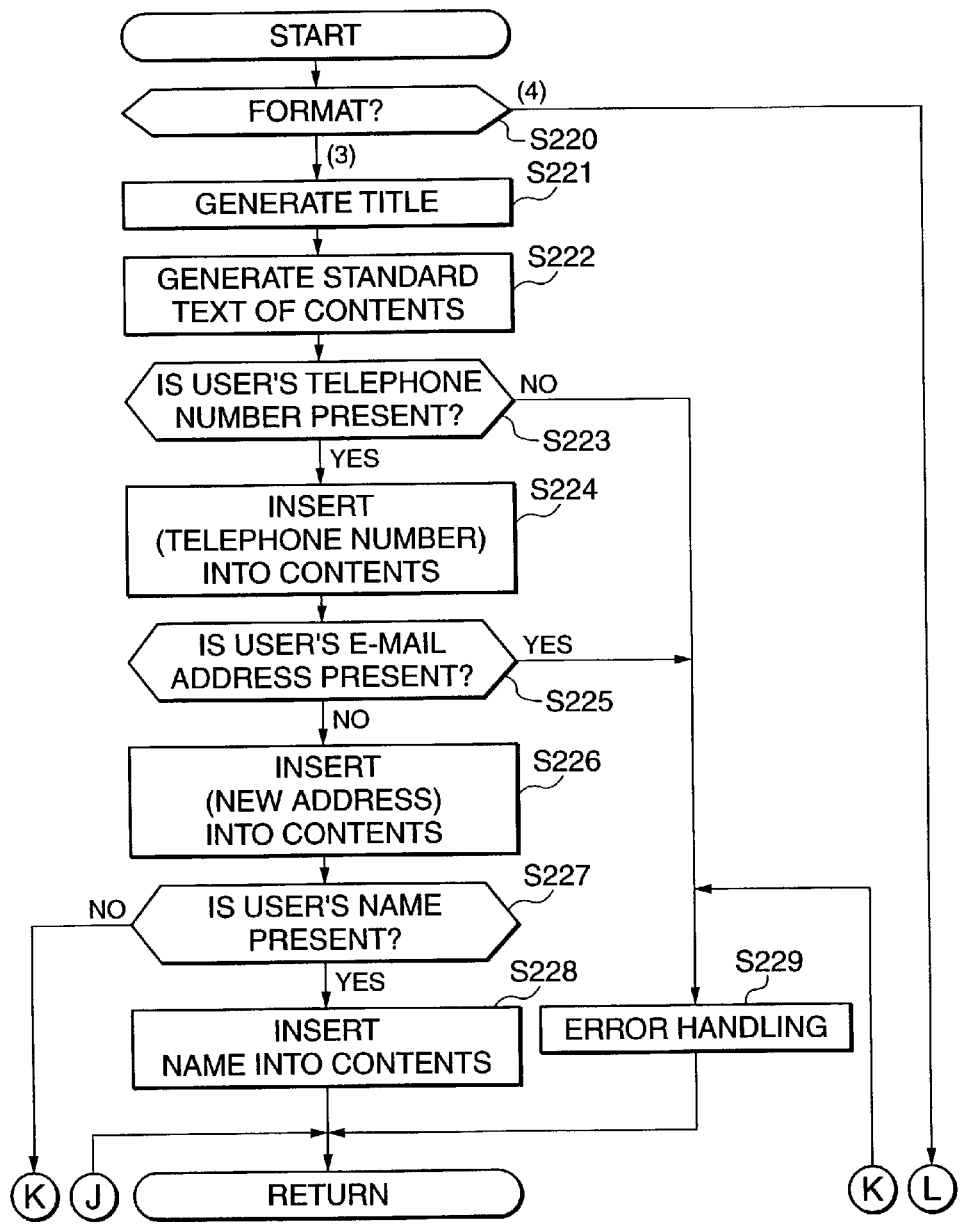
FIG. 32 is a flowchart showing the procedure for an e-mail generation process in step S213 in FIG. 31.
Figure 33:
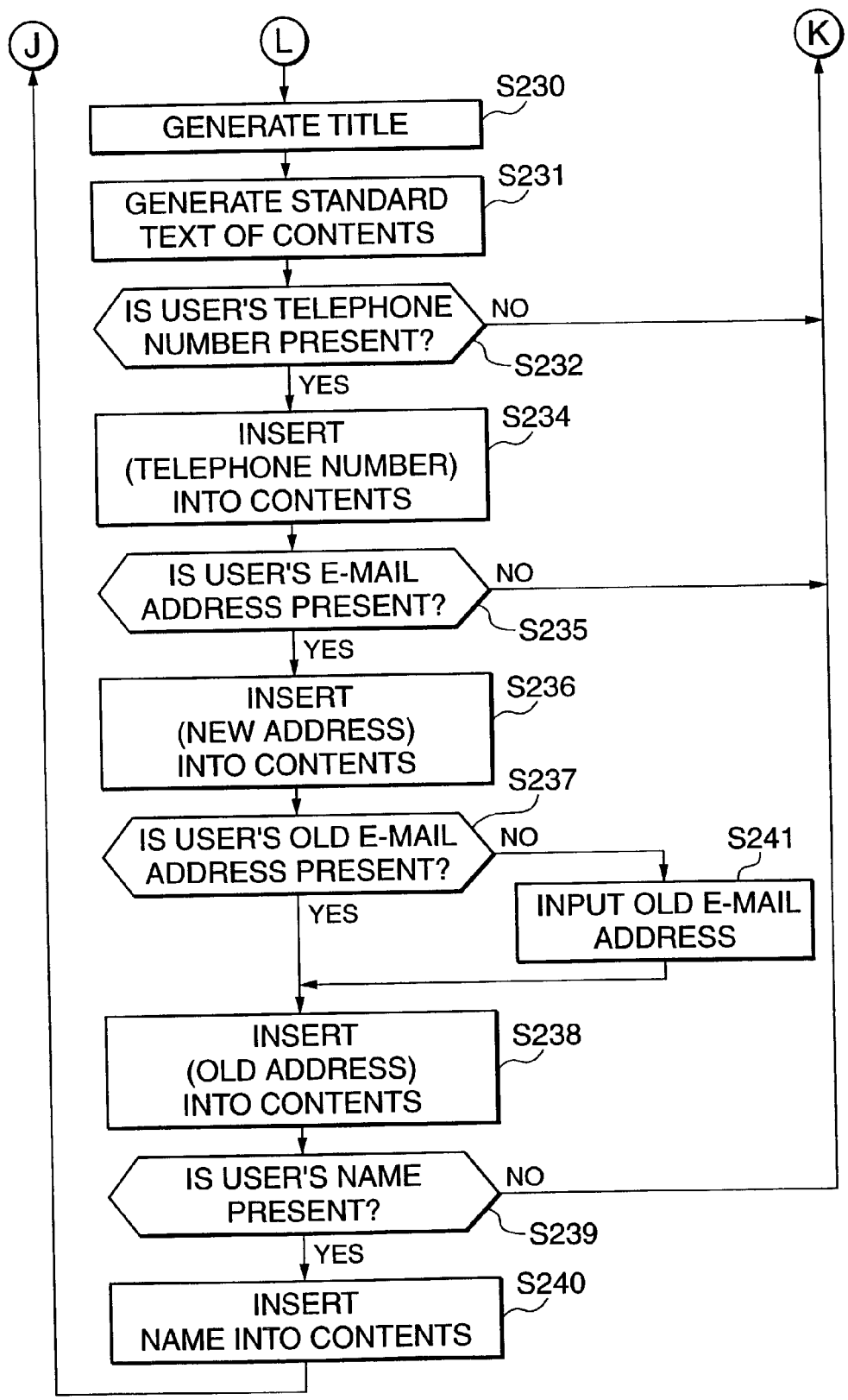
FIG. 33 is a continued part of the FIG. 32 flowchart.

FIG. 32 and FIG. 33 are flowcharts showing the procedure for the e-mail generation process in step S213. First, it is determined in which format the e-mail is to be generated (step S220).

A character string of the format determined in step S220 is selected as the title of the e-mail (steps S221, S230). Also, sentences, such as a greeting, that are set in advance are selected as a standard text for informing the recipient of the contents of the e-mail (steps S222, S231). After this, a process for inserting the "e-mail address", "telephone number", "name" and "kana reading" that are the unique user information into the format is performed.

That is, when the e-mail to be generated is for notifying the user's e-mail address, it is determined whether the user's telephone number is registered in the SRAM 114 (steps S223, S232). When the result of this determination is not correct, error handling is performed (step S229), and the process returns to the main routine. On the other hand, when the result of this determination is correct, the telephone number read from the SRAM 114 is inserted at a predetermined location in the contents of the e-mail (steps S224, S234)

Next, it is determined whether the user's e-mail address is registered in the SRAM 114 (steps S225, S235). When the e-mail address is not registered, the process proceeds to step S229, while on the other hand, when e-mail address is registered, the e-mail address read from the SRAM 114 is inserted at a predetermined location in the e-mail contents (steps S226, S236).

After this, when the format is for an e-mail address change notification, it is determined whether the user's old e-mail address is registered (step S237). When this e-mail address is registered, the process proceeds to step S238, while when this e-mail address is not registered, the old e-mail address is inputted (step S241). In the same way as with the new e-mail address, the old e-mail address is inserted at a predetermined location in the e-mail contents (step S238).

Next, it is determined whether the user's name is registered (steps S227, S239). When the user's name is registered, the name is inserted at a predetermined location in the e-mail contents (steps S228, S240), and the process returns to the main routine. On the other hand, when the user's name is not registered, error handling is performed in step S229, and the process returns to the main routine.

Once the e-mail to be transmitted has been generated in this way, the facsimile apparatus commences the actual transmission of the e-mail.

The procedure for processing e-mail is the same as that shown in FIG. 11 of the first embodiment, and therefore will not be described.

When there are no more e-mail addresses, to which e-mail remains to be transmitted, in the domestic transmission e-mail address buffer or the number of destinations to which e-mail can be sent by a single transmission is reached, the process returns to step S220 and the same processing is repeated. Once the preparation of addresses for e-mail transmission has completed, the e-mail is actually transmitted. It should be noted that the conventional technique is used as the transmission protocol for the e-mail, and therefore this will not be described.

According to the above-described procedure, an e-mail for a notification of an address is transmitted by e-mail by the transmitter terminal.

Next, the operation on the recipient terminal side that receives an e-mail for a notification of an e-mail address will be described. As shown in FIG. 34, the facsimile apparatus on the recipient terminal side analyses the title of the received e-mail in accordance with special rules (step S250).

When the analysis result shows that the received e-mail is for a notification of an e-mail address as described above, the required character codes for the e-mail address are obtained from the contents of the received e-mail in accordance with the special rules (step S251). After this, the telephone directory list of the facsimile apparatus is accessed and the e-mail address information of the received e-mail is reflected in the telephone directory list (step S252). Then, the present process is terminated.

Figure 35:
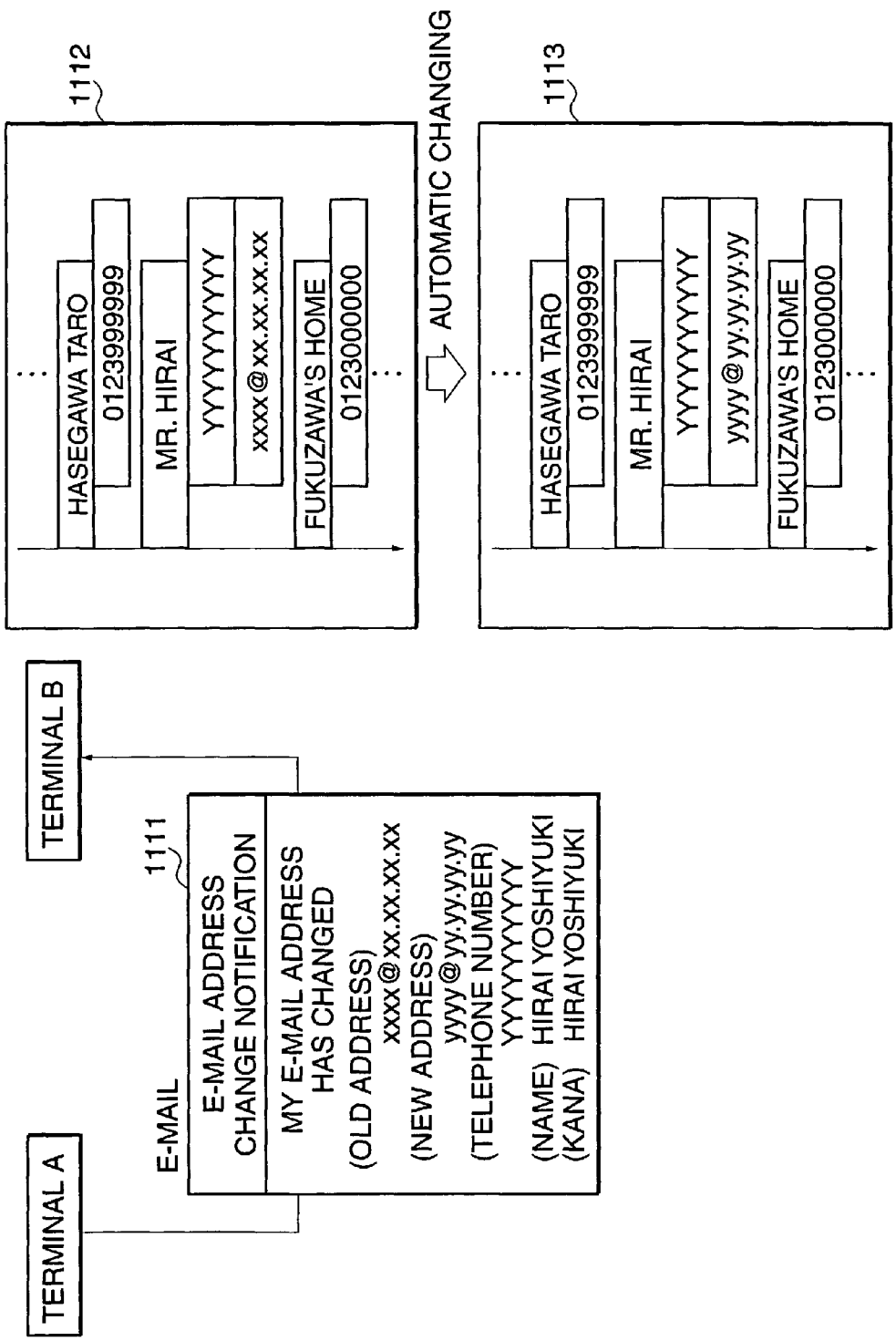
FIG. 35 is a diagram showing the operation of the facsimile apparatus after an e-mail for notification of an e-mail address has been received.
Figure 36:
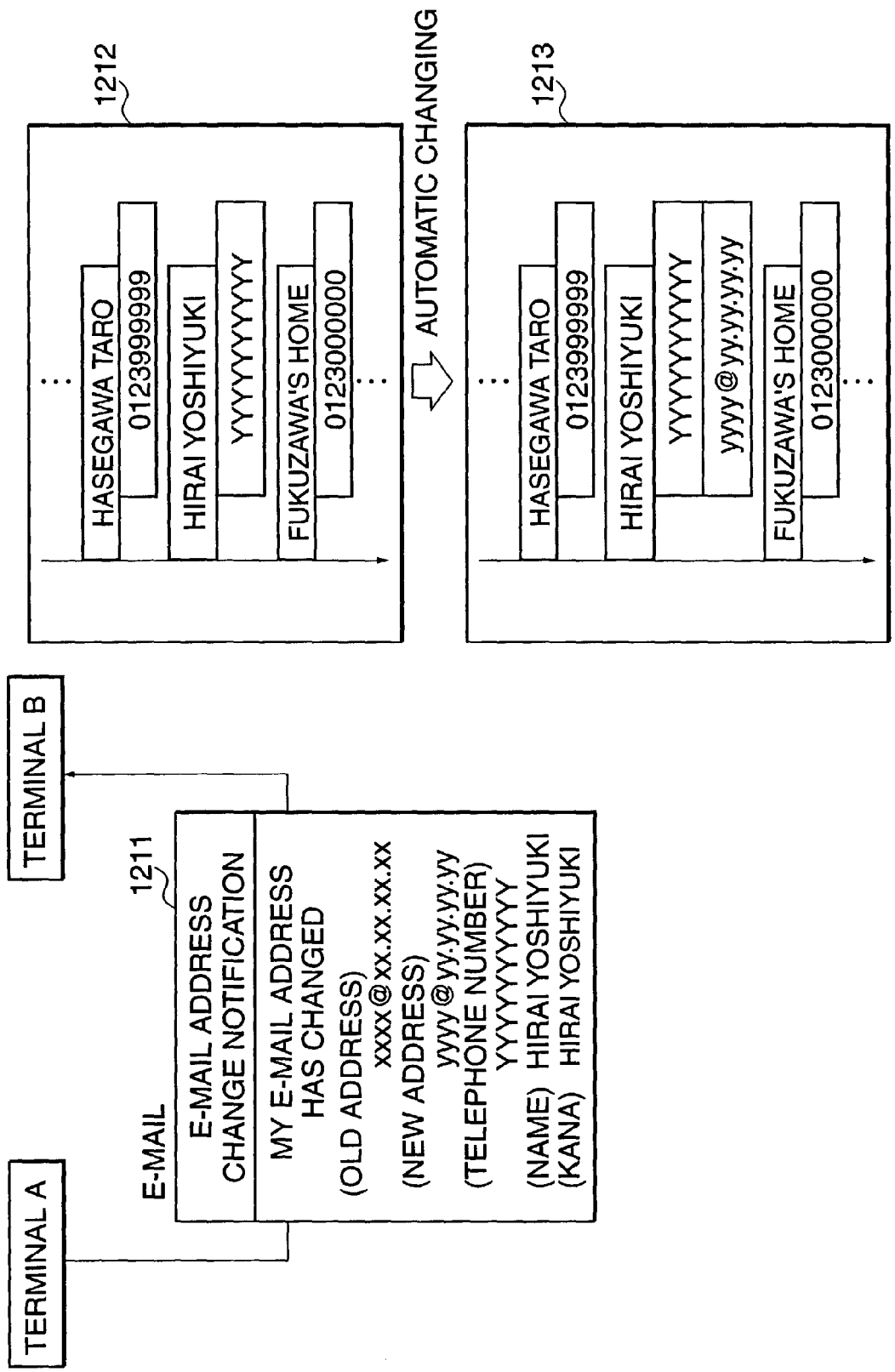
FIG. 36 is a diagram showing the operation of the facsimile apparatus after an e-mail for notification of an e-mail address has been received as a continuation of FIG. 35.

FIGS. 35 and 36 show the operation of the facsimile apparatus after receiving an e-mail for a notification of an e-mail address. FIG. 35 is a diagram showing the operation when an e-mail for a notification of a change in e-mail address has been received and the e-mail address of the sender is present in the telephone directory list of the recipient terminal.

When an e-mail 1111 is sent from a sender terminal A, in a recipient terminal B the e-mail address (or telephone number) of "Mr. Hirai" in a telephone directory list 1112 of the recipient terminal B matches the old e-mail address (or telephone number) in the e-mail 1111, so that as shown in FIG. 35, the e-mail address of "Mr. Hirai" in the telephone directory list 1113 thereof is changed to the new telephone number given in the e-mail 1111.

FIG. 36 is a diagram showing the operation in a case where an e-mail for a notification of change in e-mail address has been received and the old e-mail address of the sender is not present in the telephone directory list of the recipient terminal, but the user's telephone number is present, and in a case where an e-mail for a change notification of a new e-mail address has been received. Since the old e-mail address is not present in a telephone directory list 1212 of the recipient terminal but the telephone number is present, the sender of the e-mail can be identified. As shown in FIG. 36, an e-mail address is newly registered for the user identified in a telephone directory list 1213 thereof. In the example in FIG. 36, information on telephone numbers is present, so that even when the old e-mail address is not present, the user whose information is to be changed can be specified.

Figure 37:
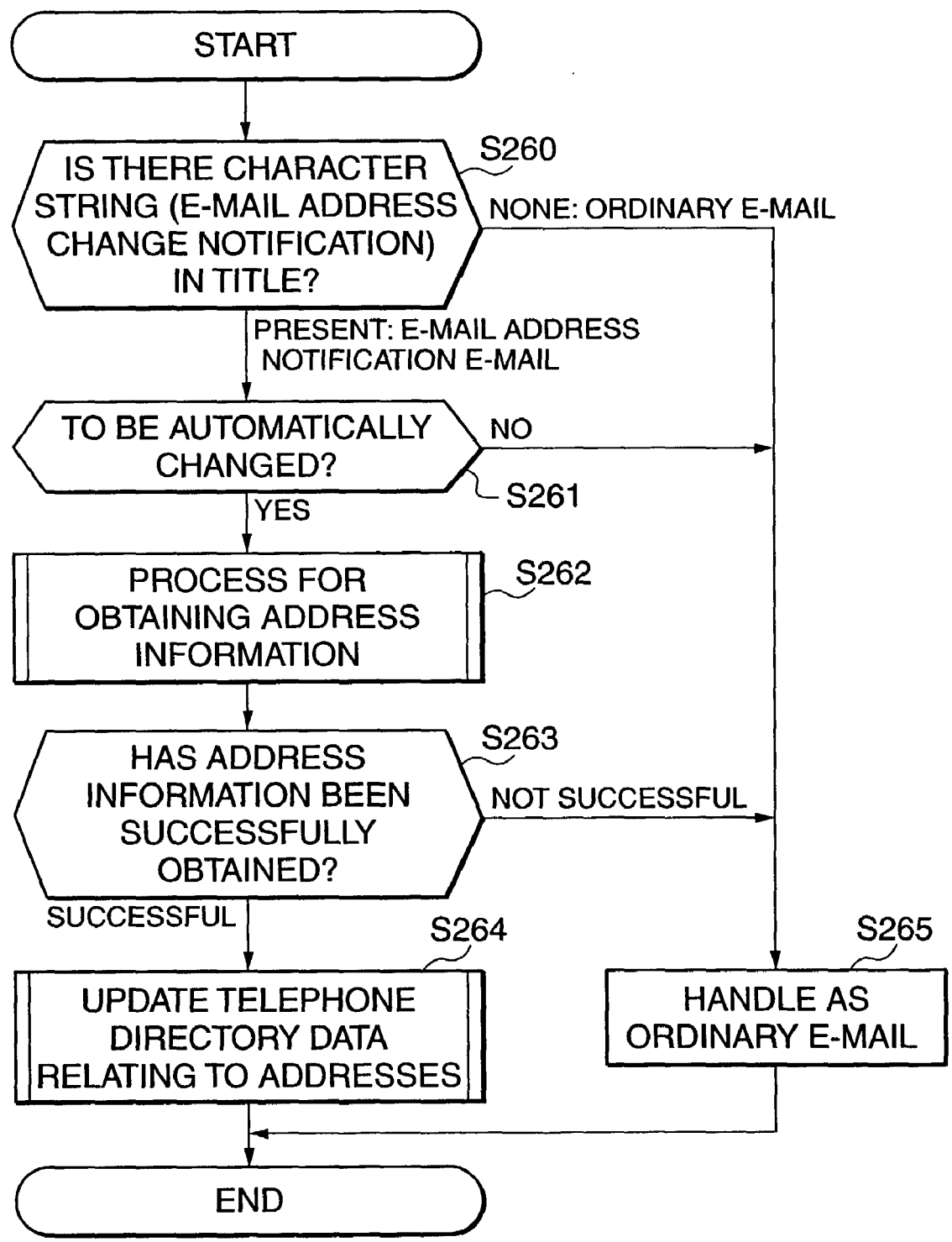
FIG. 37 is a flowchart showing the procedure for a process for reflecting information on e-mail contents in the telephone directory list following the reception of the e-mail.

FIG. 37 is a flowchart showing the procedure for a process for reflecting the contents of an e-mail in the telephone directory list following the reception of the e-mail. A program for executing this process is stored in the ROM 102 of the facsimile apparatus as the reception side terminal and is executed by the CPU 101. First, when the reception of the e-mail has been successful, the title of the received e-mail is checked (step S260). In this check it is determined whether or not the e-mail is for a change notification of an e-mail address. Here, when character codes for "E-MAIL ADDRESS CHANGE NOTIFICATION" are present consecutively in the title of the received e-mail, it is determined that the e-mail is for a notification of an e-mail address. When character codes for "E-MAIL ADDRESS CHANGE NOTIFICATION" are not present consecutively, it is determined that the received e-mail is not for a notification of an e-mail address, so that the received e-mail is handled as an ordinary e-mail (step S265). Then, the present process is terminated.

On the other hand, when the received e-mail is determined in step S260 to be for a notification of an e-mail address, at the time of opening the e-mail, an query is made on screens 1901, 2001, referred to, as to whether the telephone directory list is to be automatically changed in accordance with the e-mail address notification (step S261). When the result of this query is that the telephone directory list is not to be changed automatically, the process proceeds to step S265.

On the other hand, when the telephone directory list is to be changed automatically, a process for obtaining the e-mail address information in the e-mail contents is performed (step S262). It is then determined whether this process has successfully obtained the telephone number information or has failed (step S263).

When the process has failed to obtain the e-mail address information, in step S265 the received e-mail is handled as a normal e-mail, but when the process has successfully obtained the e-mail address information, the e-mail address information in the telephone directory list is updated (step S264). Then, the present process is terminated.

Figure 38:
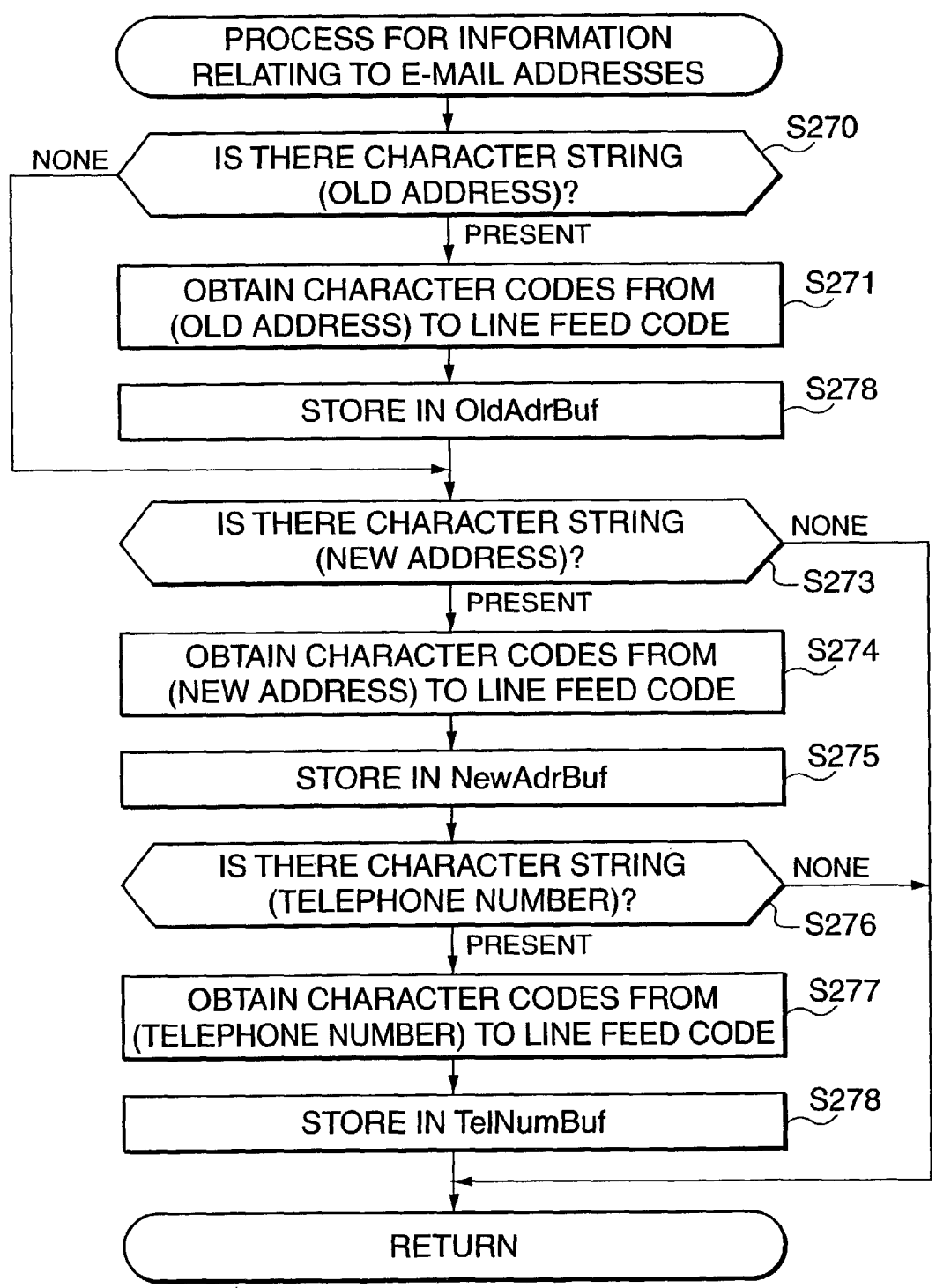
FIG. 38 is a flowchart showing the procedure for a process for obtaining information relating to an e-mail address in step S262.

FIG. 38 is a flowchart showing the procedure for the process for obtaining the e-mail address information in step S262. First, the character strings are checked from the start of the e-mail contents onwards and it is determined whether a character string "OLD ADDRESS" is present in the e-mail contents (step S270).

When the character string "OLD ADDRESS" is present in the e-mail contents, a character string that follows immediately after "OLD ADDRESS" as far as a line feed code is obtained as e-mail address data (step S271). The character string of the obtained e-mail address data is stored in a buffer OldAdrBuf (step S272). Here, the buffer "OldAdrBuf" is an e-mail address storage buffer for the old address.

On the other hand, when the character string "OLD ADDRESS" is not detected in step S270 or when the old address was stored in step S272, it is detected whether the character string "NEW ADDRESS" is present in the e-mail contents (step S273). The detection method is the same as in step S270.

Regardless of whether the contents of the received e-mail is an e-mail address change notification or a new e-mail address notification, a character string "new e-mail address" should definitely be present, so that when the determination "NONE" is obtained in step S273, it is deemed that an error occurred in the telephone number obtaining process, and the process returns to the main routine.

On the other hand, when the character string "NEW ADDRESS" has been detected in step S273, a character string that follows immediately after "NEW ADDRESS" as far as a line feed code is obtained as e-mail address data (step S274).

The obtained e-mail address data is stored in a buffer "NewAdrBuf" (step S275). Here, the buffer "NewAdrBuf" is an e-mail address storage buffer for a new e-mail address. In this way, the e-mail address obtaining process is completed successfully.

It is also determined whether a character string "TELEPHONE NUMBER" is present in the contents of the received e-mail (step S276). If this character string is not present, error handling is performed, and the process returns to the main routine. On the other hand, when this character string is present, the character string that follows immediately after "TELEPHONE NUMBER" as far as a line feed code is obtained as telephone number data (step S277), and the character string of the obtained telephone number data is stored in the buffer TelNumBuf (step S278). Then, the process returns to the main routine.

Figure 39:
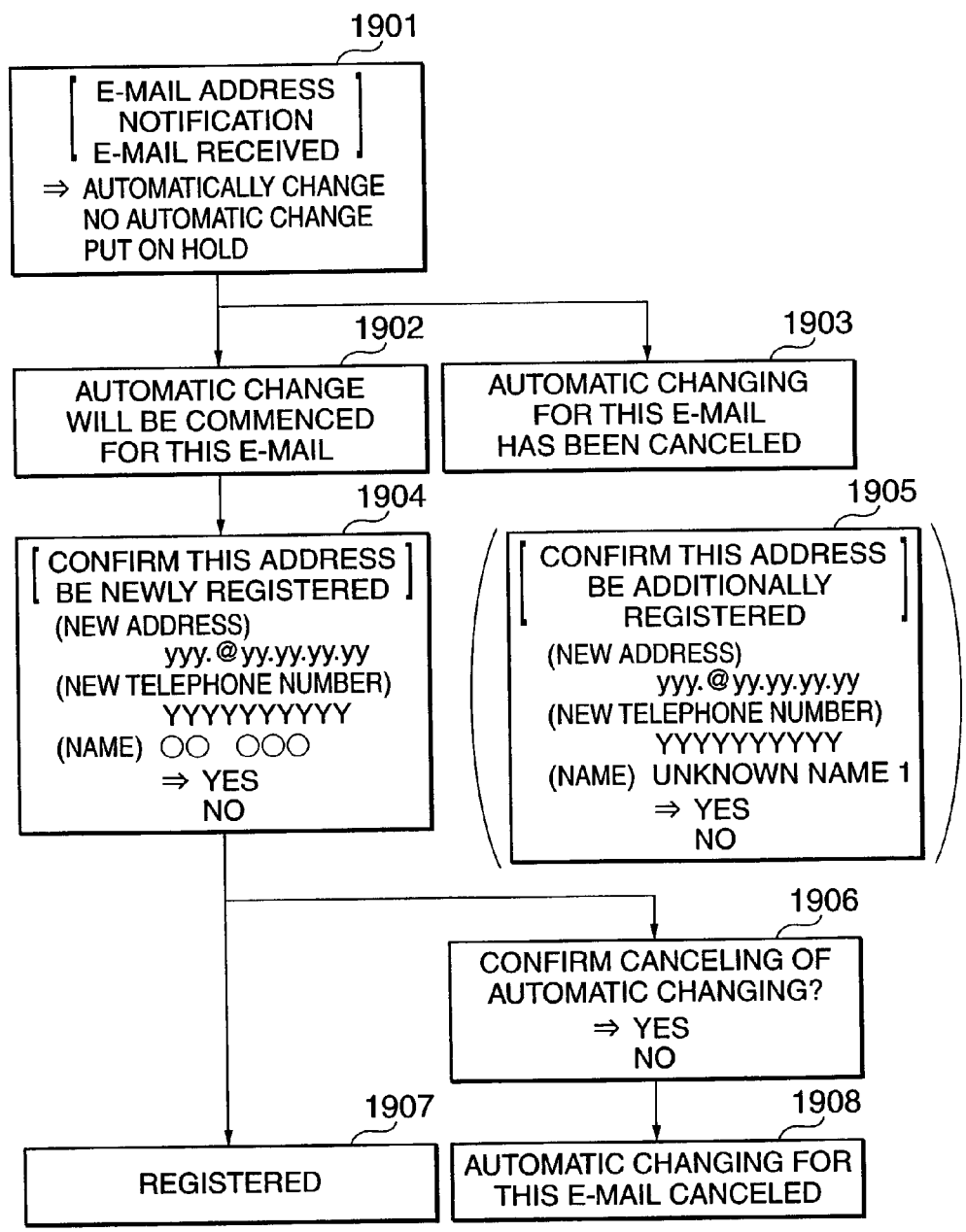
FIG. 39 is a diagram showing a state transition of the display screen up to the registration of a new email address in the telephone directory list, after an e-mail with a new e-mail address has been received and e-mail address data has been obtained.

Next, the process for updating the telephone directory list of the recipient terminal with the e-mail address obtained by e-mail will be described. FIG. 39 is a diagram showing a state transition of the display screen up to the registration of the new e-mail address in the telephone directory list, after an e-mail with a new e-mail address has been received and e-mail address data has been obtained.

Once an e-mail for a notification of a new e-mail address has been received and e-mail address data has been obtained, as shown on a screen 1901 an indication that the e-mail for a change notification of an e-mail address has been received is displayed. When "NO AUTOMATIC CHANGE" is selected at this point, the automatic changing by the e-mail is canceled on a screen 1903. It should be noted that at this point the e-mail for the change notification of the e-mail address is itself not deleted, and only the processing task of automatically changing is canceled.

When "PUT ON HOLD" is selected on the screen 1901, the displaying of the screen 1901 is terminated, and the screen 1901 is not displayed again until it is recalled via a menu or the like that relates to the updating of e-mail addresses.

When "AUTOMATICALLY CHANGE" is selected on the screen 1901, an indication that an automatic changing has commenced is displayed on a screen 1902. On a screen 1904, the e-mail address that has been obtained and stored in the buffer NewAdrBuf, the telephone number that has been obtained and stored in the buffer NewTelNum, and the name are displayed. It should be noted that when the name is not obtained from the e-mail for the change notification of the e-mail address and therefore the name of the sender is unclear, the name is registered as "UNKNOWN NAME 1" as shown on a screen 1905.

When "YES" is selected on the screen 1904 or 1905, a screen indicating that the information has been newly registered is displayed on a screen 1907. When "NO" is selected at this point, an indication that prompts a selection of the automatic changing being to be canceled or it being not to be canceled is displayed on a screen 1906. In the same way as with screen 1901, when "YES" is selected at the point, automatic changing is canceled. When "NO" is selected, automatic changing is put on hold.

Figure 40A:
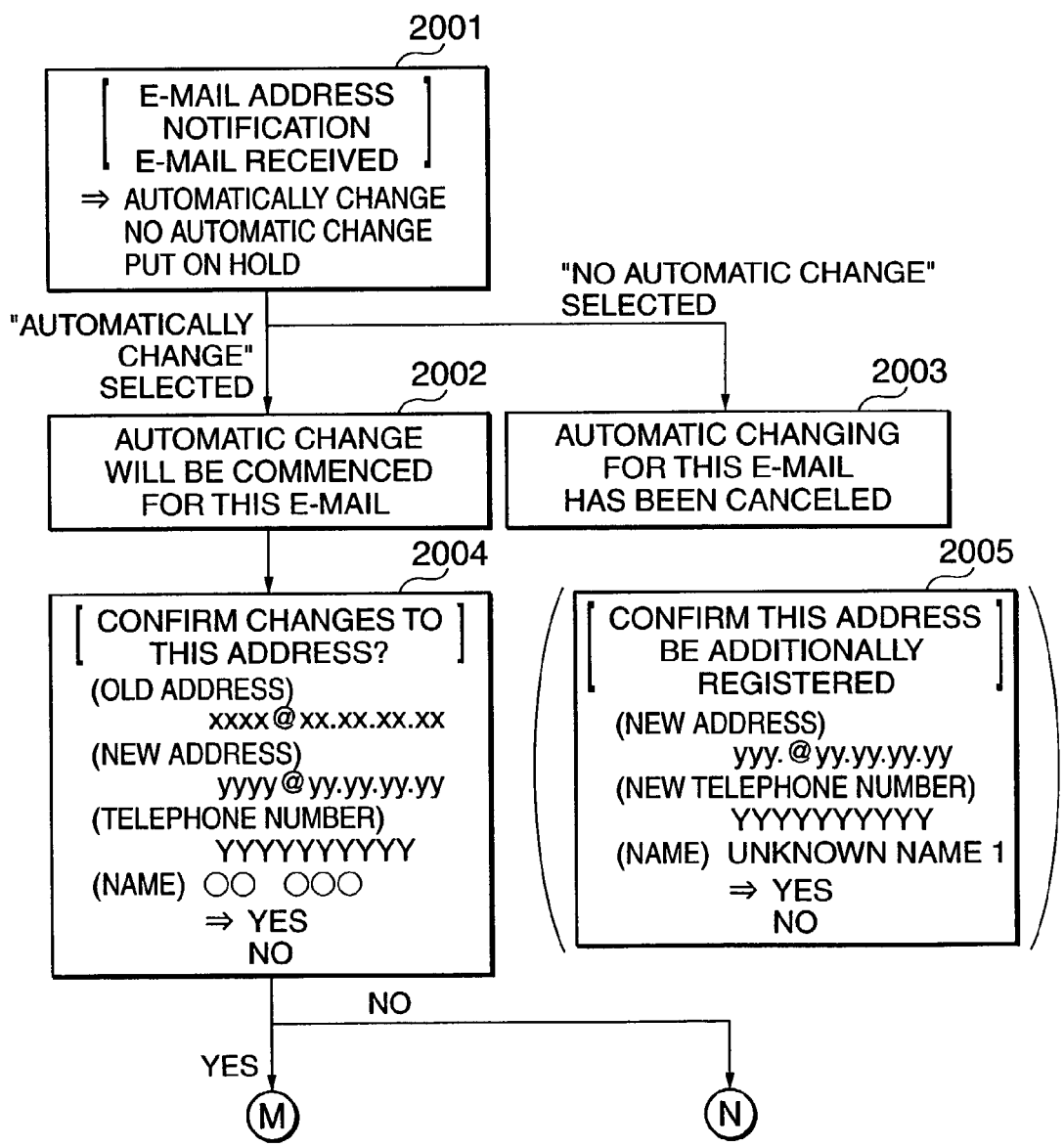
FIG. 40A–40B is a diagram showing a state transition of the display screen up to a changing of the e-mail address in the telephone directory list, after an e-mail for e-mail for notification of an e-mail address has been received and the e-mail address data has been obtained.
Figure 40B:
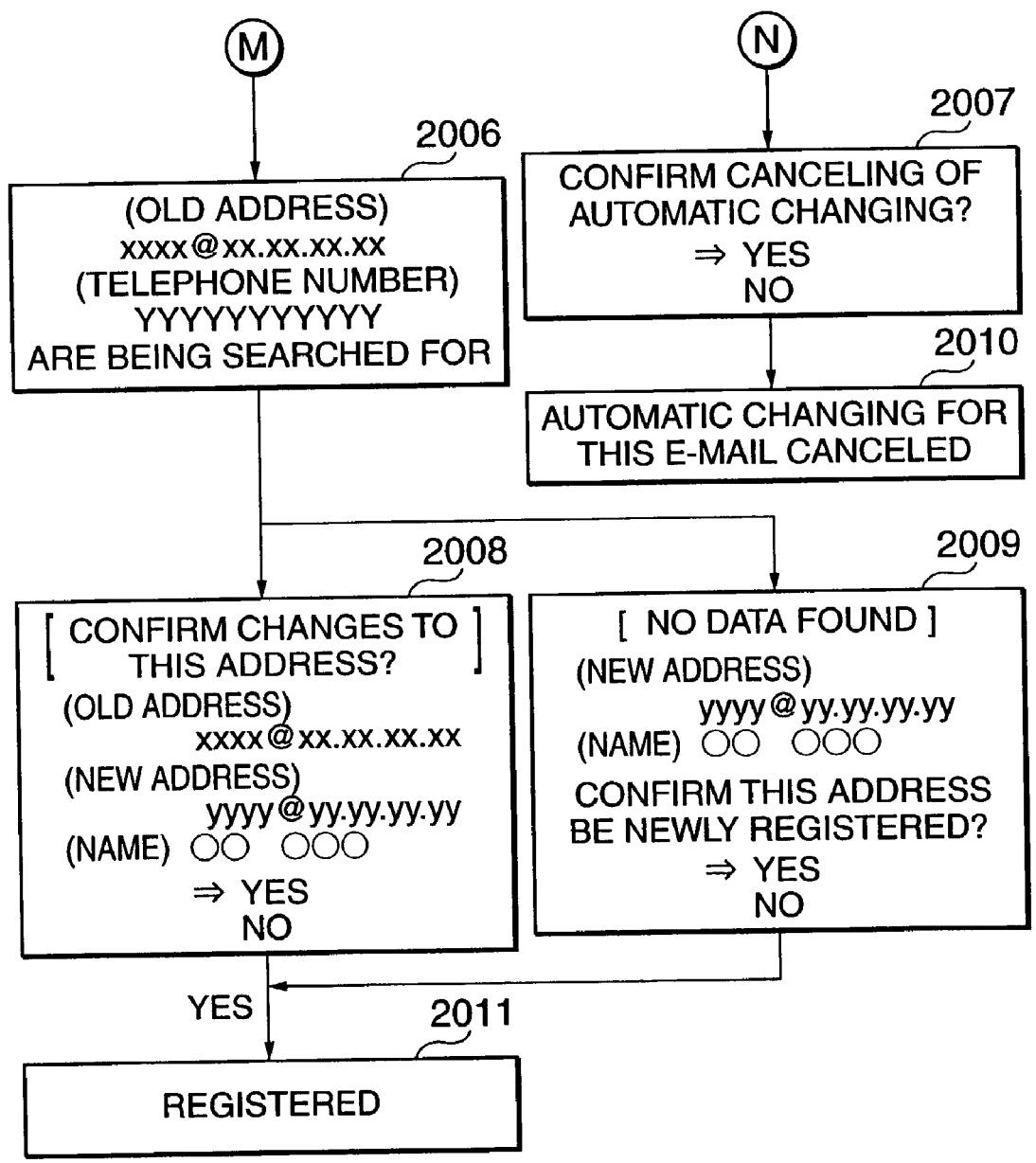

FIG. 40 is a diagram showing a state transition of the display screen up to a changing of the e-mail address in the telephone directory list, after an e-mail for a change notification of an e-mail address has been received and e-mail address data has been obtained.

Once an e-mail for a change notification of an e-mail address has been received and data for the old e-mail address and the new e-mail address has been obtained, as shown on a screen 2001 an indication that the e-mail for the change notification of the e-mail address has been received is displayed. When "NO AUTOMATIC CHANGE" is selected at this point, the automatic changing by the e-mail is canceled on a screen 2003. It should be noted that at this point the e-mail for the change notification of the e-mail address is itself not deleted, and only the processing task of automatically changing is canceled.

When "PUT ON HOLD" is selected on the screen 2001, the displaying of the screen 2001 is terminated, and the screen 2001 is not displayed again until it is recalled via a menu or the like that relates to the updating of e-mail addresses.

When "AUTOMATICALLY CHANGE" is selected on the screen 2001, an indication that an automatic changing has commenced is displayed on a screen 2002. On a screen 2004, the old e-mail address that has been obtained and stored in the buffer OldAdrBuf, the new e-mail address that has been obtained and stored in the buffer NewAdrBuf, the telephone number that has been obtained and stored in the buffer NewTelNum, and the name are displayed. It should be noted that when the name is not obtained from the e-mail for the change notification of the e-mail address and therefore the name of the sender is unclear, the name is registered as "UNKNOWN NAME 1" as shown on a screen 2005.

When "NO" is selected on the screen 2004 or 2005, a screen that prompts a selection of the automatic changing being to be canceled or it being not to be canceled is displayed on a screen 2007. In the same way as with the screen 2001, when "YES" is selected, the process for automatically changing is canceled. Alternatively, when "NO" is selected, the processing is put on hold.

When "YES" is selected on the screen 2004 or 2005, a process for comparing the old e-mail address stored in the buffer OldAdrBuf with all of the e-mail addresses in the telephone directory list is performed, and an indication that a search for the old e-mail address is being performed is displayed on a screen 2006. When the search result shows that the old e-mail address is found in the telephone directory list, an indication that the e-mail address (old e-mail address) in the telephone directory list will be rewritten using the new e-mail address is displayed on a screen 2008. When the search result shows that the old e-mail address is not found, a screen indicating that the new e-mail address will be registered as a new e-mail address is displayed on a screen 2009.

When "NO" is selected on the screen 2008 or screen 2009, the display is changed to the screen 2007. On the other hand, when "YES" is selected, an indication that registration is being performed is displayed on a screen 2011 and registration in the telephone directory list is performed.

Figure 41:
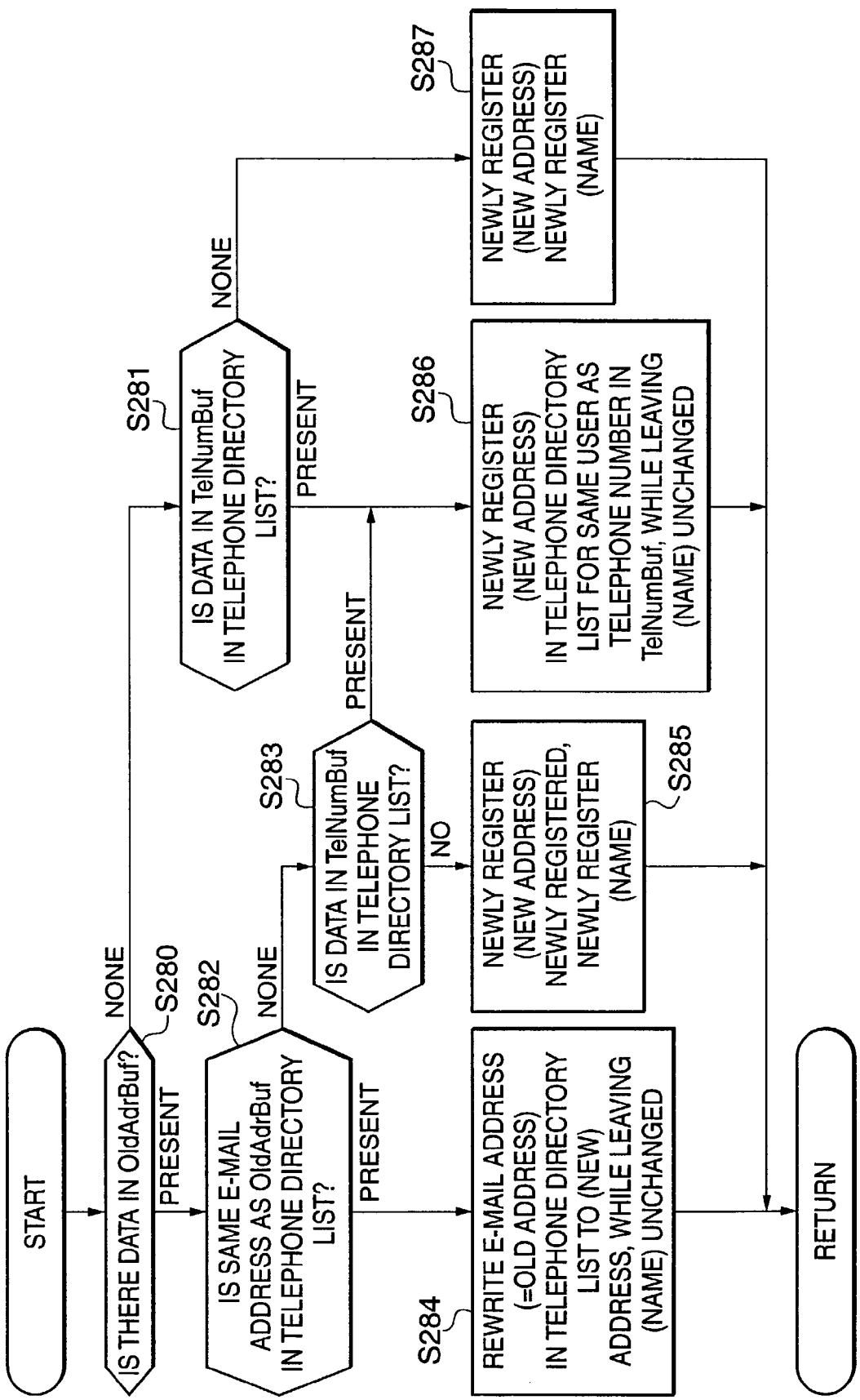
FIG. 41 is a flowchart showing the procedure for a process for updating the telephone directory list data in step S264 in FIG. 37.

FIG. 41 is a flowchart showing the procedure for the process for updating the telephone directory list data in step S264. When the telephone directory list updating process is commenced, it is first determined whether there is data in the buffer OldAdrBuf (step S280).

When there is no data in the buffer OldAdrBuf, it is determined whether data that is the same as the telephone number in the buffer TelNumBuf is present among the telephone numbers in the telephone directory list (step S281). When the same number is not present, the user is newly registered (step S287). After this, the process returns to the main routine. On the other hand, when the same number is present, a process for additionally registering an e-mail address for the user with the matching telephone number is performed (step S286). After this, the process returns to the main routine.

In another case, when data is present in the buffer Old-AdrBuf in step S280, it is determined whether the same data as in the buffer OldAdrBuf is present among the e-mail addresses in the telephone directory list (step S282). If the same data is present, a process for rewriting the e-mail address of the user with the matching old e-mail address to the new e-mail address (step S284). After this, the process returns to the main routine.

When the same data is not present in step S282, in the same way as in step S281, it is determined whether the same data as the telephone number stored in the buffer TelNum-Buf is present among the telephone numbers in the telephone directory list (step S283). If the same data is not present, the user is newly registered (step S285). After this, the process returns to the main routine. On the other hand, if the same data is present, a process for newly registering the e-mail address for the user whose telephone number matches is performed in step S286.

In this way, a recipient terminal that has received an e-mail for a notification of an e-mail address in a predetermined format can automatically update the data in the telephone directory list according to the user's selection.

Also, in a case where the sender terminal sends an e-mail for a change notification of an address that does not indicate the old e-mail address, the receiver terminal may compare the sender's name or kana reading in place of the old e-mail address and when matching information is found, may then change the e-mail address data for the sender.

The third and fourth embodiments of the present invention have been described above, but the present invention is not limited to the constructions of these embodiments and can be applied to any construction that is capable of achieving the functions that are disclosed by the appended claims or the functions of the constructions of these embodiments.

It is to be understood that the object of the present invention may also be accomplished by supplying a system or an apparatus with a program code of software which realizes the functions of the above described third or fourth embodiment, and causing a computer (or CPU or MPU) of the system or apparatus to execute the supplied program code In this case, the program code itself realizes the novel functions of the present invention, and hence the program code and a storage medium on which the program code is stored constitute the present invention.

A program representing the flowcharts of FIGS. 17, 18, 19, 20, 21, 24, 25, 28, and 29 of the third embodiment, or the flowcharts of FIGS. 31, 32, 33, 34, 37, 38, and 41 of the fourth embodiment is stored in a ROM as a storage medium. However, the storage medium for supplying the program code is not limited to a ROM, and a floppy (registered trademark) disk, a hard disk, an optical disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a download performed via a network may be used.

According to the present invention, when an e-mail that is written in a format according to special rules is received, telephone number information and/or e-mail address information in the e-mail can be automatically reflected in a telephone directory list, and as a result, the burden of rewriting the telephone directory list is reduced for the recipient of the e-mail. That is, when an e-mail that has been generated using a predetermined format and indicates a telephone number and/or e-mail address has been received, the telephone directory list is accessed and when the same telephone number and/or the same e-mail address is present, the telephone directory list is automatically rewritten using the new telephone number and/or e-mail address indicated in the e-mail. On the other hand, when the same telephone number and/or the same e-mail address is not present, the information is registered as a new user, so that the user of the recipient terminal is saved from the trouble of manually inputting a telephone number and/or e-mail address of an acquaintance or the like.

What is claimed is:

1. A communication apparatus that transmits an electronic mail for a change notification of at least one of an electronic mail address or a telephone number, comprising:
   an electronic mail address registering means that registers at least one electronic mail address;
   an obtaining means that obtains at least one of the at least one electronic mail address registered in said electronic mail address registering device;
   a transmitting means that transmits the electronic mail for the change notification to each of the obtained at least one electronic mail address;
   an electronic mail generating means that automatically generates the electronic mail for the change notification to be sent to the registered at least one electronic mail address;
   a format registering means that registers at least one format to be used for generating the electronic mail for the change notification;
   a language determining means that determines whether a character code to be used for generating the electronic mail for the change notification is a double-byte character code; and
   a format selecting means that selects one of the registered at least one format based on a result of the determination by said language determining device,
   wherein said electronic mail address generating means generates the electronic mail for the change notification using the selected format.

2. A communication apparatus according to claim 1, wherein when the character code to be used for generating the electronic mail for the change notification is the double-byte character code, one of a single-byte character code and the double-byte character code is used for a name and kana reading to be inserted into contents of the electronic mail for the change notification, and when the character code to be used for generating the electronic mail for the change notification is not the double-byte character code, the single-byte character code is used for the name and kana reading to be inserted into the contents of the electronic mail for the change notification.

3. A communication apparatus according to claim 1, wherein said format selecting means selects a format that conforms to notification contents of the electronic mail for the change notification.

4. A communication apparatus that transmits an electronic mail for a change notification of at least one of an electronic mail address or a telephone number, comprising:
   an electronic mail address registering means that registers at least one electronic mail address;
   an obtaining means that obtains at least one of the at least one electronic mail address registered in said electronic mail address registering device;
   a transmitting means that transmits the electronic mail for the change notification to each of the obtained at least one electronic mail address;

a normal transmission determining means that determines whether all transmissions to the obtained at least one electronic mail address have been performed successfully by comparing a number of electronic mail addresses to which transmission has been successfully performed by said transmitting means with a total number of electronic mail addresses that are registered in advance;

a resuming means that resumes, when a transmission of the electronic mail for the change notification has not been performed successfully and has been discontinued, the transmission from an electronic mail address at which the transmission has been discontinued;

a canceling means that cancels the transmission in a case where the discontinued transmission of the electronic mail for the change notification is not resumed; and a resume/cancel selecting means that selectively decides whether the discontinued transmission of the electronic mail for the change notification is resumed or canceled.

5. A communication method of notifying a change in at least one of an electronic mail address or a telephone number, comprising:

an electronic mail address registering step of registering at least one electronic mail address;

an obtaining step of obtaining at least one of the at least one electronic mail address registered in said electronic mail address registering step;

a transmitting step of transmitting an electronic mail for a notification to each of the obtained at least one electronic mail address;

an electronic mail generating step of automatically generating the electronic mail for the notification to be sent to the registered at least one electronic mail address;

a format registering step of registering at least one format to be used for generating the electronic mail for the notification;

a language determining step of determining whether a character code to be used in generating the electronic mail for the change notification is a double-byte character code; and a format selecting step of selecting one of the registered at least one formats based on a result of the determination in said language determining step, wherein in said electronic mail address generating step the electronic mail for the notification is generated using the selected format.

6. A communication method according to claim 5, wherein when the character code to be used for generating the electronic mail for the change notification is the double-byte character code, one of a single-byte character code and the double-byte character code is used for a name and kana reading to be inserted into contents of the electronic mail for the change notification, and when the character code to be used for generating the electronic mail for the change notification is not the double-byte character code, the single-byte character code is used for the name and kana reading to be inserted into the contents of the electronic mail for the change notification.

7. A communication method according to claim 5, wherein said format selecting step selects a format that conforms to notification contents of the electronic mail for the notification.

8. A communication method of notifying a change in at least one of an electronic mail address or a telephone number, comprising:

an electronic mail address registering step of registering at least one electronic mail address;

an obtaining step of obtaining at least one of the at least one electronic mail address registered in said electronic mail address registering step;

a transmitting step of transmitting an electronic mail for a notification to each of the obtained at least one electronic mail address;

a normal transmission determining step of determining whether all transmissions to the obtained at least one electronic mail address have been performed successfully by comparing a number of electronic mail addresses to which transmission has been successfully performed in said transmitting step with a total number of electronic mail addresses that are registered in advance;

a resuming step of resuming, of the electronic mail for the change notification has not been performed successfully and has been discontinued, the transmission from an electronic mail address at which the transmission has been discontinued;

a canceling step of canceling the transmission in a case where the discontinued transmission of the electronic mail for the change notification is not resumed; and a resume/cancel selecting step of selectively deciding whether the discontinued transmission of the electronic mail for the change notification is resumed or canceled.

9. A communication method of notifying a change in at least one of an electronic mail address or a telephone number, comprising:

an electronic mail address registering step of registering at least one electronic mail address;

an obtaining step of obtaining at least one of the at least one electronic mail address registered in said electronic mail address registering step;

a transmitting step of transmitting an electronic mail for a notification to each of the obtained at least one electronic mail address;

an electronic mail generating step of automatically generating the electronic mail for the notification to be sent to the registered at least one electronic mail address;

a normal transmission determining step of determining whether all transmissions to the obtained at least one electronic mail address have been performed successfully by comparing a number of electronic mail addresses to which transmission has been successfully performed in said transmitting step with a total number of electronic mail addresses that are registered in advance;

a resuming step of resuming, of the electronic mail for the change notification has not been performed successfully and has been discontinued, the transmission from an electronic mail address at which the transmission has been discontinued;

a canceling step of canceling the transmission in a case where the discontinued transmission of the electronic mail for the change notification is not resumed; and a resume/cancel selecting step of selectively deciding whether the discontinued transmission of the electronic mail for the change notification is resumed or canceled.

10. A communication apparatus that transmits an electronic mail for a change notification of at least one of an electronic mail address or a telephone number, comprising:

an electronic mail address registering means that registers at least one electronic mail address;

an obtaining means that obtains at least one of the at least one electronic mail address registered in said electronic mail address registering device;

a transmitting means that transmits the electronic mail for the change notification to each of the obtained at least one electronic mail address;

an electronic mail generating means that automatically generates the electronic mail for the change notification to be sent to the registered at least one electronic mail address;

a normal transmission determining means that determines whether all transmissions to the obtained at least one electronic mail address have been performed successfully by comparing a number of electronic mail addresses to which transmission has been successfully performed by said transmitting means with a total number of electronic mail addresses that are registered in advance;

a resuming means that resumes, when a transmission of the electronic mail for the change notification has not been performed successfully and has been discontinued, the transmission from an electronic mail address at which the transmission has been discontinued;

a canceling means that cancels the transmission in a case where the discontinued transmission of the electronic mail for the change notification is not resumed; and a resume/cancel selecting means that selectively decides whether the discontinued transmission of the electronic mail for the change notification is resumed or canceled.

* * * * *